United States Patent
Reeder et al.

(10) Patent No.: US 12,527,450 B2
(45) Date of Patent: Jan. 20, 2026

(54) VACUUM TOOLS

(71) Applicant: MILWAUKEE ELECTRIC TOOL CORPORATION, Brookfield, WI (US)

(72) Inventors: Kyle Reeder, Waukesha, WI (US); Ellen M. Owens, Milwaukee, WI (US); Jonathan Lowry, Milwaukee, WI (US); Alexander J. Goodman, Milwaukee, WI (US); Christopher J. Metcalf, Wauwatosa, WI (US); Scott T. Moeller, Richfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/633,719

(22) Filed: Apr. 12, 2024

(65) Prior Publication Data

US 2024/0268614 A1  Aug. 15, 2024

Related U.S. Application Data

(63) Continuation of application No. 17/621,000, filed as application No. PCT/US2020/039679 on Jun. 25, 2020.

(Continued)

(51) Int. Cl.
*A47L 9/06* (2006.01)
*A47L 7/00* (2006.01)
(Continued)

(52) U.S. Cl.
CPC ........... *A47L 9/0673* (2013.01); *A47L 7/0004* (2013.01); *A47L 7/0095* (2013.01); *A47L 9/066* (2013.01);
(Continued)

(58) Field of Classification Search
CPC ...... B08B 15/04; A47L 9/0673; A47L 9/0693; A47L 9/066; A47L 9/242; A47L 9/248;
(Continued)

(56) References Cited

U.S. PATENT DOCUMENTS 955,897 A * 4/1910 Noe .......................... A47L 9/06
 15/399
987,820 A   3/1911 Parker
(Continued)

FOREIGN PATENT DOCUMENTS

AU  2015101213 A  10/2015
CN    2082597 U   8/1991
(Continued)

OTHER PUBLICATIONS

PE2E Translation KR-100239165-B1; Apparatus for Folding Extension Pipe of Vacuum Cleaner; Kim, Bu-Hyun, Jan. 5, 2000 (Year: 2000).*

(Continued)

*Primary Examiner* — Brian D Keller
*Assistant Examiner* — Sidney D Full
(74) *Attorney, Agent, or Firm* — Michael Best & Friedrich LLP

(57) ABSTRACT

A vacuum tool is removably couplable to a hose or wand of a vacuum. The vacuum tool includes a frustoconical head portion, a base portion, and fasteners. The frustoconical head portion includes a distal end of the vacuum tool, an interior support body, and an outer layer. The distal end has a central inlet opening and an annular distal face. The interior support body has a central conduit and fastener receiving recesses. The outer layer includes rubber and forms at least a portion of the annular distal face and an entirety of an outer lateral surface of the frustoconical head portion. The base portion includes a flared portion and a tubular portion. The flared (Continued)

portion has a maximum outer diameter and fastener access openings. The tubular portion has an outer diameter, a central conduit, and a proximal end of the vacuum tool.

19 Claims, 31 Drawing Sheets

Related U.S. Application Data

(60) Provisional application No. 63/000,656, filed on Mar. 27, 2020, provisional application No. 62/980,041, filed on Feb. 21, 2020, provisional application No. 62/955,070, filed on Dec. 30, 2019, provisional application No. 62/866,883, filed on Jun. 26, 2019.

(51) Int. Cl.
 A47L 9/24 (2006.01)
 A47L 9/32 (2006.01)
 B08B 15/04 (2006.01)
 B23Q 11/00 (2006.01)

(52) U.S. Cl.
 CPC .............. *A47L 9/0693* (2013.01); *A47L 9/242* (2013.01); *A47L 9/248* (2013.01); *A47L 9/327* (2013.01); *B08B 15/04* (2013.01); *B23Q 11/0046* (2013.01); *B23Q 11/0071* (2013.01)

(58) Field of Classification Search
 CPC .......... A47L 9/327; A47L 9/02; A47L 7/0004; A47L 7/0095; A47L 7/009; A47L 9/26; A47L 9/068; F16L 15/006–009; F16L 2101/50; H02G 1/086; H02G 9/06; H02G 1/06; H02G 1/08; H02G 1/081; H02G 1/083; H02G 1/085; H02G 1/088
 USPC ....... 15/15.1, 416, 417, 419, 421; 254/134.4
 See application file for complete search history.

(56) References Cited

U.S. PATENT DOCUMENTS

| | | | |
|---|---|---|---|
| 1,005,153 A * | 10/1911 | Gase | A47L 9/242 |
| | | | 285/397 |
| 1,696,811 A | 12/1928 | Nisbet | |
| 1,884,044 A | 10/1932 | Martinet | |
| 1,971,493 A | 8/1934 | Leathers | |
| 1,994,869 A | 3/1935 | Replogle | |
| 2,098,797 A | 11/1937 | Stevens | |
| 2,216,275 A * | 10/1940 | Kroenlein | A47L 9/06 |
| | | | 15/393 |
| 2,235,226 A | 3/1941 | Lofgren et al. | |
| 2,236,989 A | 4/1941 | Bjorkman | |
| 2,276,943 A | 3/1942 | Dow | |
| 2,296,429 A | 9/1942 | Ell | |
| 2,320,545 A | 6/1943 | Ross | |
| 2,374,461 A | 4/1945 | Schmidt | |
| D141,802 S | 7/1945 | Wittke | |
| 2,554,238 A | 5/1951 | Burri | |
| 2,591,262 A | 4/1952 | Humphrey | |
| 2,616,118 A | 11/1952 | Meyerhoefer | |
| 2,624,064 A | 1/1953 | Snyder | |
| 2,643,413 A | 6/1953 | Buccasio | |
| 2,661,225 A | 12/1953 | Lyon | |
| 2,665,446 A | 1/1954 | Gregory | |
| 2,674,001 A | 4/1954 | Abrams et al. | |
| 2,677,461 A | 5/1954 | Bodey | |
| 2,703,903 A | 3/1955 | Faith-Ell | |
| 2,715,240 A | 8/1955 | Pieper et al. | |
| 2,747,217 A | 5/1956 | Stahl | |
| 2,807,825 A | 10/1957 | Gardner | |
| 2,824,334 A | 2/1958 | Laningham | |
| 2,932,055 A | 4/1960 | Kemper | |
| 3,091,433 A * | 5/1963 | Riley, Jr. | H02G 1/086 |
| | | | 15/406 |
| D200,194 S | 2/1965 | Frost | |
| 3,206,783 A | 9/1965 | Schwartz | |
| 3,320,629 A | 5/1967 | Zaidan | |
| 3,477,087 A | 11/1969 | Robinson | |
| 3,549,180 A | 12/1970 | MacWilliam | |
| 3,574,885 A | 4/1971 | Jones | |
| 3,689,031 A * | 9/1972 | Ruddick | H02G 1/086 |
| | | | 254/134.4 |
| 3,820,189 A * | 6/1974 | Roth | A47L 9/02 |
| | | | 15/400 |
| 3,952,362 A | 4/1976 | Torii | |
| 4,034,435 A * | 7/1977 | Grabathy | A47L 9/0613 |
| | | | 15/419 |
| 4,279,745 A | 7/1981 | Haase | |
| D273,146 S | 3/1984 | Farr | |
| 4,459,720 A | 7/1984 | Ahlf et al. | |
| 4,476,607 A | 10/1984 | Ross | |
| 4,570,286 A | 2/1986 | Ross | |
| 4,592,111 A | 6/1986 | Berfield | |
| 4,638,526 A | 1/1987 | Murata et al. | |
| 4,638,527 A | 1/1987 | Fleischhauer | |
| 4,653,137 A | 3/1987 | Fleischhauer | |
| 4,653,779 A | 3/1987 | Foster | |
| 4,694,529 A | 9/1987 | Choiniere | |
| 4,715,088 A | 12/1987 | Haase | |
| 4,921,284 A * | 5/1990 | Singeetham | F16L 23/036 |
| | | | 285/354 |
| 5,052,074 A | 10/1991 | Korsen | |
| 5,054,160 A | 10/1991 | Marino | |
| 5,056,187 A | 10/1991 | Higgins | |
| 5,063,635 A | 11/1991 | Ishii et al. | |
| 5,179,756 A | 1/1993 | Korsen | |
| D335,942 S | 5/1993 | Furcron | |
| 5,265,969 A | 11/1993 | Chuang | |
| D353,918 S | 12/1994 | Bruno et al. | |
| 5,388,308 A | 2/1995 | Meeuwissen | |
| 5,440,782 A | 8/1995 | Yamashita | |
| 5,491,870 A | 2/1996 | Holmes | |
| 5,533,230 A | 7/1996 | Rouda | |
| 5,557,823 A | 9/1996 | Rouda | |
| 5,613,272 A | 3/1997 | Huffman | |
| 5,652,997 A | 8/1997 | Na | |
| D384,453 S | 9/1997 | Bartz | |
| 5,715,569 A | 2/1998 | Dickey | |
| 5,722,112 A | 3/1998 | Scanni et al. | |
| 5,768,747 A | 6/1998 | Smith | |
| 5,826,300 A | 10/1998 | Smith | |
| 5,826,301 A | 10/1998 | Kang et al. | |
| D405,570 S | 2/1999 | Broecking | |
| 5,894,628 A | 4/1999 | Egner-Walter et al. | |
| 6,026,541 A | 2/2000 | Bailey et al. | |
| 6,029,311 A | 2/2000 | Scanni et al. | |
| 6,044,521 A | 4/2000 | Sebek | |
| 6,108,861 A | 8/2000 | Vystrcil et al. | |
| 6,341,403 B1 | 1/2002 | Strickrodt et al. | |
| 6,345,409 B1 | 2/2002 | LaCroix | |
| 6,381,805 B1 | 5/2002 | Martin | |
| 6,430,773 B1 | 8/2002 | Buron et al. | |
| 6,519,809 B2 | 2/2003 | Gutry | |
| 6,581,974 B1 | 6/2003 | Ragner et al. | |
| D513,101 S | 12/2005 | Allard et al. | |
| D520,201 S | 5/2006 | Dyson et al. | |
| D520,202 S | 5/2006 | Dyson et al. | |
| 7,036,184 B2 | 5/2006 | Kim | |
| 7,159,274 B2 | 1/2007 | Friedell | |
| D540,994 S | 4/2007 | Borges | |
| 7,278,181 B2 | 10/2007 | Harris et al. | |
| D565,261 S | 3/2008 | Peace | |
| D565,262 S | 3/2008 | Dyson et al. | |
| 7,353,564 B2 | 4/2008 | Wertz | |
| 7,377,006 B2 | 5/2008 | Genoa et al. | |
| 7,571,514 B2 | 8/2009 | Shih | |
| D602,217 S | 10/2009 | Osborn et al. | |
| D603,570 S | 11/2009 | Svantesson et al. | |
| D616,166 S | 5/2010 | McLeod et al. | |
| D621,566 S | 8/2010 | Crawley et al. | |
| D622,016 S | 8/2010 | Hofmann-Kay et al. | |

(56) References Cited

U.S. PATENT DOCUMENTS

| | | |
|---|---|---|
| 7,954,202 B1 | 6/2011 | Ragner |
| 8,015,662 B2 | 9/2011 | Rosenzweig et al. |
| D659,315 S | 5/2012 | Hollis et al. |
| 8,230,819 B2 | 7/2012 | Freidell |
| 8,296,901 B2 | 10/2012 | Rosenzweig et al. |
| D670,454 S | 11/2012 | Sherk, Jr. et al. |
| D674,978 S | 1/2013 | Hill et al. |
| 8,402,603 B1 | 3/2013 | Meek |
| 8,407,853 B1 | 4/2013 | Baxt |
| 8,429,790 B2 | 4/2013 | Freidell |
| 8,499,772 B2 | 8/2013 | Schumacher |
| 8,533,907 B2 | 9/2013 | Eccardt et al. |
| 8,555,463 B1 | 10/2013 | Laube |
| 8,595,894 B1 | 12/2013 | Kakish |
| D701,010 S | 3/2014 | Tate |
| D701,011 S | 3/2014 | Miller et al. |
| 8,667,644 B1 | 3/2014 | Marion |
| 8,732,893 B2 | 5/2014 | Freidell |
| 8,777,272 B2 | 7/2014 | Welchert |
| D712,608 S | 9/2014 | Crawley |
| D712,609 S | 9/2014 | Crawley |
| 8,918,947 B2 | 12/2014 | Schwartz |
| 8,918,955 B2 | 12/2014 | Freidell |
| D722,734 S | 2/2015 | Jang et al. |
| D729,475 S | 5/2015 | Jang et al. |
| 9,186,027 B2 | 11/2015 | Genn |
| 9,212,771 B2 | 12/2015 | Baldwin et al. |
| 9,277,845 B2 | 3/2016 | Griffith et al. |
| 9,370,287 B2 | 6/2016 | Welchert |
| D762,029 S | 7/2016 | Marsden et al. |
| 9,392,918 B2 | 7/2016 | Tucker et al. |
| D764,125 S | 8/2016 | Palladino et al. |
| 9,420,927 B2 | 8/2016 | Ventress et al. |
| D773,136 S | 11/2016 | Fuller et al. |
| 9,492,046 B2 | 11/2016 | Cole et al. |
| 9,596,967 B2 | 3/2017 | Lee et al. |
| 9,695,545 B2 | 7/2017 | Goble et al. |
| 9,700,188 B2 | 7/2017 | Cole et al. |
| 9,723,960 B2 | 8/2017 | Borges et al. |
| D800,266 S | 10/2017 | Holub, Jr. |
| 9,782,048 B2 | 10/2017 | Witter et al. |
| D804,754 S | 12/2017 | Washington |
| D804,755 S | 12/2017 | Nam et al. |
| D805,267 S | 12/2017 | Maune |
| D806,963 S | 1/2018 | Nam et al. |
| D811,673 S | 2/2018 | Nam et al. |
| 9,955,834 B2 | 5/2018 | Lee et al. |
| 9,992,973 B2 | 6/2018 | Freidell |
| 10,022,026 B2 | 7/2018 | Price |
| D830,655 S | 10/2018 | Kim et al. |
| 10,145,057 B2 | 12/2018 | Goble et al. |
| 10,238,256 B2 | 3/2019 | Cole et al. |
| 10,315,627 B2 | 6/2019 | Chambers et al. |
| 10,443,768 B1 | 10/2019 | McConnell et al. |
| D867,696 S | 11/2019 | Onyenkwere |
| 10,463,216 B2 | 11/2019 | Emmett et al. |
| D869,803 S | 12/2019 | Fry et al. |
| D871,700 S | 12/2019 | Martinez |
| D880,791 S | 4/2020 | Ducette, Jr. et al. |
| 10,631,696 B1 | 4/2020 | Williamson |
| 10,791,899 B2 | 10/2020 | Carter |
| 10,849,475 B1* | 12/2020 | Williamson .............. A47L 9/06 |
| 11,653,803 B2 | 5/2023 | Carter |
| 11,937,762 B2 | 3/2024 | Reeder et al. |
| 2002/0170140 A1 | 11/2002 | Diaz et al. |
| 2004/0020006 A1 | 2/2004 | Muller |
| 2004/0045127 A1 | 3/2004 | Albert et al. |
| 2004/0143931 A1 | 7/2004 | Dennis |
| 2005/0044660 A1 | 3/2005 | Kim |
| 2005/0076467 A1 | 4/2005 | Stephens et al. |
| 2005/0115017 A1 | 6/2005 | Kim |
| 2007/0013187 A1 | 1/2007 | Petner et al. |
| 2007/0209144 A1 | 9/2007 | Fester et al. |
| 2007/0209147 A1 | 9/2007 | Krebs et al. |
| 2007/0271727 A1 | 11/2007 | Adams |
| 2007/0277345 A1* | 12/2007 | Spann ...................... A47L 9/06 15/395 |
| 2008/0022487 A1 | 1/2008 | Young |
| 2008/0163451 A1 | 7/2008 | Buller et al. |
| 2008/0184515 A1 | 8/2008 | Chapman et al. |
| 2009/0188067 A1 | 7/2009 | White et al. |
| 2009/0235483 A1 | 9/2009 | Seo |
| 2010/0294207 A1 | 11/2010 | Dyson et al. |
| 2011/0030620 A1 | 2/2011 | Jouan |
| 2011/0047745 A1 | 3/2011 | Butts |
| 2011/0142557 A1 | 6/2011 | Hahn |
| 2011/0185869 A1* | 8/2011 | Wasielewski ............. B25F 5/02 83/100 |
| 2012/0042469 A1 | 2/2012 | Davis et al. |
| 2012/0090639 A1 | 4/2012 | Heldman et al. |
| 2012/0110770 A1 | 5/2012 | Hirashima |
| 2012/0160536 A1 | 6/2012 | Beining |
| 2012/0285393 A1 | 11/2012 | Freidell |
| 2012/0285395 A1 | 11/2012 | Freidell |
| 2012/0297571 A1 | 11/2012 | Friedell |
| 2013/0145576 A1 | 6/2013 | Hollis |
| 2013/0319469 A1 | 12/2013 | Borges, Sr. et al. |
| 2014/0062077 A1 | 3/2014 | Hurley |
| 2014/0068892 A1 | 3/2014 | Chambers |
| 2014/0075716 A1 | 3/2014 | Elmenhurst |
| 2014/0271004 A1 | 9/2014 | Bialy et al. |
| 2015/0000070 A1 | 1/2015 | Liu et al. |
| 2015/0198274 A1 | 7/2015 | Farland et al. |
| 2016/0120383 A1 | 5/2016 | Stanek et al. |
| 2016/0319521 A1 | 11/2016 | Mitchell |
| 2018/0014706 A1 | 1/2018 | Tucker et al. |
| 2018/0014707 A1 | 1/2018 | Tucker et al. |
| 2018/0014708 A1 | 1/2018 | Tucker et al. |
| 2018/0055314 A1 | 3/2018 | Rupp et al. |
| 2018/0235420 A1 | 8/2018 | Stanek et al. |
| 2018/0288969 A1 | 10/2018 | Freidell |
| 2018/0353024 A1 | 12/2018 | Williams |
| 2018/0353028 A1 | 12/2018 | Goller |
| 2019/0119845 A1 | 4/2019 | Goble et al. |
| 2019/0174982 A1 | 6/2019 | Santiago |
| 2019/0282047 A1 | 9/2019 | Minamide et al. |
| 2019/0290080 A1 | 9/2019 | Liu et al. |
| 2019/0380548 A1 | 12/2019 | Moeller et al. |
| 2019/0380555 A1 | 12/2019 | Scott et al. |
| 2019/0387937 A1 | 12/2019 | Martin et al. |
| 2020/0000300 A1 | 1/2020 | Moeller et al. |
| 2020/0015643 A1 | 1/2020 | Scott et al. |
| 2020/0214517 A1 | 7/2020 | Ito et al. |
| 2021/0347090 A1 | 11/2021 | Holzmeier |
| 2022/0322899 A1 | 10/2022 | Reeder et al. |

FOREIGN PATENT DOCUMENTS

| | | |
|---|---|---|
| CN | 2217952 Y | 1/1996 |
| CN | 101229033 A | 7/2008 |
| CN | 201227241 Y | 4/2009 |
| CN | 301057278 | 11/2009 |
| CN | 201398935 Y | 2/2010 |
| CN | 301129641 | 2/2010 |
| CN | 301235834 S | 5/2010 |
| CN | 301343708 S | 9/2010 |
| CN | 202179502 U | 4/2012 |
| CN | 101564281 B | 5/2012 |
| CN | 102485157 A | 6/2012 |
| CN | 302110947 S | 10/2012 |
| CN | 302268617 S | 1/2013 |
| CN | 101869455 B | 4/2013 |
| CN | 103181742 A | 7/2013 |
| CN | 203122292 U | 8/2013 |
| CN | 203122294 U | 8/2013 |
| CN | 302721246 S | 1/2014 |
| CN | 302726072 S | 1/2014 |
| CN | 203468509 U | 3/2014 |
| CN | 203591222 U | 5/2014 |
| CN | 104013359 A | 9/2014 |
| CN | 302937546 S | 9/2014 |
| CN | 203885437 U | 10/2014 |
| CN | 303050391 S | 12/2014 |
| CN | 103462562 B | 12/2015 |

(56) References Cited

FOREIGN PATENT DOCUMENTS

| | | |
|---|---|---|
| CN | 105361800 A | 3/2016 |
| CN | 105361801 A | 3/2016 |
| CN | 105380565 A | 3/2016 |
| CN | 105380574 A | 3/2016 |
| CN | 205181235 U | 4/2016 |
| CN | 102485156 B | 5/2016 |
| CN | 205338838 U | 6/2016 |
| CN | 102485154 B | 7/2016 |
| CN | 303903132 S | 11/2016 |
| CN | 104013358 B | 12/2016 |
| CN | 303979113 S | 12/2016 |
| CN | 304062024 S | 3/2017 |
| CN | 304073560 S | 3/2017 |
| CN | 106618383 A | 5/2017 |
| CN | 206138057 U | 5/2017 |
| CN | 106880324 A | 6/2017 |
| CN | 106889945 A | 6/2017 |
| CN | 106901653 A | 6/2017 |
| CN | 106974590 A | 7/2017 |
| CN | 107080493 A | 8/2017 |
| CN | 206518513 U | 9/2017 |
| CN | 107260066 A | 10/2017 |
| CN | 107262266 A | 10/2017 |
| CN | 107411636 A | 12/2017 |
| CN | 107456156 A | 12/2017 |
| CN | 206714705 U | 12/2017 |
| CN | 107669211 A | 2/2018 |
| CN | 207202828 U | 4/2018 |
| CN | 304651521 S | 5/2018 |
| CN | 207640323 U | 7/2018 |
| CN | 108433637 A | 8/2018 |
| CN | 108903794 A | 11/2018 |
| CN | 208144962 U | 11/2018 |
| CN | 304908709 S | 11/2018 |
| CN | 208243512 U | 12/2018 |
| CN | 208259651 U | 12/2018 |
| CN | 208331514 U | 1/2019 |
| CN | 109330481 A | 2/2019 |
| CN | 208590621 U | 3/2019 |
| CN | 208973662 U | 6/2019 |
| CN | 209003815 U | 6/2019 |
| CN | 209136447 U | 7/2019 |
| CN | 305250631 S | 7/2019 |
| CN | 209186560 U | 8/2019 |
| CN | 209220127 U | 8/2019 |
| CN | 209285370 U | 8/2019 |
| CN | 305367087 S | 9/2019 |
| CN | 209826551 U | 12/2019 |
| CN | 106264363 B | 1/2020 |
| CN | 110742550 A | 2/2020 |
| CN | 305611410 S | 2/2020 |
| CN | 305631371 S | 2/2020 |
| CN | 105361805 B | 3/2020 |
| CN | 111012246 A | 4/2020 |
| CN | 210249693 U | 4/2020 |
| CN | 210330474 U | 4/2020 |
| CN | 305679541 S | 4/2020 |
| CN | 305679560 S | 4/2020 |
| CN | 210902814 U | 7/2020 |
| CN | 210931159 U | 7/2020 |
| DE | 689460 C | 3/1940 |
| DE | 950233 C | 10/1956 |
| DE | 1741297 U | 3/1957 |
| DE | 1772158 U | 8/1958 |
| DE | 1786502 U | 4/1959 |
| DE | 1144889 B | 3/1963 |
| DE | 1157356 B | 11/1963 |
| DE | 6919724 U | 1/1970 |
| DE | 6604899 U | 3/1970 |
| DE | 2418257 A1 | 10/1974 |
| DE | 8134889 U1 | 4/1982 |
| DE | 3529777 A1 | 2/1987 |
| DE | 3544480 A1 | 6/1987 |
| DE | 3632196 A1 | 3/1988 |
| DE | 9005930 U1 | 8/1990 |
| DE | 8625341 U1 | 10/1990 |
| DE | M9200208-0004 | 6/1992 |
| DE | M9200208-0005 | 6/1992 |
| DE | 8523910 U1 | 7/1994 |
| DE | 4444959 A1 | 6/1996 |
| DE | 29610327 U1 | 8/1996 |
| DE | 29611222 U1 | 9/1996 |
| DE | 19738068 C1 | 9/1998 |
| DE | 19901927 A1 | 7/1999 |
| DE | 20118357 U1 | 3/2002 |
| DE | 20215337 U1 | 12/2002 |
| DE | 20314450 U1 | 11/2003 |
| DE | 20313244 U1 | 12/2003 |
| DE | 10302728 A1 | 8/2004 |
| DE | 202005005124 U1 | 6/2005 |
| DE | 202005003025 U1 | 7/2005 |
| DE | 202005008383 U1 | 7/2005 |
| DE | 000477740-0001 | 3/2006 |
| DE | 000477740-0002 | 3/2006 |
| DE | 000477740-0003 | 3/2006 |
| DE | 000477740-0004 | 3/2006 |
| DE | 000477740-0005 | 3/2006 |
| DE | 000930151-0002 | 6/2008 |
| DE | 000930151-0004 | 6/2008 |
| DE | 202008006685 U1 | 9/2008 |
| DE | 102007036524 A1 | 2/2009 |
| DE | 102007036525 A1 | 2/2009 |
| DE | 102008014625 A1 | 9/2009 |
| DE | 202010003106 U1 | 5/2010 |
| DE | 102008055043 A1 | 8/2010 |
| DE | 202011000185 U1 | 3/2011 |
| DE | 402013003678-0022 | 10/2013 |
| DE | 402013003678-0023 | 10/2013 |
| DE | 402013003678-0024 | 10/2013 |
| DE | 102012016465 A1 | 2/2014 |
| DE | 102012020546 A1 | 4/2014 |
| DE | 102013007244 A1 | 10/2014 |
| DE | 202015104811 U1 | 9/2015 |
| DE | 102015113868 A1 | 2/2017 |
| DE | 202018101457 U1 | 7/2018 |
| DE | 102017105466 A1 | 9/2018 |
| DE | 102017112798 A1 | 12/2018 |
| DE | 102017118896 A1 | 2/2019 |
| DE | 006382750-0001 | 5/2019 |
| DE | 006382750-0002 | 5/2019 |
| DE | 006382750-0003 | 5/2019 |
| DE | 202019102698 U1 | 5/2019 |
| DE | 402020200925-0007 | 6/2020 |
| DE | 402020200925-0009 | 6/2020 |
| EP | 1321086 A2 | 6/2003 |
| EP | 1832214 A1 | 9/2007 |
| EP | 1925247 B1 | 7/2015 |
| EP | 2127582 B1 | 9/2015 |
| EP | 3095367 A1 | 11/2016 |
| EP | 3659486 A1 | 6/2020 |
| GB | 2492579 A | 1/2013 |
| GB | 002904508-0007 | 6/2016 |
| GB | 002904508-0018 | 6/2016 |
| GB | 003337963-0001 | 10/2016 |
| GB | 003337963-0002 | 10/2016 |
| HK | 004160786-0001 | 9/2017 |
| IT | 000089008-0001 | 2/2004 |
| IT | 000089008-0002 | 2/2004 |
| IT | 000089008-0003 | 2/2004 |
| IT | 000089008-0004 | 2/2004 |
| JP | H06079447 U | 11/1994 |
| JP | 2000229052 A | 8/2000 |
| JP | 000908033-0001 | 4/2008 |
| JP | 2011224076 A | 11/2011 |
| JP | 2012255466 A | 12/2012 |
| KR | 910017828 U | 11/1991 |
| KR | 2019910017828 U | 11/1991 |
| KR | 19970003567 B1 | 3/1997 |
| KR | 970032698 A | 7/1997 |
| KR | 100239165 B1 * | 1/2000 ............. A47L 9/242 |
| KR | 1020060128415 A | 12/2006 |
| KR | 2020120008906 U | 12/2012 |
| VG | 002275271-0005 | 7/2015 |
| WO | DM/020034-1 | 9/1991 |

(56) References Cited

FOREIGN PATENT DOCUMENTS

| | | |
|---|---|---|
| WO | DM/022372-3 | 5/1992 |
| WO | WO9935952 A1 | 7/1999 |
| WO | 0100078 A1 | 1/2001 |
| WO | DM/059456-8 | 5/2002 |
| WO | WO2003001958 A1 | 1/2003 |
| WO | DM/070542-1 | 4/2009 |
| WO | DM/070542-2 | 4/2009 |
| WO | WO2009144425 A2 | 12/2009 |
| WO | WO2013102752 A2 | 7/2013 |
| WO | WO2014128445 A1 | 8/2014 |
| WO | DM/080580-3 | 4/2015 |
| WO | DM/080580-4 | 4/2015 |
| WO | WO2015044489 A1 | 4/2015 |
| WO | DM/081351-5 | 7/2015 |
| WO | DM/081351-6 | 7/2015 |
| WO | WO2015176561 A1 | 11/2015 |
| WO | WO2017196336 A1 | 11/2017 |
| WO | DM/090091-1 | 3/2018 |
| WO | DM/090091-2 | 3/2018 |
| WO | DM/101130-1 | 6/2018 |
| WO | DM/101130-2 | 6/2018 |
| WO | DM/101130-3 | 6/2018 |
| WO | WO2018184390 A1 | 10/2018 |
| WO | WO2020109118 A1 | 6/2020 |

OTHER PUBLICATIONS

Welcome to Rubber and Plastics; https://web.archive.org/web/20180807190339/http://rubberplastics.com/; Jul. 8, 2018 (Year: 2018).*
USA-Clean, "Vacuum Cleaner Magnet Strip, BBMC12, 12" Length" <https://www.amazon.com/Vacuum-Cleaner-Magnet-BBCM12-Length/dp/B00EUKLLTK> web page visited Aug. 2, 2021.
Bissell, "Bissell 1611322 Crevice Tool with Brush," <https://evacuumstore.com/p-29707-bissell-1611322-crevice-tool-with-brush.aspx?utm_source=google_shopping&utm_medium=cpc&utm_campaign=Bissell+-+Shopping&utm_term=shopping&utm_content=sm78l4D8w_pcrid_99132577509_pkw_pmt_pdv_c_slid_product_29707-32456--_ pgrid_27170232069_ptaid_pla-525227540342_&gclid=EAIaIQobChMIwqvH8t6z6AIVmpOzCh1OjQ7VEAkYByABEgL52fD_BwE> web page visited Aug. 2, 2021.
Bissell, "Bissell 1606618 Combo Crevice and Dusting Brush Tool," <https://evacuumstore.com/p-29787-bissell-1606618-combo-crevice-and-dusting-brush-tool.aspx?gclid=EAIaIQobChMIwqvH8t6z6AIVmpOzCh1OjQ7VEAkYCCABEgLBw_D_BwE> web page visited Aug. 2, 2021.
Shark, "Duster Crevice Tool #189FLI680; for Shark Rotator Powered Lift-Away Speed Models NV680, NV682, NV683," <https://www.amazon.com/Crevice-189FLI680-Rotator-Powered-Lift-Away/dp/B01MXW0FY7> web page visited Aug. 2, 2021.
Dyson, "Combination Telescoping Dusting Brush Crevice Tool Dyson DC40/41/50/65 Vacuum," <https://www.walmart.com/ip/Combination-Telescoping-Dusting-Brush-Crevice-Tool-Dyson-DC40-41-50-65-Vacuum/626384159?wmlspartner=wmtlabs&adid=22222222222118136274&wmlspartner=wmtlabs&wl0=e&wl1=o&wl2=c&wl3=75247912775726&wl4=pla-4578847477317007:aud-807615483&wl5=&wl6=&wl7=&%20wl10=Walmart&wl12=626384159_10000002530&wl14=shark%20crevice%20dusting%20brush%20duster&veh=sem> web page visited Aug. 2, 2021.
Kenmore, "Kenmore Vacuum Combination Crevice Tool and Dusing Brush Combo KC88REDCZV06," <https://www.ezvacuum.com/kenmore-vacuum-combination-crevice-tool-and-dusting-brush-combo-kc88redczv06.html> web page visited Aug. 2, 2021.
Ridgid, "1-7/8 in. Crevice Tool Accessory for RIDGID Wet/Dry Shop Vacuums," <https://www.homedepot.com/p/RIDGID-1-7-8-in-Crevice-Tool-Accessory-for-RIDGID-Wet-Dry-Shop-Vacuums-VT1702/100638367?mtc=Shopping-VF-F_D25T-B-D25T-25_14_WET_DRY_VACS-EMERSON-NA-Feed-PLA-NA-NA-Ridgid_WetDryVacs&cm_mmc=Shopping-VF-F_D25T-B-D25T-25_14_WET_DRY_VACS-EMERSON-NA-Feed-PLA-NA-NA-Ridgid_WetDryVacs-71700000053108217-58700005097972241-92700044617866202&msclkid=89cc4d4862571f7c24ec1332049cef78&gclid=Clnpr5nzs-gCFSiNxQIddtoFIA&gclsrc=ds> web page visited Aug. 2, 2021.
Think Vacuums, "Universal Extendable Crevice Brush Attachment Set," <https://www.thinkvacuums.com/universal-extendable-crevice-brush-attachment-set.html?gclid=EAIaIQobChMlwqvH8t6z6AIVmpOzCh1OjQ7VEAkYCSABEgl8WvD_BwE> web page visited Aug. 2, 2021.
Shark, "Multi-Angle Dusting Brush," <https://www.sharkclean.com/parts/0/all/1297/multi-angle-dusting-brush/> web page visited Aug. 2, 2021.
Dayton, "Shop Vacuum Accessory Kit, for Hose Diameter 2 1/2 In," <https://www.grainger.com/product/4TB92?gclid=EAIaIQobChMII7Ss_-ez6AIVyf_jBx1rqgrCEAQYBSABEgl6cPD_BwE&cm_mmc=PPC:+Google+PLA&ef_id=EAIaIQobChMII7Ss_-ez6AIVyf_jBx1rqgrCEAQYBSABEgl6cPD_BwE:G:s&s_kwcid=AL!2966!3!281698275117!!!g!472467987775!> web page visited Aug. 2, 2021.
EZ Spares, "EZ Spares 25-inch Flexible Vacuum Crevice Attachment Crevice Tool Crevice Brush Kit for All 1-1/4" or 1-3/8" (32mm-35mm) Vacuum Hoses," <https://www.amazon.com/dp/B075K1M43V/ref=vp_d_ac_sub_lr_pd?_encoding=UTF8&pd_rd_i=B075K1M43V&pd_rd_w=AD02h&pf_rd_p=f329f52e-728b-4ea9-918a-c6366b1009ac&pf_rd_r=b6acd15d-689e-4bc7-af51-69072862d5e1&pd_rd_r=b6acd15d-689e-4bc7-af51-69072862d5e1&pd_rd_wg=dek8n&th=1> web page visited Aug. 2, 2021.
Dyson, "Dyson Vacuum Cleaner Crevice Combination Brush Tool," <https://www.buyspares.com/product.pl?pid=1648369&utm_source=google&utm_medium=base&utm_campaign=products&mkwid=sBBqIMUdm&pcrid=255610191298&kword=&match=&plid=&pdv=c&gclid=EAIaIQobChMI7-b7hOuz6AIVwoCfCh0Umwd8EAQYDCABEgJ3ifD_BwE> web page visited Aug. 2, 2021.
Hilti, "DD-WCS 500 V Wall Large Water Collector," <https://www.homedepot.com/p/Hilti-DD-WCS-500-V-Wall-Large-Water-Collector-2215477/311653323> web page visited Aug. 2, 2021.
DeWalt, "DWH050K Large Hammer Dust Extraction—Hole Cleaning," <https://www.dewalt.com/products/power-tools/dust-management/dust-extractors-and-vacs/large-hammer-dust-extraction--hole-cleaning/dwh050k> web page visited Aug. 2, 2021.
Shop-Vac, "Round Brush," <https://www.lowes.com/pd/Shop-Vac-1-5-in-Round-Brush-Lowe-s/1001267370> web page visited Aug. 2, 2021.
Miele, "Miele SUB20 Flexible Universal Brush," <https://www.thinkvacuums.com/miele-sub20-flexible-universal-brush.html> web page visited Aug. 2, 2021.
SEBO, "SEBO 1387GS Dusting Brush," <https://www.thinkvacuums.com/sebo-1387gs-dusting-brush.html> web page visited Aug. 2, 2021.
Heuseen, "Pet Grooming Brush Vacuum Cleaner Hoover Clean Attachment Tool," <https://www.amazon.com/Grooming-Vacuum-Cleaner-Hoover-Attachment/dp/B079J6Y2FZ> web page visited Aug. 2, 2021.
Ridgid, "1-1/4 in. to 2-1/2 in. Claw Nozzle Accessory for Wet/Dry Shop Vacuums," <https://www.homedepot.com/p/RIDGID-1-1-4-in-to-2-1-2-in-Claw-Nozzle-Accessory-for- RIDGID-Wet-Dry-Shop-Vacuums-VT2540/100391210> web page visited Aug. 3, 2021.
Ridgid, "Ridgid VT2534 6-Piece Auto Detailing Vacuum Hose Accessory Kit for 1 1/4 Inch Rigid Vacuums," <https://www.amazon.com/RIDGID-6-Piece-Detailing-Accessory-Vacuums/dp/B001FS4TWQ> web page visited Aug. 3, 2021.
VaccUFlex, "Wet/Dry Vacuum Attachment Kit VaccUflex," <https://www.amazon.com/VaccUFlex-vacuum-attachment-kit-VaccuFlex%C2%AE/dp/B006T8B8RQ> web page visited Aug. 3, 2021.
Milwaukee Tool, "M18 2-Gallon Wet/Dry Vacuum," <https://www.milwaukeetool.com/Products/Power-Tools/Vacuums-and-Fans/Wet-Dry-Vacuums/0880-20> web page visited Aug. 3, 2021.
Gadjit, "Gadjit Exten Vac Flat Vacuum Cleaner Attachment Hose Extender (Gray)—36" Reach Under Fridge and Heavy Furniture, Vacuums Up Dirt and Dust Bunnies, Great for Big and Small

(56) References Cited

OTHER PUBLICATIONS

Cleaning Projects," <https://www.amazon.com/Gadjit-Exten-Vacuum-Extension-Attachment/dp/B00L5KMPCU> web page visited Aug. 3, 2021.

Qualtex, "Replacement Multi-Angle Dust Brush Designed for Shark Vacuums," <https://www.amazon.com/Replacement-Multi-Angle-FlexiSoft-Dusting-32-35mm/dp/B07JVL1CXZ> web page visited Aug. 3, 2021.

Ridgid, "1-1/4 in. and 2-1/2 in. Spiral Flexible Crevice Tool Accessory for Rigid Wet/Dry Shop Vacuums," <https://www.homedepot.com/p/RIDGID-1-1-4-in-and-2-1-2-in-Spiral-Flexible-Crevice-Tool-Accessory-for-RIDGID-Wet-Dry-Shop-Vacuums-VT2532/205209250> web page visited Aug. 3, 2021.

Fullclean, "Combination Tool Compatible with Dyson V11 V10 V8 V7 Absolute Animal Motorhead Trigger Cyclone Fluffy Outsize Torque Drive Car+Boat Vacuum Cleaner," <https://www.amazon.com/Fullclean-Combination-Compatible-Absolute-Motorhead/dp/B07HKYST86> web page visited Aug. 3, 2021.

Milwaukee Tool, "Milwuakee Dry Coring Dust Extraction Attachment 5319-DE," <https://www.amazon.com/MILWAUKEE-Coring-Extraction-Attachment-5319/dp/B07YKWY4B1> web page visited Aug. 3, 2021.

Ridgid, "2-1/2 in. Locking Accessory Round Dusting Brush for Wet/Dry Vacs," <https://www.homedepot.com/p/RIDGID-2-1-2-in-Locking-Accessory-Round-Dusting-Brush-for-Wet-Dry-Vacs-LA2501/304753663> web page visited Aug. 3, 2021.

Ridgid, "1-7/8 in. Floor Brush Accessory for Rigid Wet/Dry Shop Vacuums," <https://www.homedepot.com/p/RIDGID-1-7-8-in-Floor-Brush-Accessory-for-RIDGID-Wet-Dry-Shop-Vacuums-VT1714/202507706> web page visited Aug. 3, 2021.

VacSure, "VacSure Pet Hair Brush Grooming Tool for Dog & Cat, Vacuum Nozzle Attachment," <https://www.amazon.com/dp/B0747V37HY> web page visited Aug. 3, 2021.

Ryobi, "P718 Vacuum Accessory Kit and Replacement Filter Assembly for Ryobi Stick Vacuum Cleaner (4-piece)," <https://www.homedepot.com/p/RYOBI-P718-Vacuum-Accessory-Kit-and-Replacement-Filter-Assembly-for-RYOBI-Stick-Vacuum-Cleaner-4-Piece-A32SV02-A32SV04/308973492> web page visited Aug. 3, 2021.

Miele, "SFD 20," <https://www.mieleusa.com/e/flexible-crevice-nozzle-sfd-20-7252100-p> web page visited Aug. 3, 2021.

Shop-Vac, "Shop-Vac 9017900 1 1/4-Inch Flexible Crevice Tool," <https://www.amazon.com/Shop-Vac-9017900-4-Inch-Flexible-Crevice/dp/B00F1BYJSC/ref=cm_cr_arp_d_product_top?ie=UTF8> web page visited Aug. 3, 2021.

Greenlee, "Power Fishing System Accessory Kit," <https://www.greenlee.com/us/en/accessory-kit-blower-392?w=2&c=159&b=86&r=30&p=1&l=4&v=c> web page visited Aug. 3, 2021.

Shop-Vac, "Shop-Vac 9064500 i.5-Inch Crevice Tool," <https://www.amazon.com/Shop-Vac-9064500-1-5-Inch-Crevice-Tool/dp/B001AMXSSI > web page visited Aug. 10, 2021.

Shark, "Anti-Allergen Dust Brush," <https://www.sharkclean.com/parts/0/all/1862/anti-allergen-dust-brush/> web page visited Aug. 10, 2021.

Dyson, "Genuine Dyson DC16, 24, 31, 34, 35, 44, 56, 58, 59 Combination Tool #914361-01," <https://www.amazon.com/Genuine-Dyson-DC16-Combination-914361-01/dp/B00LZUAF50> web page visited Aug. 10, 2021.

Shop-Vac, "Shop Vac Utility Cleaning Kit," <https://shop-vacs-com.3dcartstores.com/utility-cleaning-kit.html> web page visited Aug. 10, 2021.

Shop-Vac, "Shop-Vac 9196100 Claw Utility Nozzle, For: 1-1/4 in, 1-1/2 in ad 2-1/2 in Dia Hoses," <https://www.mclendons.com/2721510/product/Shop-Vac-9196100> web page visited Aug. 10, 2021.

International Search Report and Written Opinion for Application No. PCT/US2020/039679 dated Oct. 13, 2020 (15 pages).

International Search Report and Written Opinion for Application No. PCT/US2020/039652 dated Oct. 7, 2020 (12 pages).

Ridgid, "1-7/8" Utility Nozzle Accessory for Rigid Wet/Dry Shop Vacuums," <https://www.homedepot.com/p/RIDGID-1-7-8-in-Utility-Nozzle-Accessory-for-RIDGID-Wet-Dry-Shop-Vacuums-VT1709/100638351> Web page publicly available at least as early as Jun. 19, 2020.

Chinese Patent Office Action for Application No. 202090000674.0 dated Apr. 12, 2022 (2 pages including statement of relevance).

Partial Supplementary European Search Report for Application No. 20830650.6 dated Jun. 23, 2023 (13 pages).

Partial Supplementary European Search Report for Application No. 20832517.5 dated Dec. 8, 2023 (13 pages).

Extended European Search Report for Application No. 20832517.5 dated Feb. 29, 2024 (12 pages).

European Patent Office Action for Application No. 20832517.5 dated Oct. 4, 2024 (6 pages).

Shark Home, "Duster Crevice Tool—Shark® Rocket® Complete," <https://www.youtube.com/watch?v=DQNW6AqGWNM> youtube video published Apr. 4, 2017 (5 pages).

Shark, "Navigator® Pet Plus Upright Vacuum," NV250 Series Owner's Guide, © 2018 (9 pages).

Shop-Vac, "Shop-Vac 9196000 Inflator Nozzle, Ideal For Inflatable Items, Easy To Attach And Use, Fits 1.25 Inc and 2.5 Inch Diameter Hoses," <https://www.amazon.com/Shop-Vac-9196000-Inflator-Nozzle/dp/B000HJ94ZQ> web page visited Apr. 24, 2025 (9 pages).

European Patent Office Action for Application No. 20832517.5 dated Mar. 31, 2025 (5 pages).

* cited by examiner

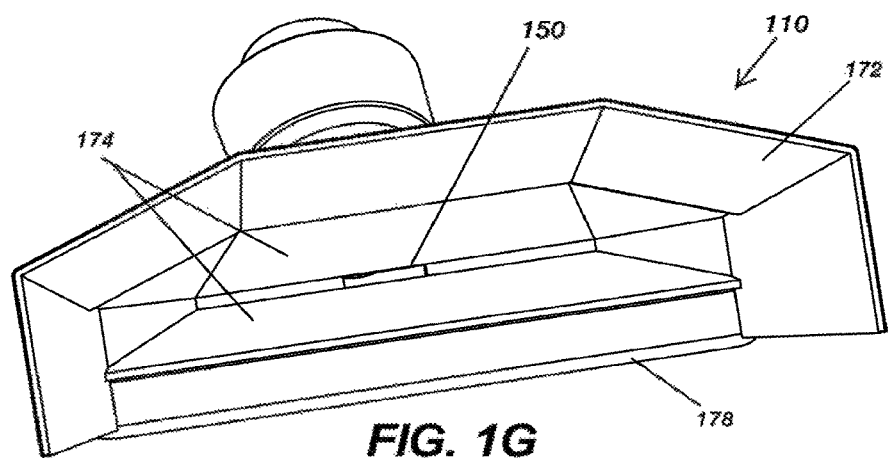
FIG. 1G
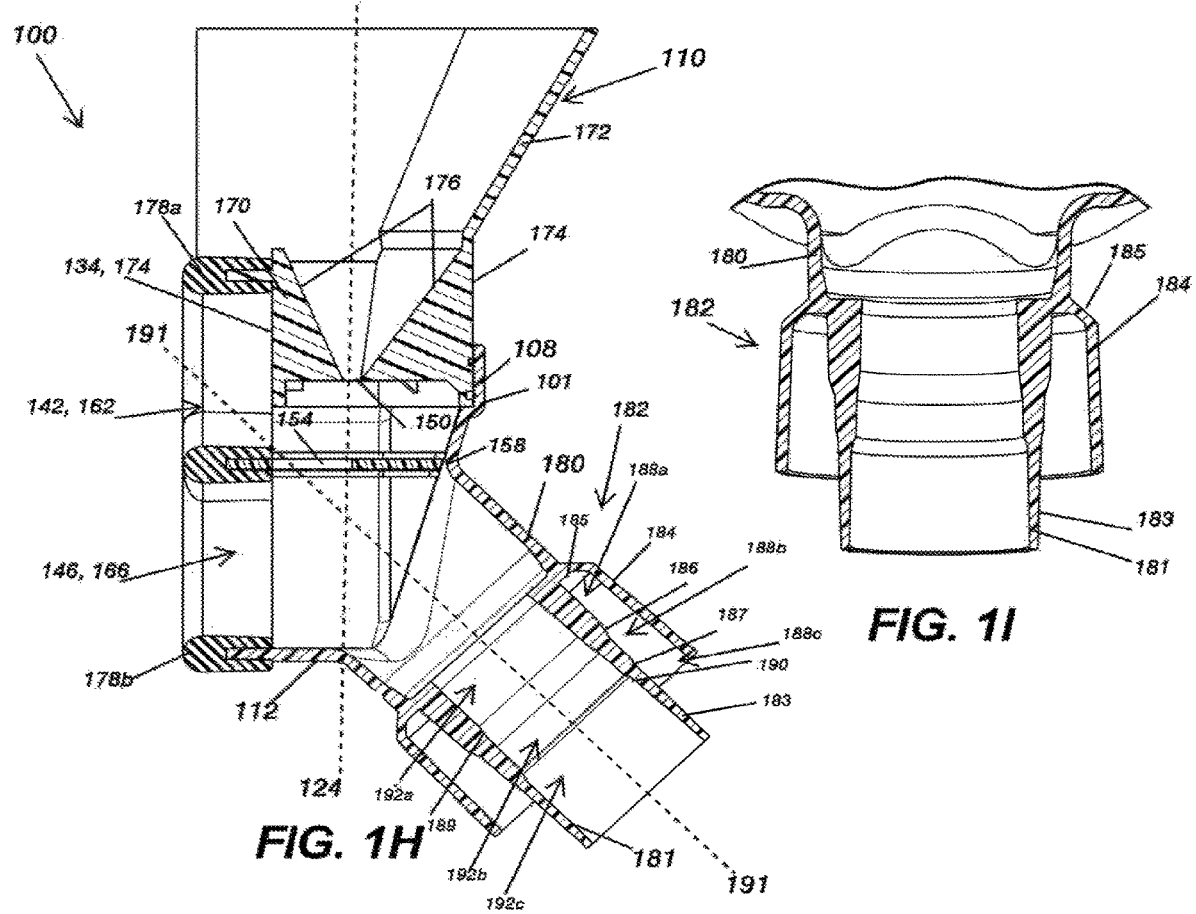
FIG. 1H  FIG. 1I

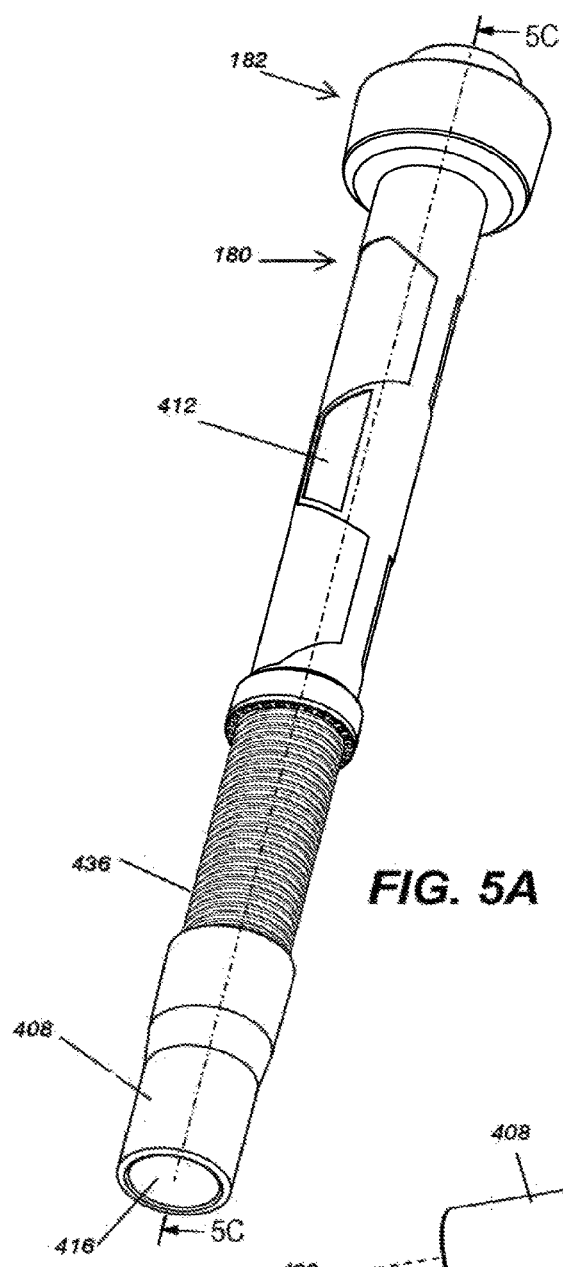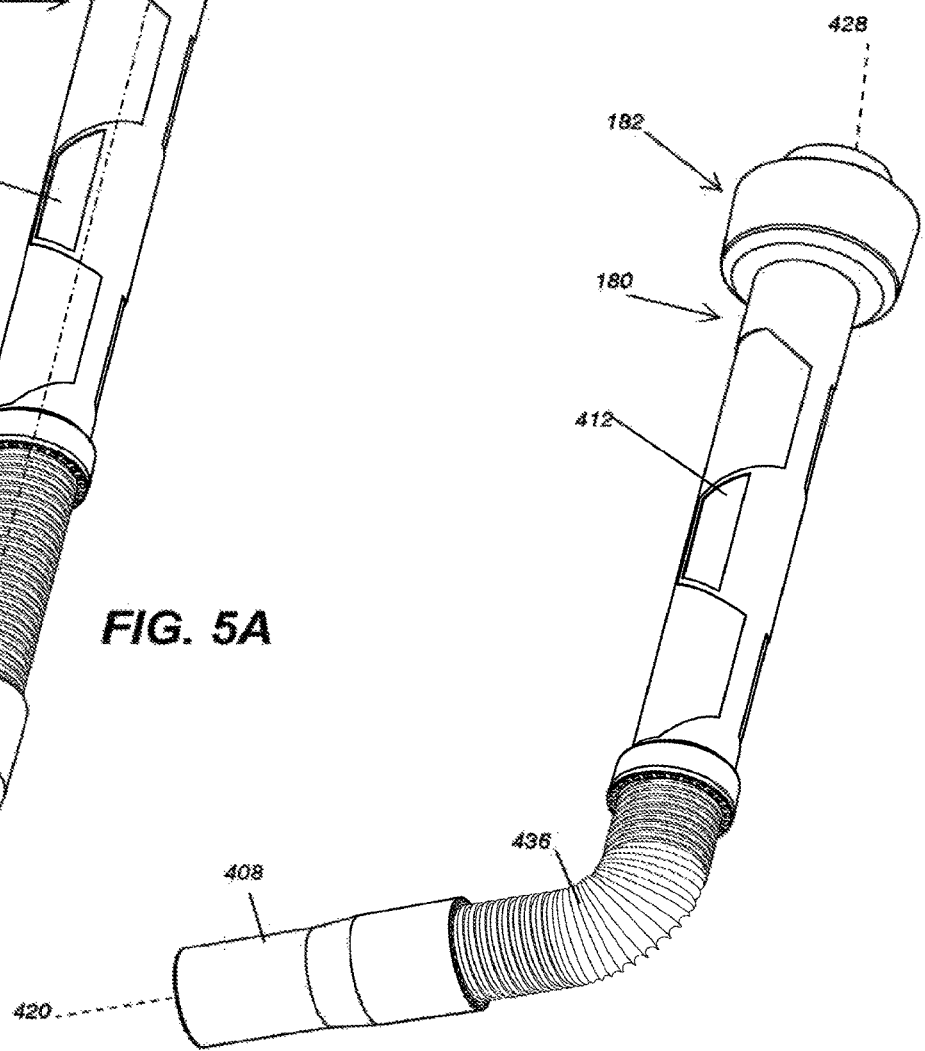
FIG. 5A
FIG. 5B

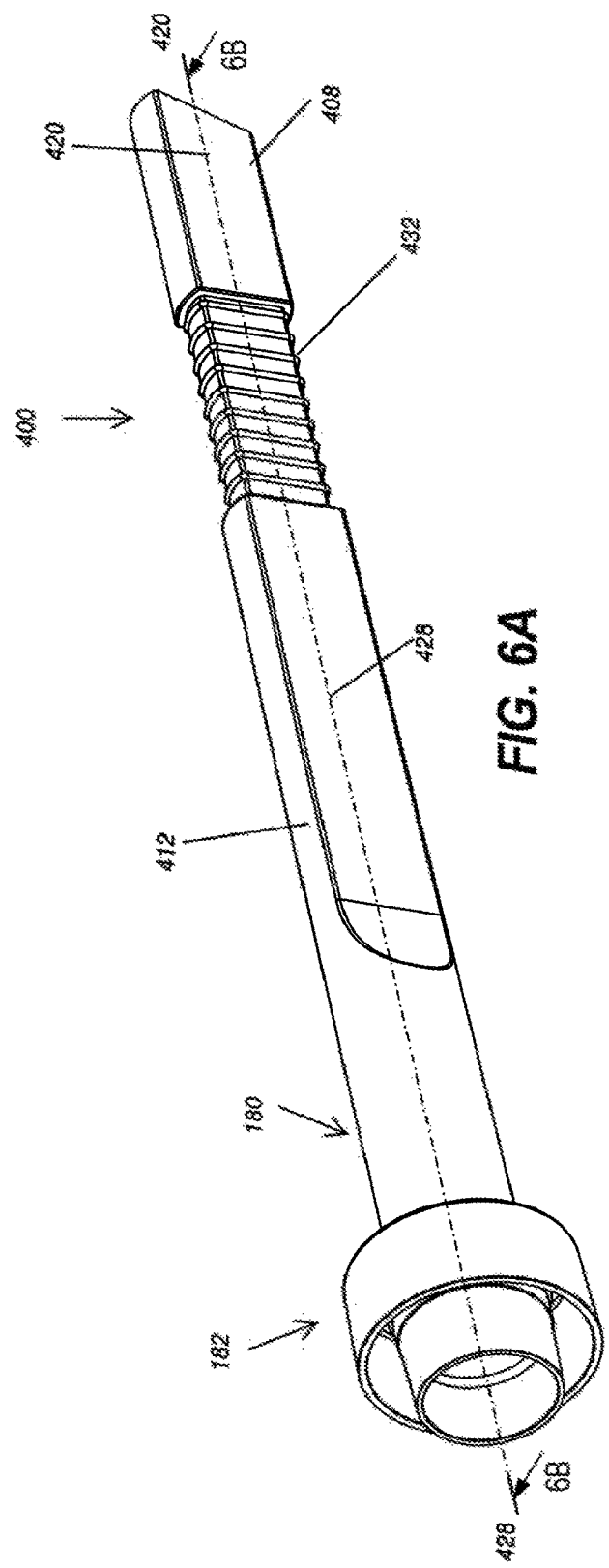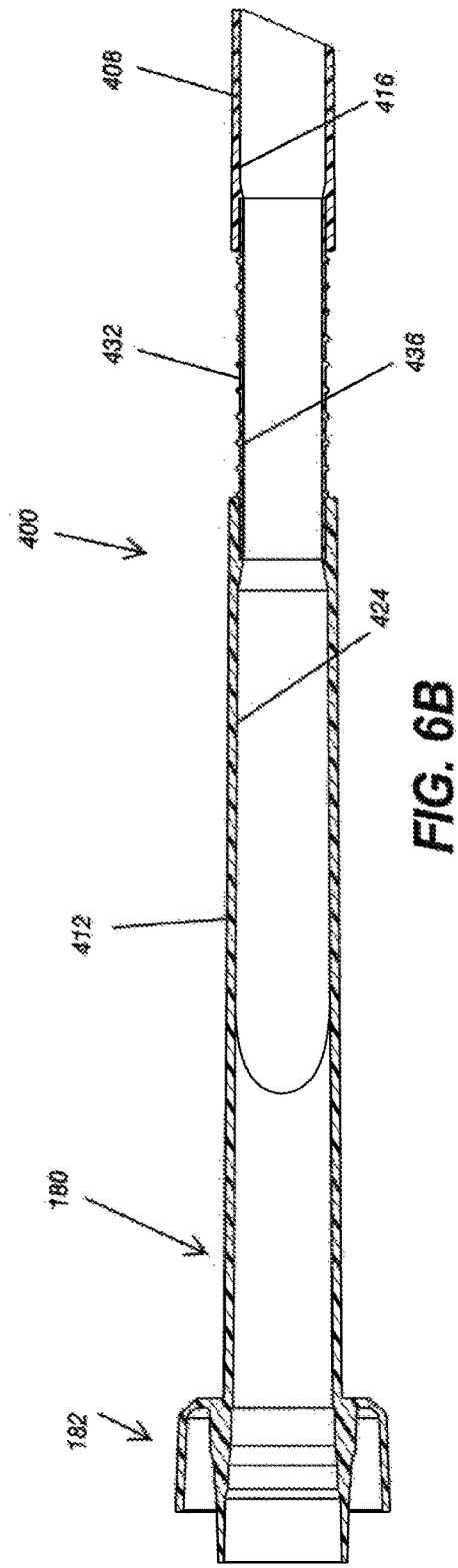

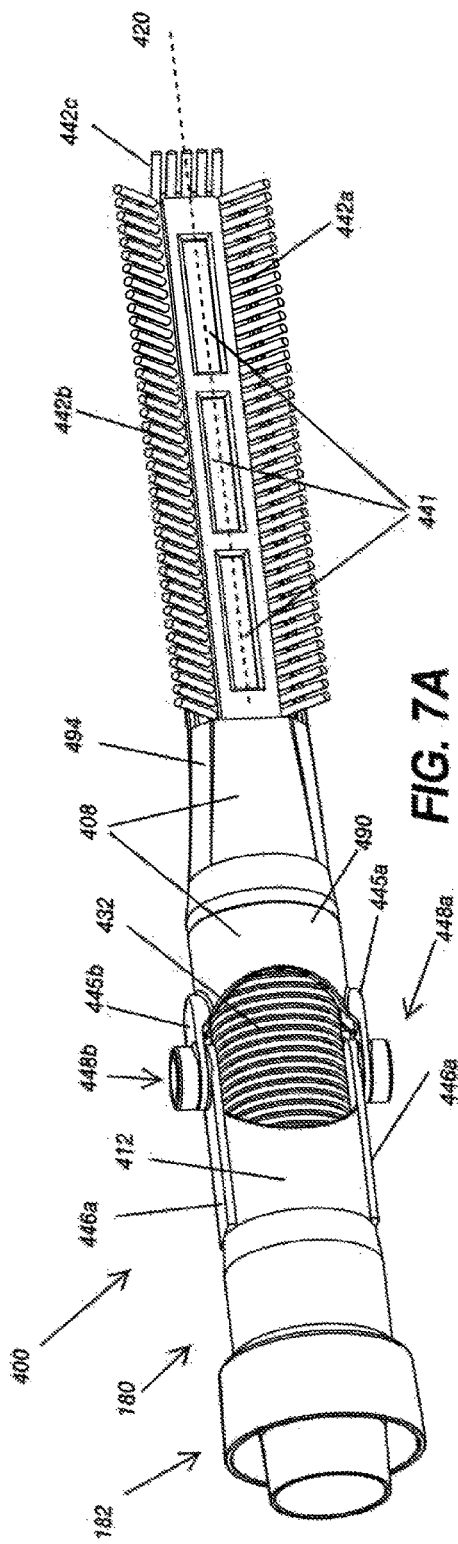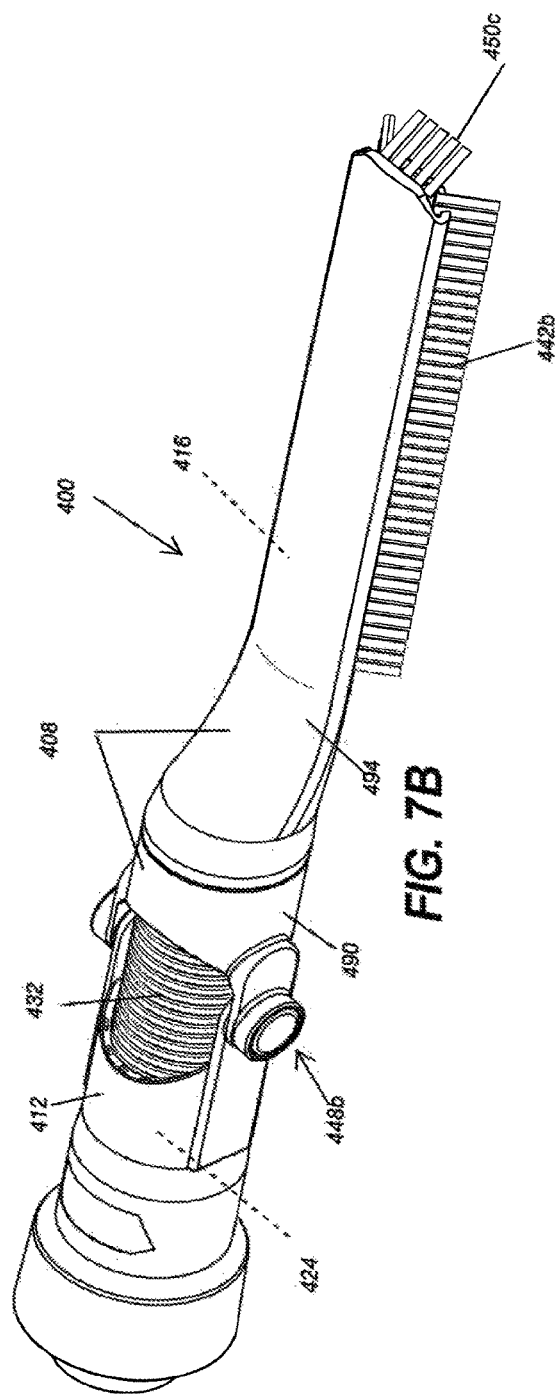
FIG. 7A
FIG. 7B

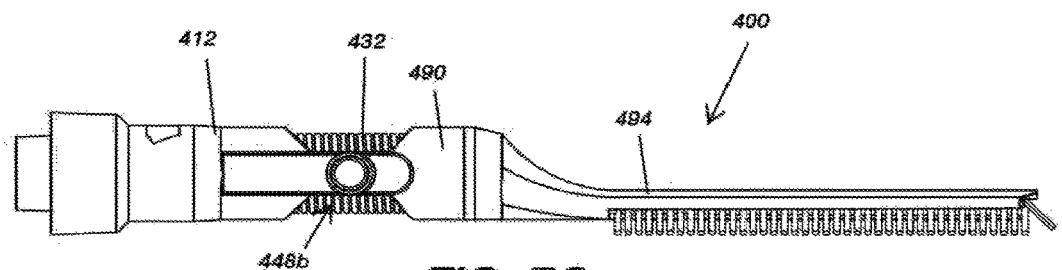
FIG. 7C
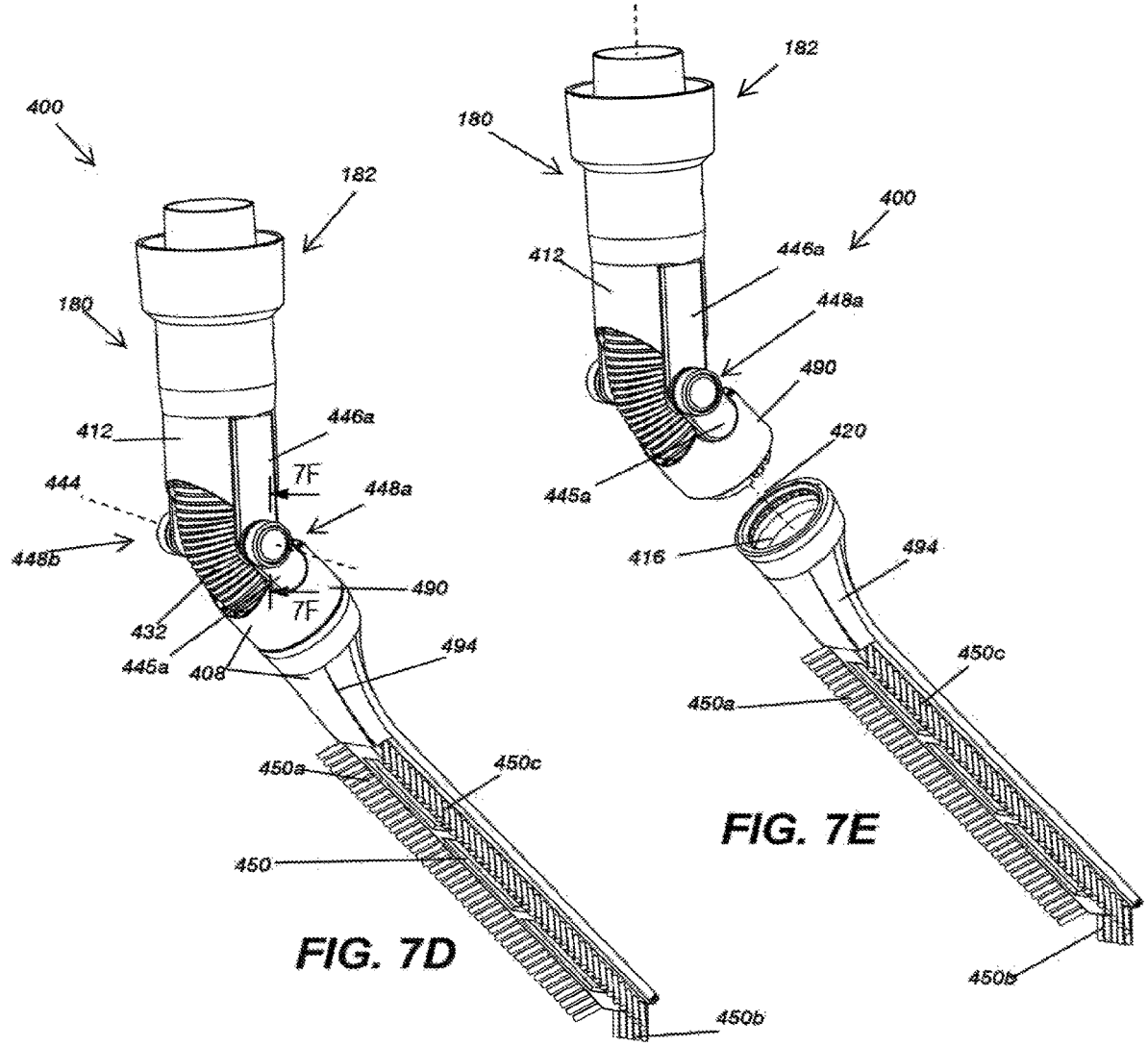
FIG. 7D
FIG. 7E

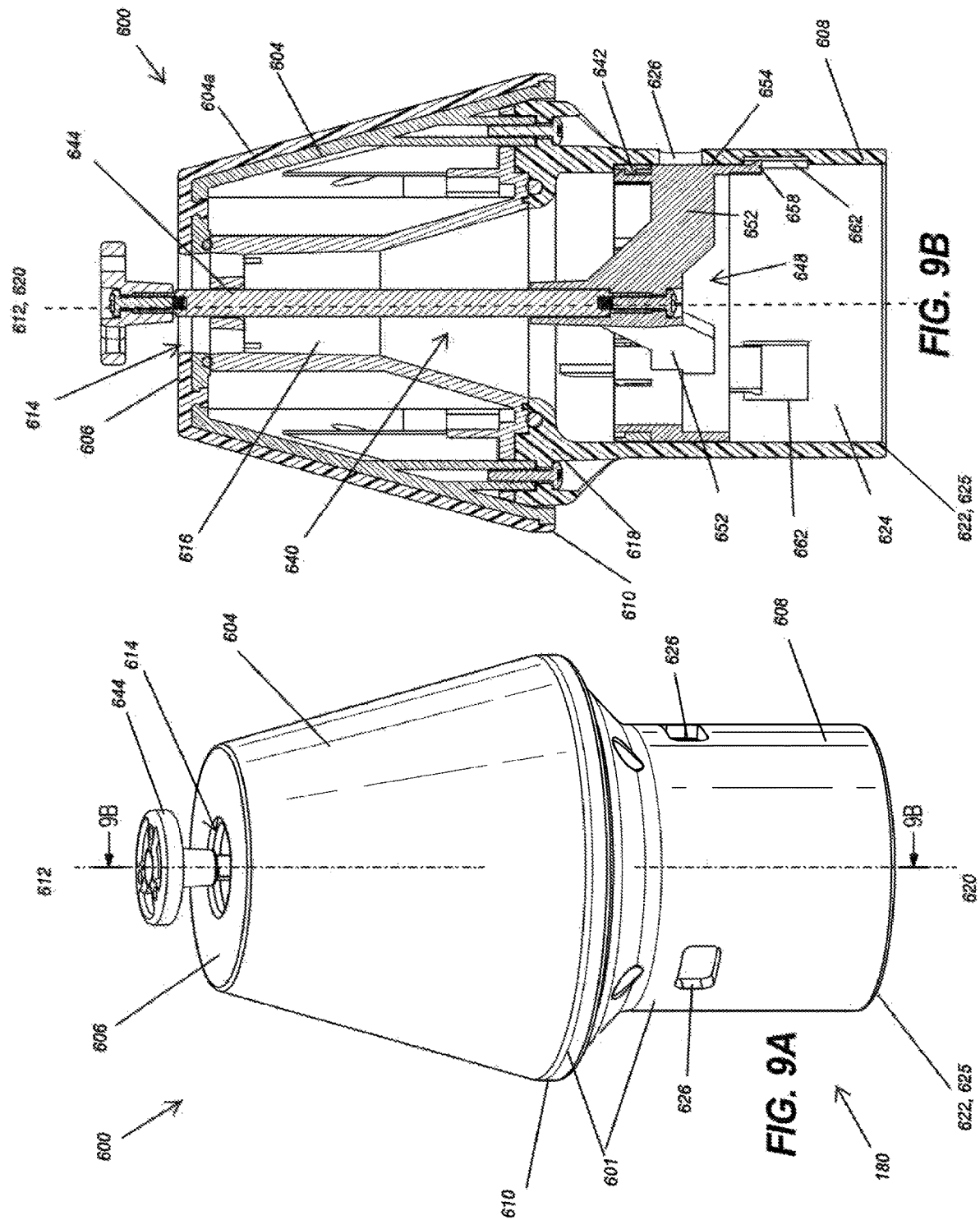

VACUUM TOOLS

CROSS-REFERENCE TO RELATED APPLICATIONS

This application is a continuation application of U.S. non-provisional application Ser. No. 17/621,000, filed Dec. 20, 2021, which is a national phase application of international patent application no. PCT/US2020/039679, filed Jun. 25, 2020, which claims priority to U.S. provisional application No. 62/866,883, filed Jun. 26, 2019, U.S. provisional application No. 62/955,070, filed Dec. 30, 2019, U.S. provisional application No. 62/980,041, filed Feb. 21, 2020, and U.S. provisional application No. 63/000,656, filed Mar. 27, 2020, the entire contents of all of which are incorporated by reference herein.

FIELD

This application relates to vacuum tools for use in different applications and work environments.

SUMMARY

In some embodiments, the present disclosure relates to a vacuum tool configured to be removably coupled to a hose or wand of a vacuum. The vacuum tool comprises a first portion including a first axis and a first aperture oriented along the first axis; a second portion including a second axis and a second aperture oriented along the second axis, the second portion including a connection portion that is configured to be coupled to a hose or wand of a vacuum; a flexible portion coupled between the first portion and the second portion, the flexible portion including a third aperture that is in fluid communication between the first and second apertures; and a mechanical joint coupled between the first portion and the second portion. The mechanical joint has a first recess and a second recess and a first detent that is configured to be selectively received in the first recess and the second recess. The first portion is movable between a first orientation relative to the second portion in which the first axis is positioned at a first angle relative to the second axis and a second orientation relative to the second portion in which the first axis is positioned at a second angle relative to the second axis. The first detent of the mechanical joint is configured to be selectively received in the first recess to hold the first and second portions in the first orientation and to be selectively received in the second recess to hold the first and second portions in the second orientation. The first portion defines an inlet in communication with the first aperture and the connection portion defines an outlet in communication with the second aperture such that the inlet is in communication with the outlet.

In some embodiments, the present disclosure relates to a vacuum tool configured to be removably coupled to hose or wand of a vacuum. The vacuum tool comprises a first portion including a first end, a second end opposite the first end, and a first aperture extending between the first end and the second end, the first portion defining a first outer surface on a first side having a concave shape and a second outer surface on a second side opposite the first side and having a convex shape. The vacuum tool also comprises a second portion including a second aperture and a connection portion that is configured to be coupled to a hose or wand of a vacuum, the second portion rotatably coupled to the second end of the first portion such that the first aperture is in fluid communication with the second aperture. The first aperture defines a debris inlet at the first end of the first portion and the second aperture defines a debris outlet in fluid communication with the debris inlet.

In some embodiments, the present disclosure relates to a vacuum tool configured to be removably coupled to hose or wand of a vacuum. The vacuum tool comprises a body having an inlet at a first end of the body, wherein the inlet is configured to be received within a conduit or pipe, a connection portion at a second end of the body opposite the first end, wherein the connection portion defines an outlet in fluid communication with the inlet and the connection portion is configured to be coupled to a hose or wand of a vacuum, and an indicator opening extending through the body. The vacuum tool also comprises an indicator supported by the body, the indicator being movable between a first position in which the indicator is spaced apart from the indicator opening and a second position in which the indicator is aligned with the indicator opening. The vacuum tool is configured to draw a conduit piston through the conduit or pipe when the inlet is received within the conduit or pipe and suction generated by the vacuum is applied to the conduit or pipe. The indicator is configured to move from the first position to the second position when the conduit piston contacts and actuates the indicator.

BRIEF DESCRIPTION OF THE DRAWINGS

FIG. 1G illustrates another perspective view of the vacuum tool of FIG. 1E.

FIG. 1H illustrates a cross-sectional view of the vacuum tool of FIG. 1E of the vacuum tool of FIG. 1E along the line 1H-1H of FIG. 1F.

FIG. 1I illustrates a cross-sectional view of the vacuum tool of FIG. 1E along the line 1I-1I of FIG. 1E.

FIG. 5A illustrates a perspective view of a vacuum tool according to another embodiment in a first position.

FIG. 5B illustrates another perspective view of the vacuum tool of FIG. 5A in a second position.

FIG. 6A illustrates a perspective view of a vacuum tool according to another embodiment in a first position.

FIG. 6B illustrates a cross-sectional view of the vacuum tool of FIG. 5A along the line 6B-6B of FIG. 6A.

FIG. 7A illustrates a perspective view of a vacuum tool according to another embodiment in a first position, the vacuum tool including a mechanical joint and a removable portion.

FIG. 7B illustrates another perspective view of the vacuum tool of FIG. 7A in the first position.

FIG. 7C illustrates a side view of the vacuum tool of FIG. 7A in the first position.

FIG. 7D illustrates a perspective view of the vacuum tool of FIG. 7A in a first position.

FIG. 7E illustrates a partially exploded perspective view of the vacuum tool of FIG. 7A.

FIG. 9A illustrates a perspective view of a vacuum tool according to another embodiment.

FIG. 9B a cross-sectional view of the vacuum tool of FIG. 9A along the line 9B-9B of FIG. 9A.

DETAILED DESCRIPTION

Figure 1A:
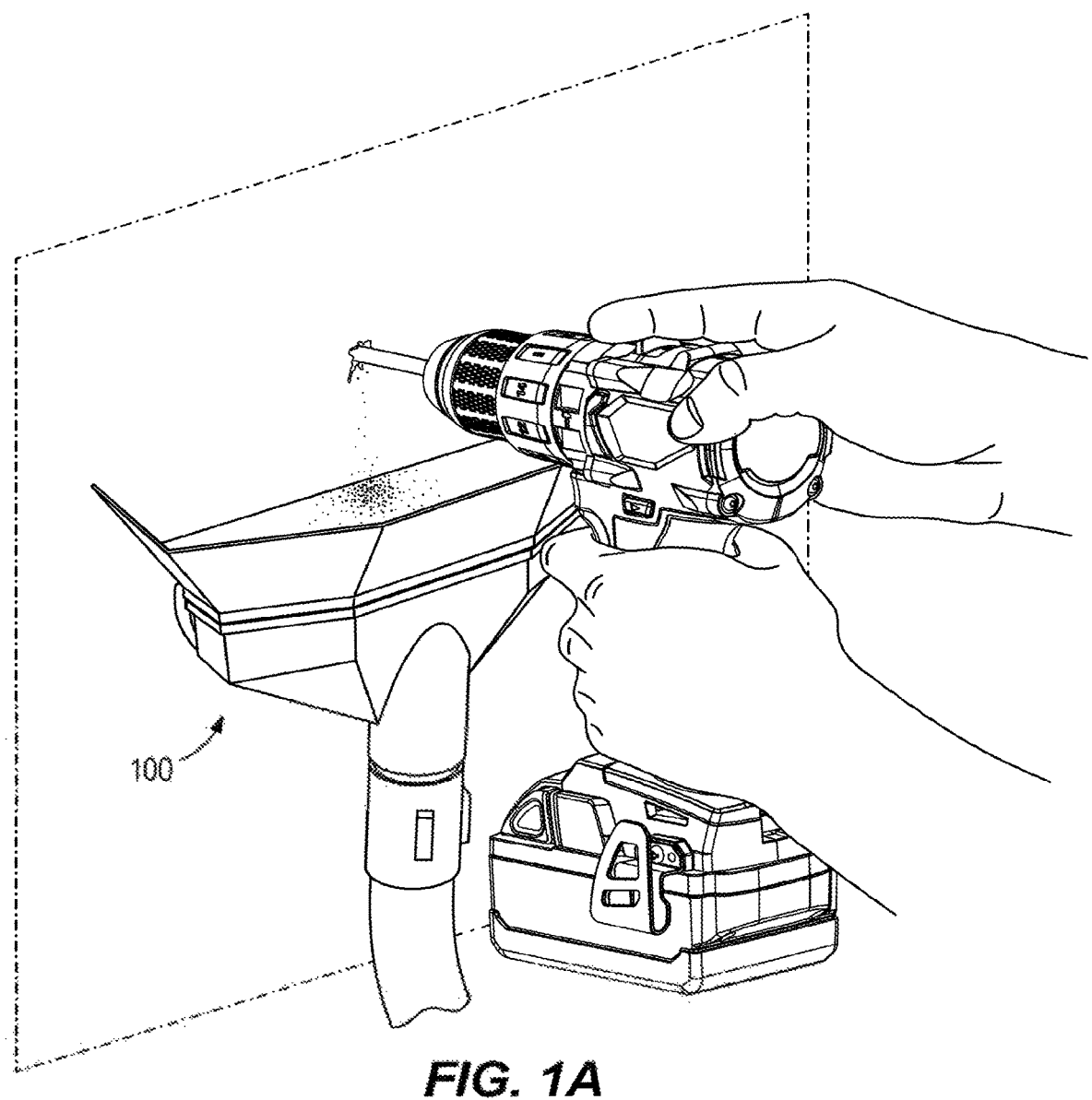
FIG. 1A illustrates a perspective view of the vacuum tool according to one embodiment.
Figure 1B:
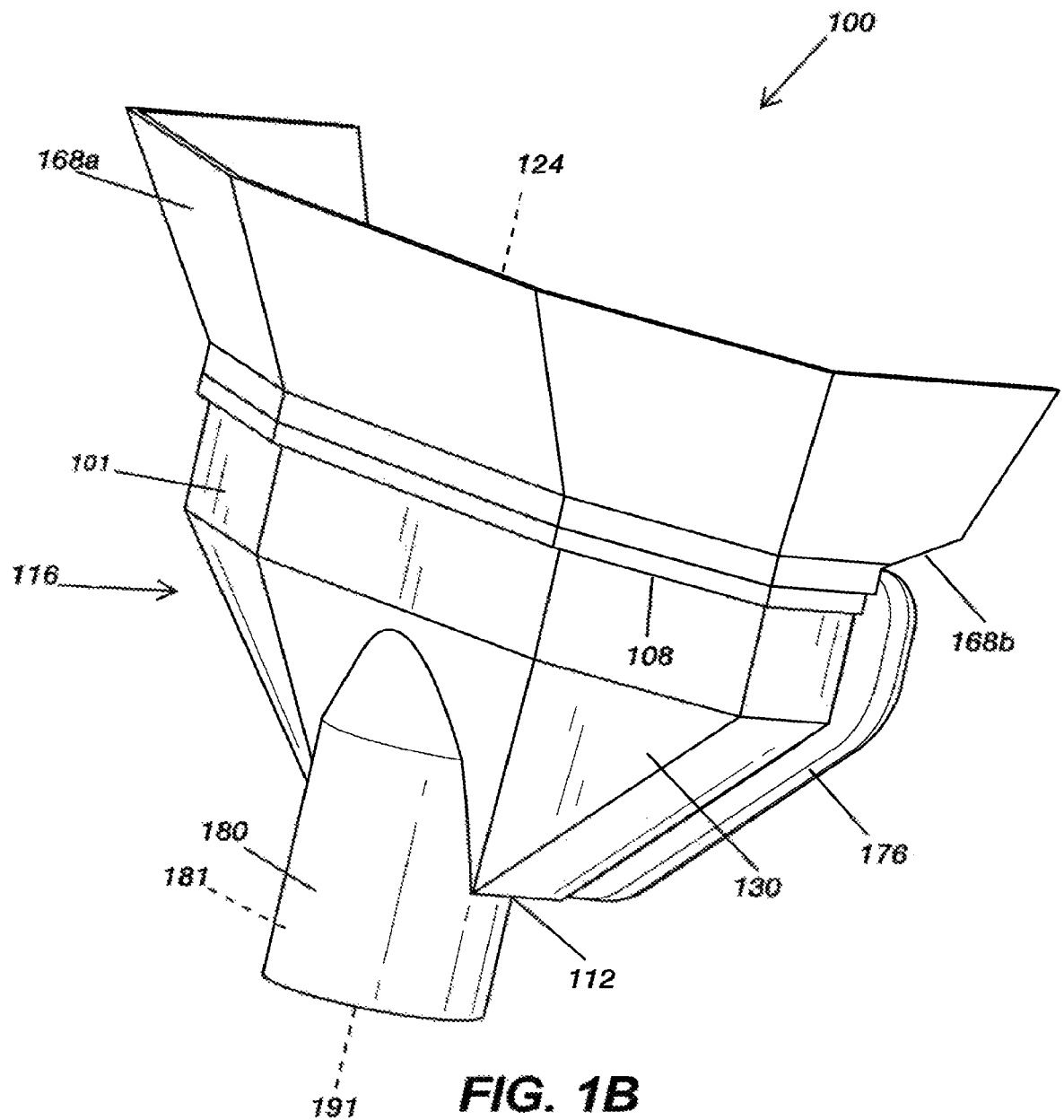
FIG. 1B illustrates a perspective view of the vacuum tool of FIG. 1A.

Before any embodiments are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways. It should be understood that the description of specific embodiments is not intended to limit the disclosure from covering all modifications, equivalents and alternatives falling within the spirit and scope of the disclosure as defined in the appended claims. Also, it is to be understood that the phraseology and terminology used herein is for the purpose of description and should not be regarded as limiting. For example, use of relative directional terms such as "right,' "left," "front," "back," "lower," "upper," "over," "under," "up," "down," "top," "bottom," "vertical," and "horizontal," "left," "right," as well as derivatives of such terms (e.g., "downwardly" and "upwardly") should be construed to refer to exemplary orientation as then described or as shown in the drawing under discussion. These relative terms are for convenience of description and do not require that the apparatus be constructed or operated in a particular orientation.

The disclosure herein illustrates and describes a variety of vacuum tools for use in different applications and work environments. Each of the vacuum tools is capable of being removably coupled to a hose or wand that is attached to a vacuum cleaner (hereinafter the "vacuum") configured for use, for example, at a worksite or similar environment. Each of the vacuum tools illustrated and described herein may include a universal coupler, which will be discussed in greater detail below. It should be understood that any of the embodiments shown and described herein may include the universal coupler, even if not explicitly shown or discussed.

FIGS. 1A-1K illustrate a vacuum tool 100 which uses the suction force generated by the vacuum to hold the tool 100 to a work surface, such as a wall. The vacuum generated suction also collects airborne and other dust and debris, such as may be created at a worksite.

The exemplary embodiments of the vacuum tool 100 of FIGS. 1A-1K include a body 101 having a first end 108, a second end 112 opposite the first end 108, a first side 116, a second side 120 opposite the first side 116, and a longitudinal axis 124 extending between the first end 108 and the second end 112. The body 101 further includes a first wall 130, a second wall 134, and a third wall 138. The first wall 130 extends between and may be integrally formed with or otherwise coupled to the first end 108 and the second end 112, and is configured to define a cavity that extends between the first end 108 and the second end 112. At least a portion of the first wall 130 defines the first side 116. The second wall 134 extends from and may be integrally formed with or otherwise coupled to the first end 108. The third wall 138 may be integrally formed with or otherwise coupled to the interior surface of the first wall 130 and extends between the first side 116 and the second side 120. The third wall 138 is oriented perpendicular to the longitudinal axis 124. The third wall 138 separates an interior of the body 101 into a first region 142 and a second region 146.

Figure 1C:
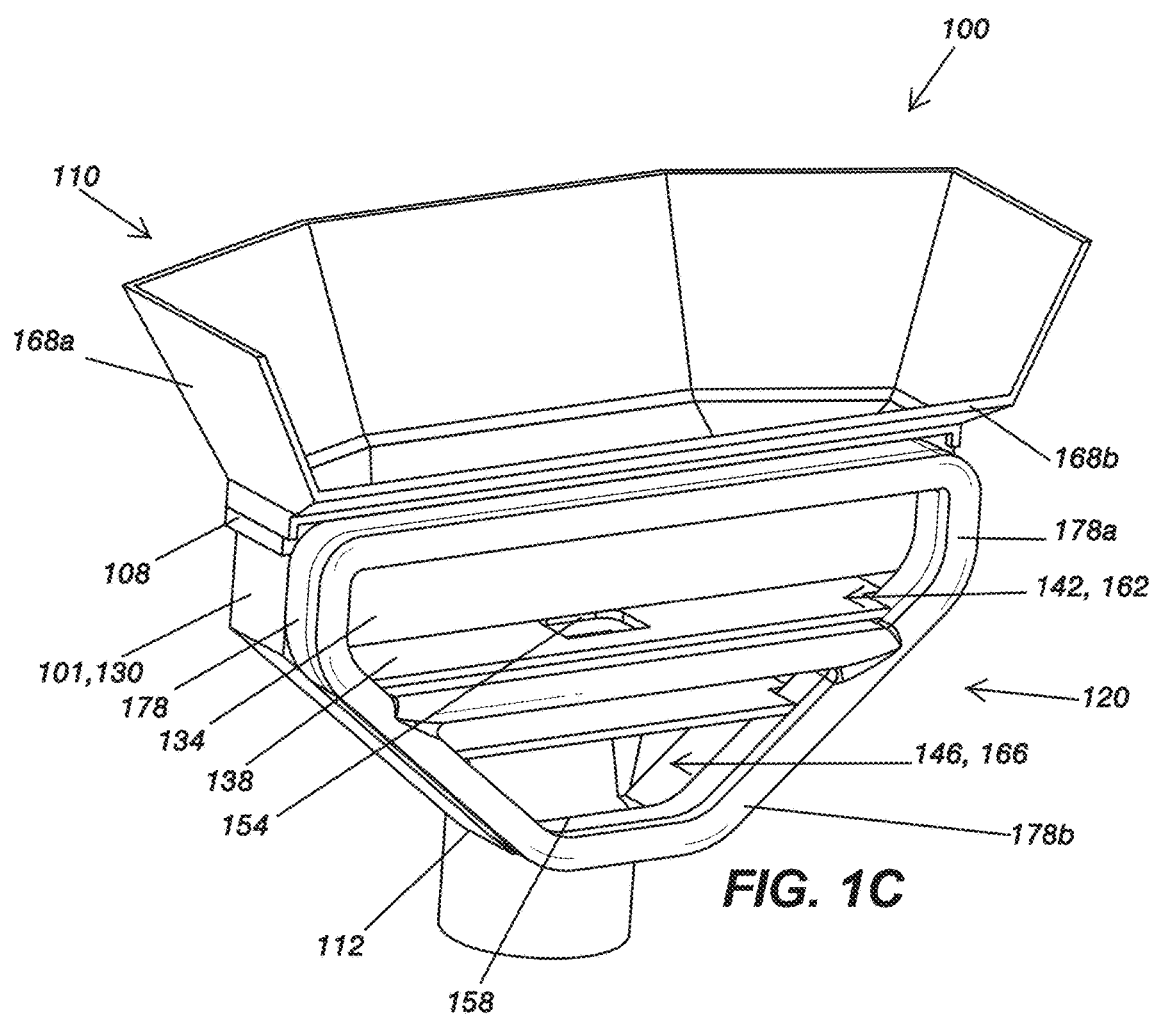
FIG. 1C illustrates another perspective view of the vacuum tool of FIG. 1A.
Figure 1D:
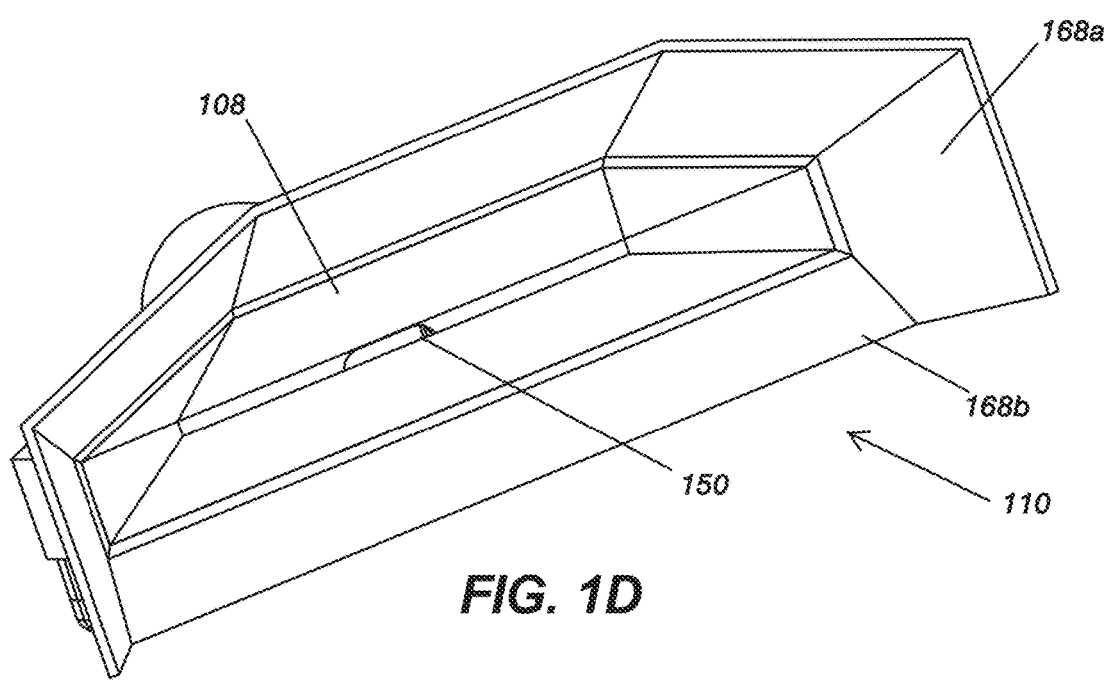
FIG. 1D illustrates another perspective view of the vacuum tool of FIG. 1A.

In the embodiment illustrated in FIGS. 1A-1D, the first end 108 at least partially defines a funnel 110. Additionally, the second wall 134 may also at least partially define the funnel 110. Looking downward into the funnel 110 toward the first end 108, a first aperture 150 is formed in the first end 108 and extends therethrough. Although a single elongate aperture 150 is shown in FIGS. 1A-1I, in other embodiments (such as FIG. 1K), there may be a plurality of first apertures 150. As shown in FIGS. 1C and 1F, the third wall 138 defines a second aperture 154 extending therethrough, and the second end 112 defines a third aperture 158 extending therethrough. In other embodiments, the third wall 138 may be omitted such that the interior of the body 101 defines a single region (see FIG. and 1K). In still other embodiments, other walls may divide the interior of the body 101 into more than two regions.

The first aperture 150 defines an inlet that provides fluid communication between an exterior of the body 101 and the first region 142. The second aperture 154 provides fluid communication between the first region 142 and the second region 146. The third aperture 158 provides fluid communication between the second region 146' and the vacuum. The first, second, and third apertures 150, 154, 158 may be at least partially aligned (FIGS. 1C, 1F, 1G, and 1H) along a first axis that is parallel to the longitudinal axis 124. The first and second apertures 150, 154 may be at least partially aligned along a first axis that is parallel to the longitudinal axis 124, while the third aperture 158 is offset from the first axis. In another embodiment shown in FIGS. 1E, 1F, and 1H, the third aperture 158 is angled relative to the longitudinal axis 124. In the embodiment of FIGS. 1J and 1K, the third aperture 158 extends at least partially along an axis that is perpendicular relative to the longitudinal axis 124. The first aperture 150 may be smaller than the second aperture 154, and the second aperture 154 may be smaller than the third aperture 158. The first region 142 has a first opening 162 defined between the first end 108 and the third wall 138. The second region 146 has a second opening 166 defined between the third wall 138 and the second end 112. The first and second openings 162, 166 are positioned on the second side 120.

In the embodiment of FIGS. 1A-1D, the funnel 110 is at least partially defined by a distal wall (e.g., a skirt) that extends from the first end 108. In the embodiment of FIGS. 1A-1D, the skirt includes a first portion 168a that has a first dimension or length and a second portion 168b that has a second dimension or length that is less than the first dimension. That is, at least a portion of the skirt is of a smaller dimension (e.g., length) than the rest of the skirt. The second portion 168b of the skirt forms a ledge extending outwardly from the first end 108.

In the embodiment of FIGS. 1E-1I, the funnel 110 includes a first portion 170 that is coupled to the first end 108 and extends parallel to the longitudinal axis 124, and a second portion 172 that extends from the first portion 170. The first portion 170 includes the first aperture 150. An outer wall 174 is coupled to the first end 108, and specifically the wall 130, of the body 101. Moreover, as shown in FIGS. 1E-1I, the second wall 134 is defined at least in part by the outer wall 174. An inner wall 176 extends from the outer wall 174 and defines the first aperture 150. The inner wall 176 at least partially forms the funnel 110. The second portion 172 extends from the first portion 170, and specifically the outer wall 174, and is angled relative to the first portion 170. The second portion 172 at least partially forms the funnel 110, as well. The first portion 170 forms a smaller portion of the funnel 110 than the second portion 172. A seal may be positioned between the funnel 110 and the body 101.

A gasket 178 is positioned on and coupled to the second side 120 of the body 101. The gasket includes a first portion 178a that partially circumscribes the first opening 162 and a second portion 178b that partially circumscribes the second opening 166.

In the embodiments of FIGS. 1A-1I, a connection portion 180 is integrally coupled to or otherwise coupled to and extends from the second end 112 of the body 101. The connection portion 180 has a conduit 181 that defines an outlet, which is in fluid communication with the third aperture 158. That is, the diameter of the conduit 181 may decrease in the direction away from body 101 towards the universal coupler 182. The outlet is also configured to be coupled to and in fluid communication with the hose or wand of the vacuum. In the embodiment of FIGS. 1A-1D, the connection portion 180 is substantially parallel to the longitudinal axis 124. In the embodiment of FIGS. 1E, 1F, 1G, 1H, 1J and 1K, the connection portion 180 is angled relative to the longitudinal axis 124. In the embodiment illustrated in FIGS. 1E-1H, the connection portion 180 is oriented at a 30-degree angle relative to the longitudinal axis 124. In the embodiment illustrated in FIGS. 1J-1K, the connection portion is oriented at a 90-degree angle relative to the longitudinal axis 124. That is, as shown in FIGS. 1J-1K the connection portion 180 is substantially orthogonal or perpendicular to the longitudinal axis 124 of the body 101. In other embodiments, the connection portion 180 may be rotatably coupled to the body 101 and/or may be oriented at any other suitable angle relative to the longitudinal axis 124.

Figure 1E:
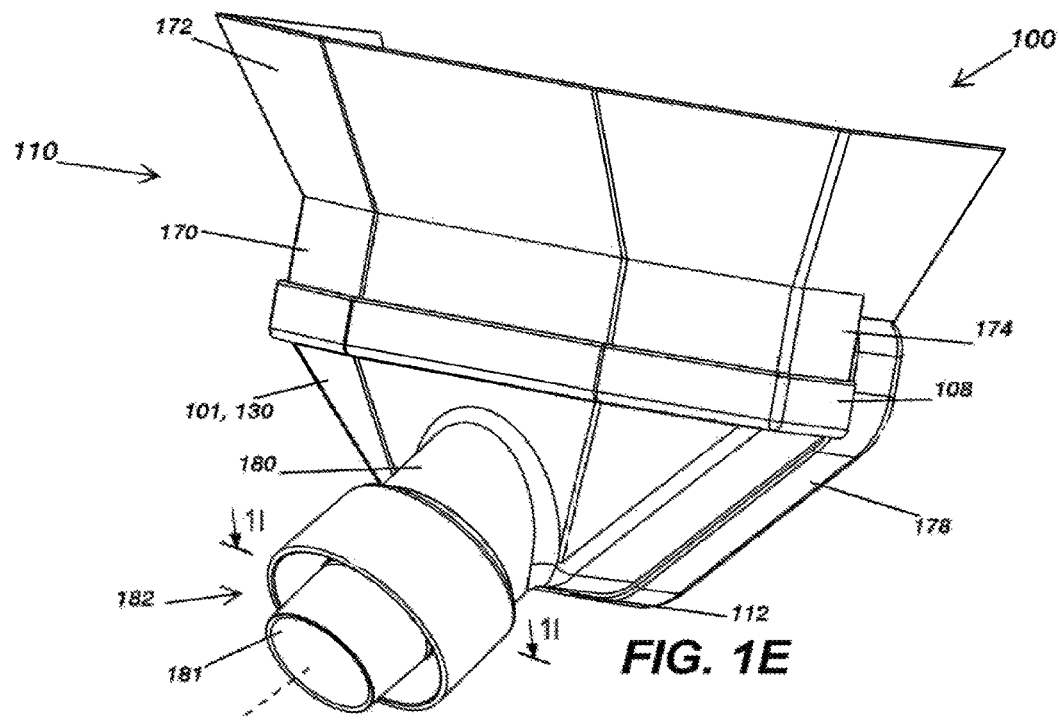
FIG. 1E illustrates a perspective view vacuum accessory according to another embodiment.
Figure 1F:
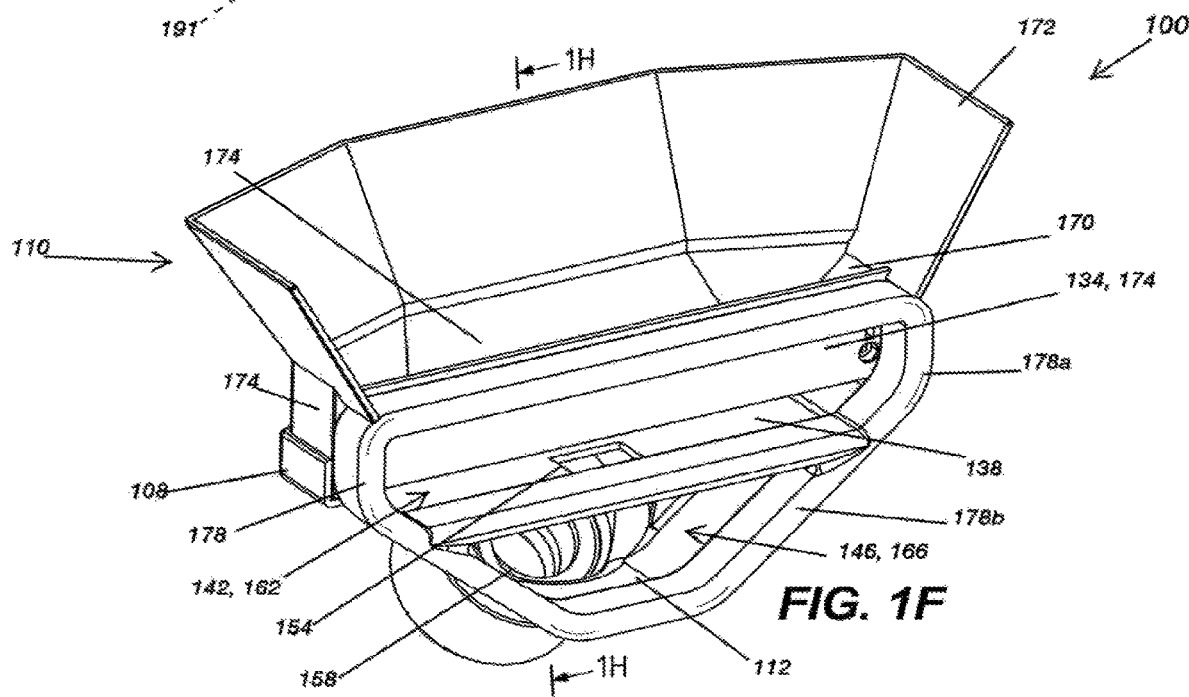
FIG. 1F illustrates another perspective view of the vacuum tool of FIG. 1E.
Figure 1J:
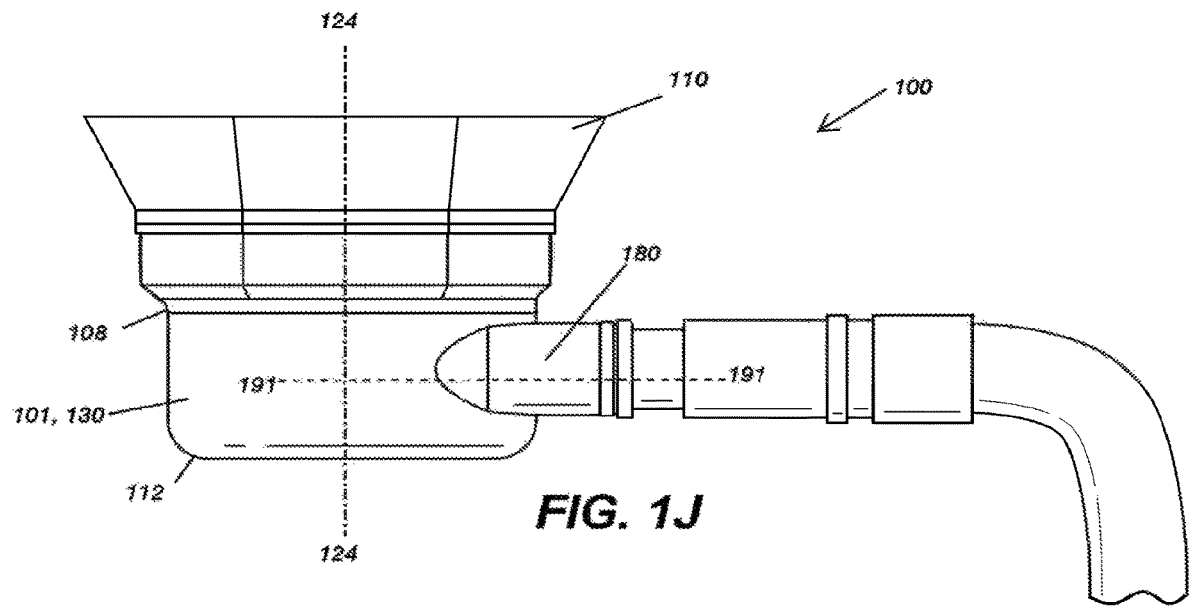
FIG. 1J illustrates a perspective view of the vacuum tool according to another embodiment.
Figure 1K:
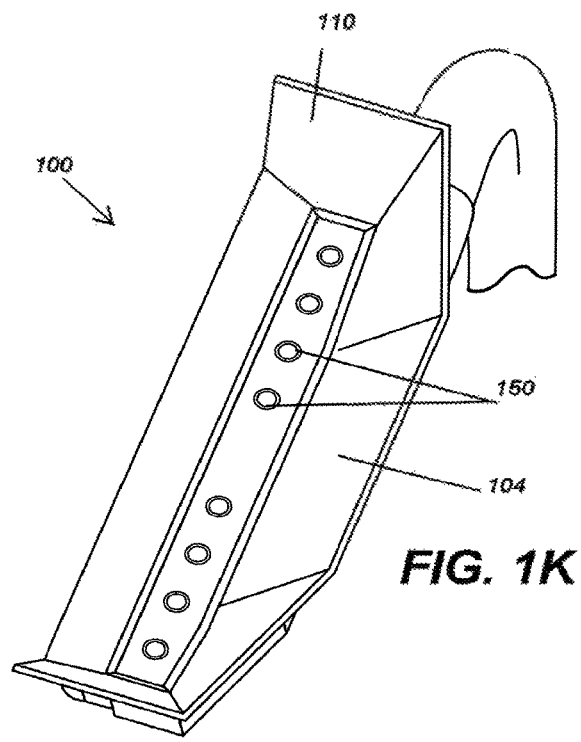
FIG. 1K illustrates a perspective view of the vacuum tool of FIG. 1J.

With further respect to FIGS. 1E-1I the connection portion 180 may include a universal coupler 182 extending from the conduit 181 and configured to couple to vacuum hoses and wands having different dimensions. In the embodiment of FIGS. 1E, 1I, the universal coupler 182 includes a first cylindrical wall 183, a second cylindrical wall 184, and a channel 185 formed therebetween. The second cylindrical wall 184 surrounds the first cylindrical wall 183, such that the second cylindrical wall 184 includes a diameter greater than a diameter of the first cylindrical wall 183 to space the two walls apart and form channel 185 between the two walls. The first cylindrical wall 183 is tapered in a direction toward the outlet.

With reference to FIGS. 1E-1I, the first cylindrical wall 183 includes a first shoulder 186 and a second shoulder 187 extending from an outer surface of the first cylindrical wall 183. The first and second shoulders 186, 187 divide the channel 185 into a first section 188a, a second section 188b, and a third section 188c, such that each section 188a-188c has a different diameter. Accordingly, hoses or wands having different diameters may be coupled to the first cylindrical wall 183 within one of the sections 188a-188c of channel 185 to secure the hose or wand to first cylindrical wall 183 in the channel 185. In some embodiments, the first cylindrical wall 185 may include fewer or additional shoulders. In further embodiments, the second cylindrical wall 184 may be tapered, or both the first and second cylindrical walls 183, 184 may be tapered.

Instead of or in addition to channel 185, with continued reference to FIGS. 1E-1I, the conduit 181 may be tapered in a direction away from the outlet. An inner surface of the conduit 181 includes a third shoulder 189 and a fourth shoulder 190 extending therefrom in a direction toward an axis 191 of the connection portion 180. The third and fourth shoulders 189, 190 divide the conduit 181 into a fourth section 192*a*, a fifth section 192*b*, and a sixth section 192*c*, such that each section 192*a*-192*c* has a different diameter. Furthermore, the fourth section 192*a*, the fifth section 192*b*, and the sixth section 192*c* have different diameters than the first section 188*a*, the second section 188*b*, and the third section 188*c*. Accordingly, hoses or wands having different diameters may be received within one of the sections 192-192*c* within the conduit 181, thereby coupling the hose and/or wand to the connection portion 180. In some embodiments, the conduit 181 may include fewer or additional shoulders.

In the illustrated embodiment, the universal coupler 182 is integrally formed with the connection portion 180 and the conduit 181. In other embodiments, the universal coupler 182 may be otherwise coupled to the conduit 181, such as by a swivel joint. In some embodiments, the connection portion 180 may include a different coupler configuration. In the illustrated embodiments, the diameter of the conduit 181 is substantially constant between the body 101 to the universal coupler 182. In some embodiments, the conduit 181 may be tapered in a direction away from the body 101 towards the universal coupler 182.

In use, the second side 120 of the body 101 of the tool 100 is positioned against a work surface, such as a wall, and configured to be removably held to the work surface by the suction force generated by the vacuum. While in use, the air stream created by the suction generated by the vacuum also draws (e.g., sucks) dirt and debris into the inlet (that is, opening 150 in the first end 108) and carries the dirt and debris from the inlet to the outlet (e.g., the connection portion 180) via the second and third apertures 154, 158. In particular, when positioned against a work surface, the first region 142 and the work surface form a first chamber and the second region 146 and the work surface form a second chamber. The first and second chambers create a suction force that holds the body 101 to the work surface while providing enough suction to catch and draw dust and debris through the funnel 110. With respect to FIGS. 1A-1D, a portion of the peripheral edge of the skirt 168*b* fits tightly against the work surface. When in use, the funnel 110 of each of the embodiments is positioned adjacent to and tightly held against the work surface and catches dust and debris, and the skirt 168*a*, 168*b* (FIGS. 1A-1D) or the second portion 172 (FIGS. 1E-1I) help contain falling and airborne dust and debris as it is collected (e.g., suctioned) by the tool 100 and the vacuum. The gasket 178 prevents scratching or otherwise marring of the work surface and therefore protects finished surfaces.

The body 101 of each of the vacuum tools 100 illustrated herein may have a first height defined between the first and second ends 108, 112 and a second height defined between an edge of the funnel 110 and the second end 112 of the body 101. The first height may be about 4.5 inches and the second height may be about 7.3 inches. The first height enables the body 101 to be positioned between a trim molding and a wall outlet, for example. The funnels illustrated herein may define a maximum width of approximately 10.2 inches. In some embodiments, the vacuum tool 100 may have other suitable dimensions, and the size of the vacuum tool 100 may vary based on the suction power of the vacuum. For example, a larger vacuum tool 100 may be used with a vacuum having an increased suction power of.

Figure 2A:
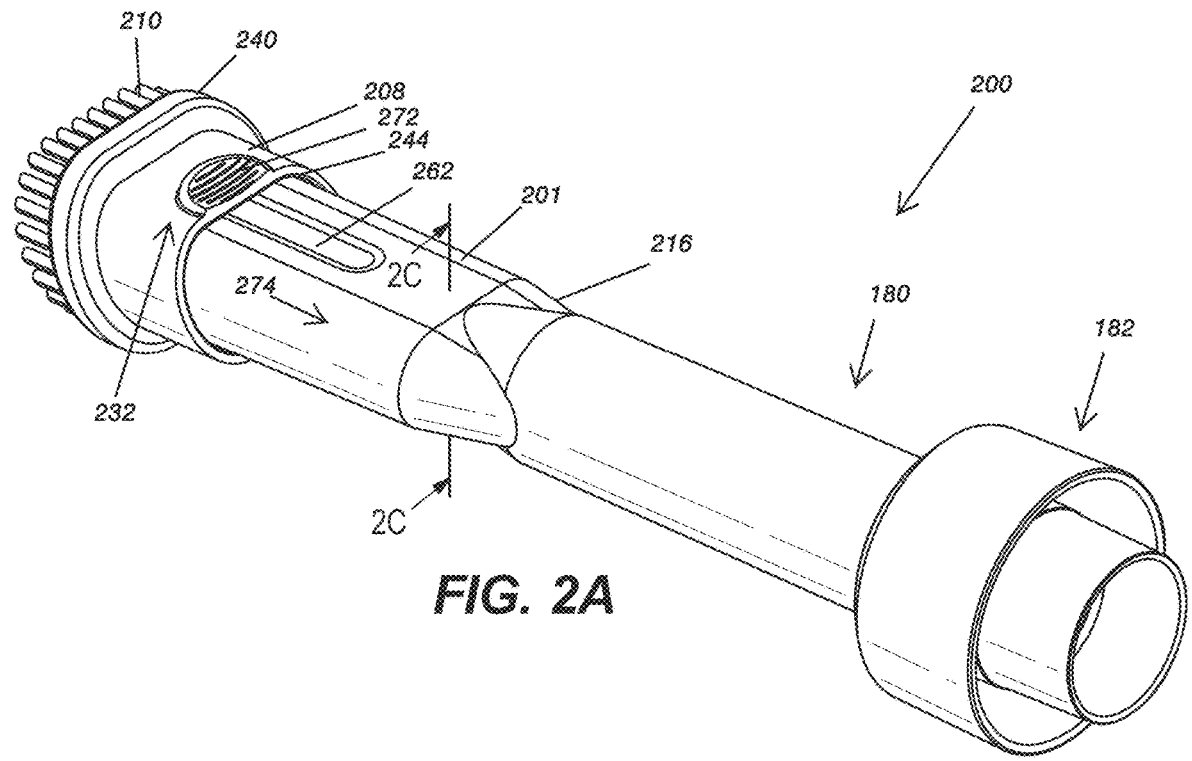
FIG. 2A illustrates a perspective view of a vacuum tool according to another embodiment.
Figure 2B:
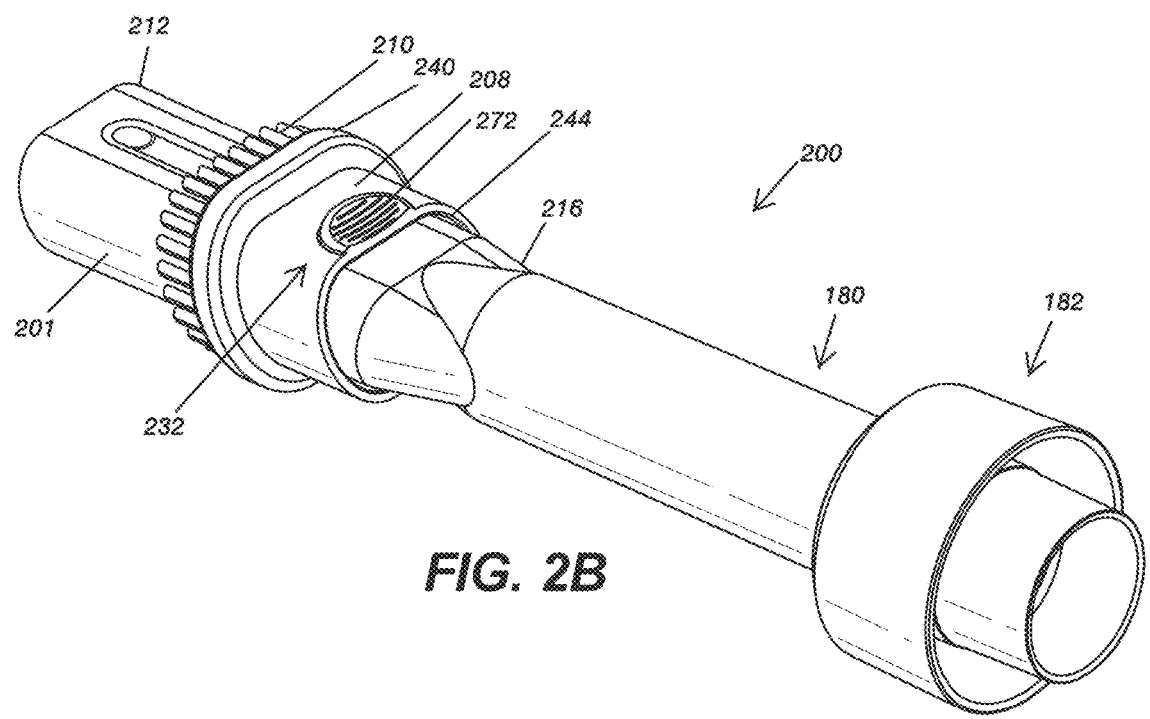
FIG. 2B illustrates another perspective view of the vacuum tool of FIG. 2A.
Figure 2C:
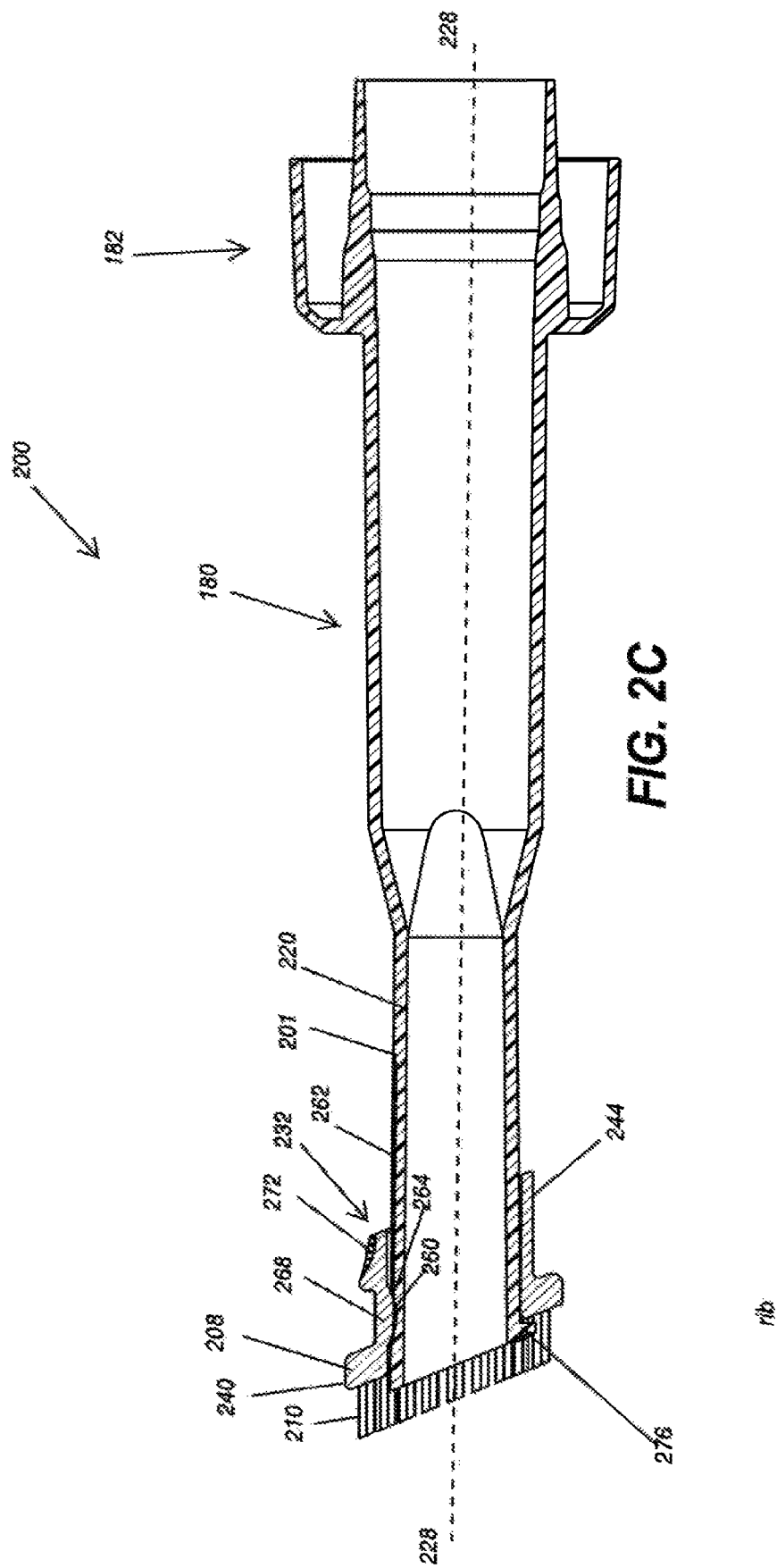
FIG. 2C illustrates a cross-sectional view of the vacuum tool of FIG. 2A along the line 2C-2C of FIG. 2A.

FIGS. 2A-2I and 3A-3C illustrate exemplary embodiments of vacuum tools 200 that each have a body 201 and a deployable carriage 208 that is movable relative to the body and has a brush element 210. The brush elements 210 are suitable for scrubbing a work surface to loosen caked on dirt and debris to assist in suctioning the dirt and debris. As shown, the body 201 of the vacuum tools 200 of FIGS. 2A-2I and 3A-3C includes a first end 212 defining an inlet, a second end 216 opposite the first end 212, and an aperture 220 extending between the first end 212 and the second end 216. A longitudinal axis 228 (FIGS. 2C, 2F, 2G, 3C) extends between the first end 212 and the second end 216. The body 201 further includes a detent mechanism 232. In some embodiments, the body 201 may have a 90-degree bend such that the first end and the second end are positioned at a 90-degree angle relative to one another, as discussed in greater detail below with respect to FIGS. 4A and 4B. A connection portion 180 is positioned at the second end 216 and is coupleable to a hose or wand of a vacuum. The connection portion 180 defines an outlet. A universal coupler 182 (like the one discussed above with respect to FIGS. 1A-1K) may be integrally formed or otherwise coupled to the connection portion 180, as shown in FIGS. 2A-2C.

Figure 2D:
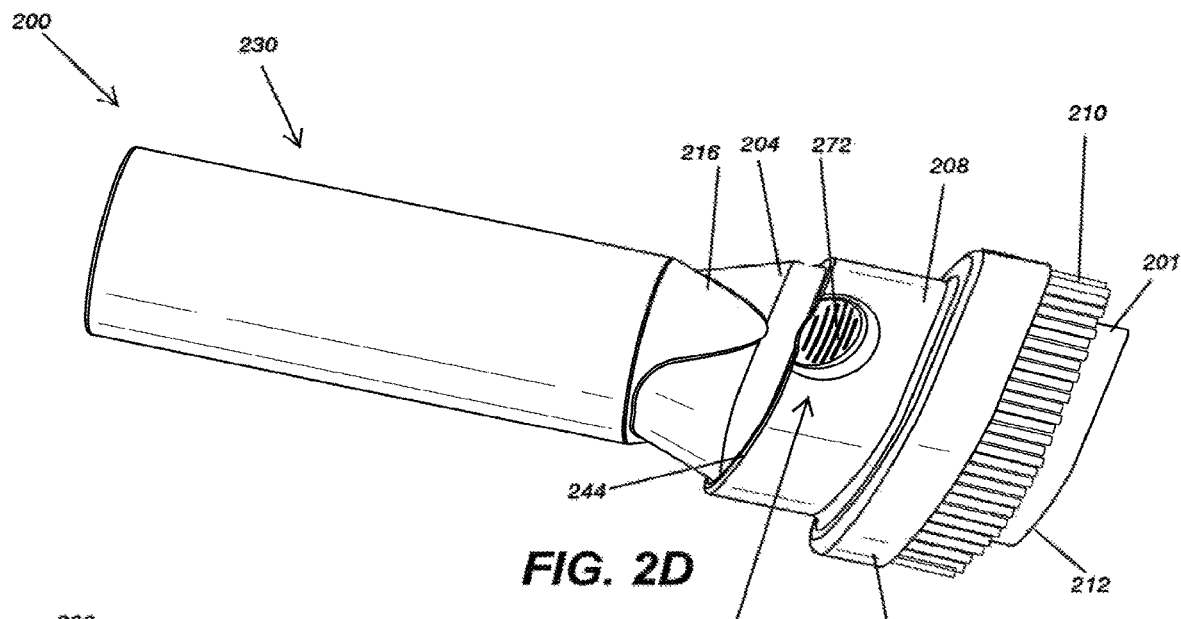
FIG. 2D illustrates a perspective view of a vacuum tool according to another embodiment.
Figure 2E:
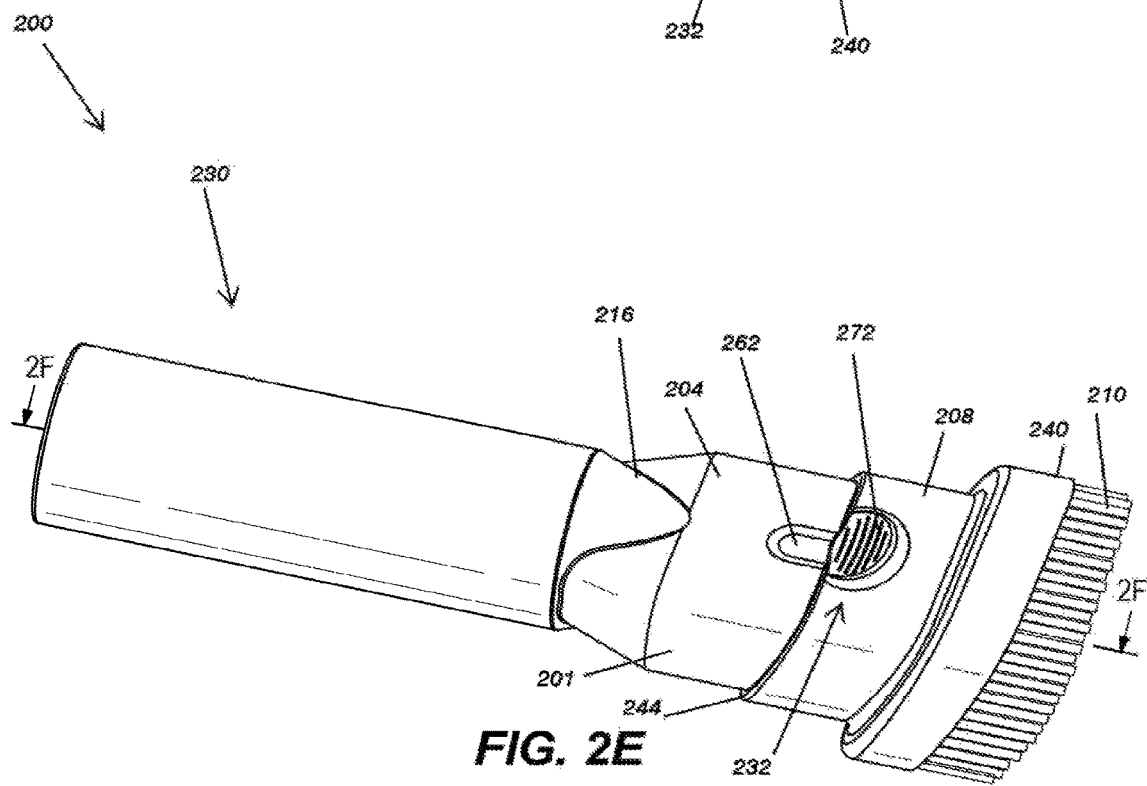
FIG. 2E illustrates another perspective view of the vacuum tool of FIG. 2D.
Figure 2F:
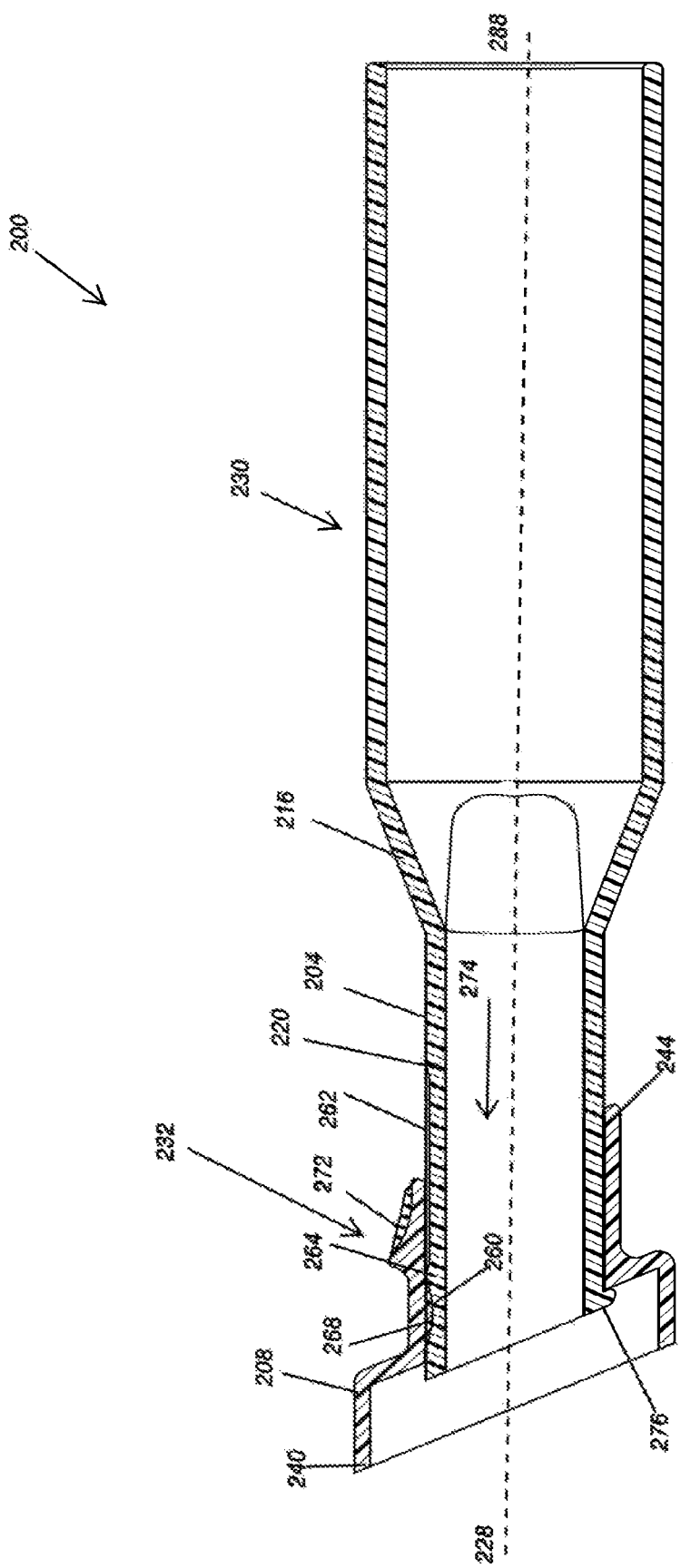
FIG. 2F illustrates a cross-sectional view of the vacuum tool of FIG. 2D along the line 2F-2F of FIG. 2E.

The carriage 208 is movably coupled to the body 201. The carriage 208 includes a first end 240 and a second end 244 opposite the first end 240. The carriage 208 is formed as a tube that is hollow between the first and second ends 240, 244. In the embodiments illustrated in FIGS. 2A-2F and 3A-3C, at least one of the first and second ends 240, 244 includes the brush element 210, which has a plurality of bristles. The carriage 208 is movable (e.g., slideable) relative to the body 201 between a first use or deployed position (FIGS. 2A, 2E, 3A) and a second stowed position (FIGS. 2B, 2D, 3B). In the first position the carriage 208 engages the detent mechanism 232 and the plurality of bristles extends outwardly from the first end 212 of the body 201. In the second position, the carriage 208 is disengaged from the detent mechanism 232 and the plurality of bristles is spaced inwardly from the first end 212 of the body 201 between the first end 212 and the second end 216 of the body. When the brush 210 is not needed, the carriage 208 can be slid out of the way, to the second position.

Figure 2G:
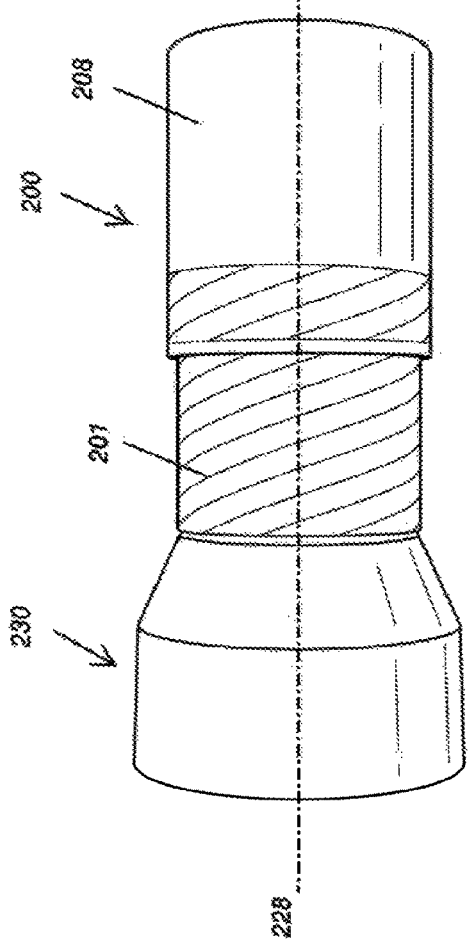
FIG. 2G illustrates a perspective view of a vacuum tool according to another embodiment.
Figure 2H:
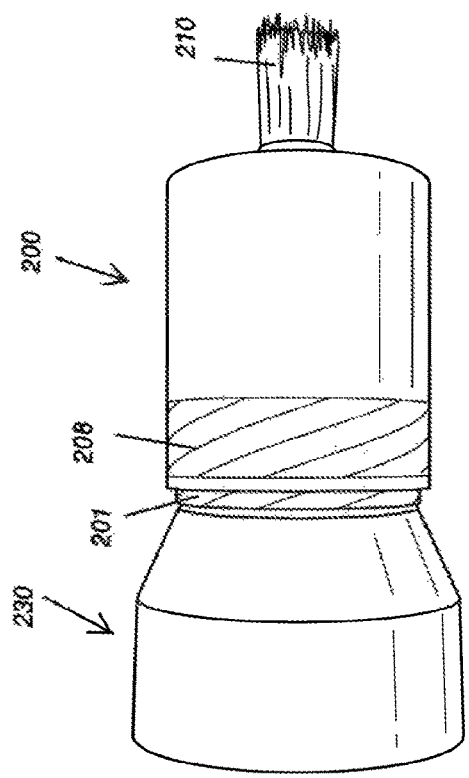
FIG. 2H illustrates another perspective view of the vacuum tool of FIG. 2G.
Figure 2I:
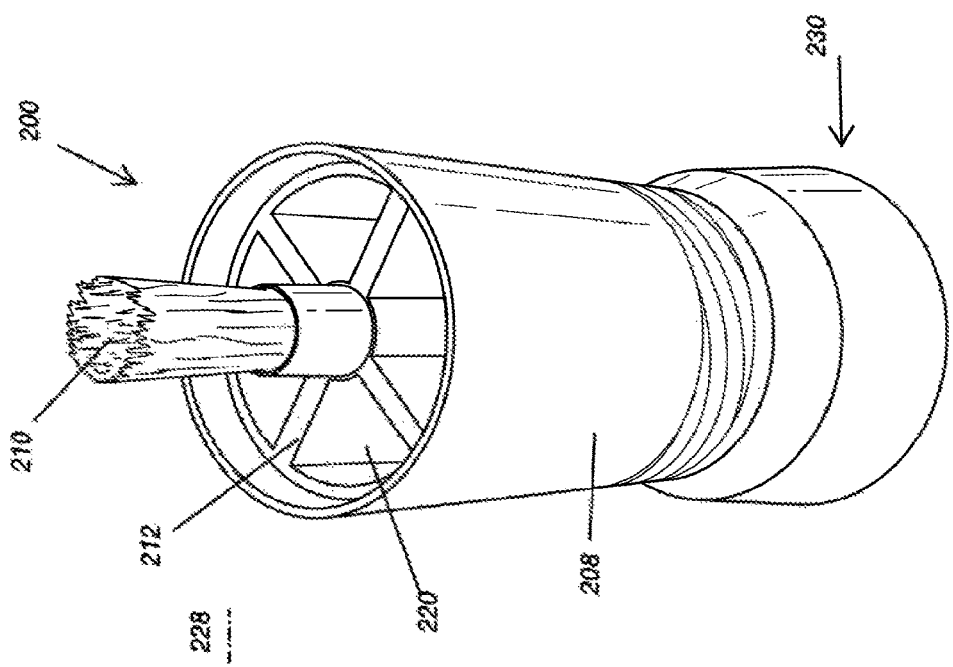
FIG. 2I illustrates another view of the vacuum tool of FIG. 2G.

In some embodiments, such as that shown in FIGS. 2G-2I, the brush element 210 may be coupled to the first end 212 of the body 201 (instead of to the carriage 208, as illustrated in the embodiment of FIGS. 2A-2F) and the carriage 208 may be movable to selectively expose the brush element 210. Accordingly, carriage 208 is movable (e.g., slideable) relative to the body 201 between a first deployed position (FIG. 2H) and a second stowed position (FIG. 2G). In the first position the carriage 208 is entirely positioned about the body 201 and the bristles of brush element 210 are exposed and extend outwardly from the first end 212 of the body. In the second position, the carriage 208 circumscribes the brush element 210 such that the plurality of bristles is substantially covered by the carriage 208. When the brush 210 is not needed, the carriage 208 can be slid to the second position. In other embodiments, the carriage 208 may be positioned about a portion of the body 201 and a portion of the brush element 210 when in the first position.

While the illustrated embodiments show the carriage 208 being slideable relative to the body 201 between the first and second positions, in other or additional embodiments, the carriage 208 may be pivotably coupled to the body or coupled by threads to the body such that the carriage 208 can be moved between the first and second positions. To this end, the carriage 208 may only partially surround the body 201.

In the embodiment of FIGS. 2A-2E, the detent mechanism 232 includes a first recess 260 (FIG. 2C, 2F) formed in a surface of the body 201. The body 201 also includes a second, alignment recess 262. The first recess 260 and the second recess 262 are separated by a rib 264. The carriage 208 includes a projection 268 on a first surface that is positioned adjacent to the surface of the body 201 having the detent mechanism 232 and an indent or recess 272 in a second surface opposite the first surface. The projection 268 is selectively received in one of the first and second recesses 260, 262. In the first position, the projection 268 is received (e.g., in a snap fit engagement) in the first recess 260, and in the second position, the projection 268 is received in the second recess 262. The user can place a finger in the indent 272 and exert a force in the direction of arrow 274 (e.g., a first direction) to move the carriage 208 from the first position to the second position or exert a force in the direction opposite of the arrow 274 (e.g., a second direction, opposite the first direction; FIG. 14B) to move the carriage 208 from the second position to the first position. In the embodiments of FIGS. 2A-2F, the body 201 has a rib 276 positioned at and extending from the first end 212 that acts as stop to prevent the carriage from sliding off the body.

In the embodiment illustrated in FIGS. 2A-2E, the body 201 and carriage 208 together may have a width of about 2.5 inches, although the width may be greater or less in other embodiments. Moreover, as shown, the carriage may define a chamfered or slanted edge to which the brush element 210 is attached. That is, the edge of the carriage 208 including the brush element 210 may be positioned at a non-perpendicular angle relative to the longitudinal axis 228.

Figure 3A:
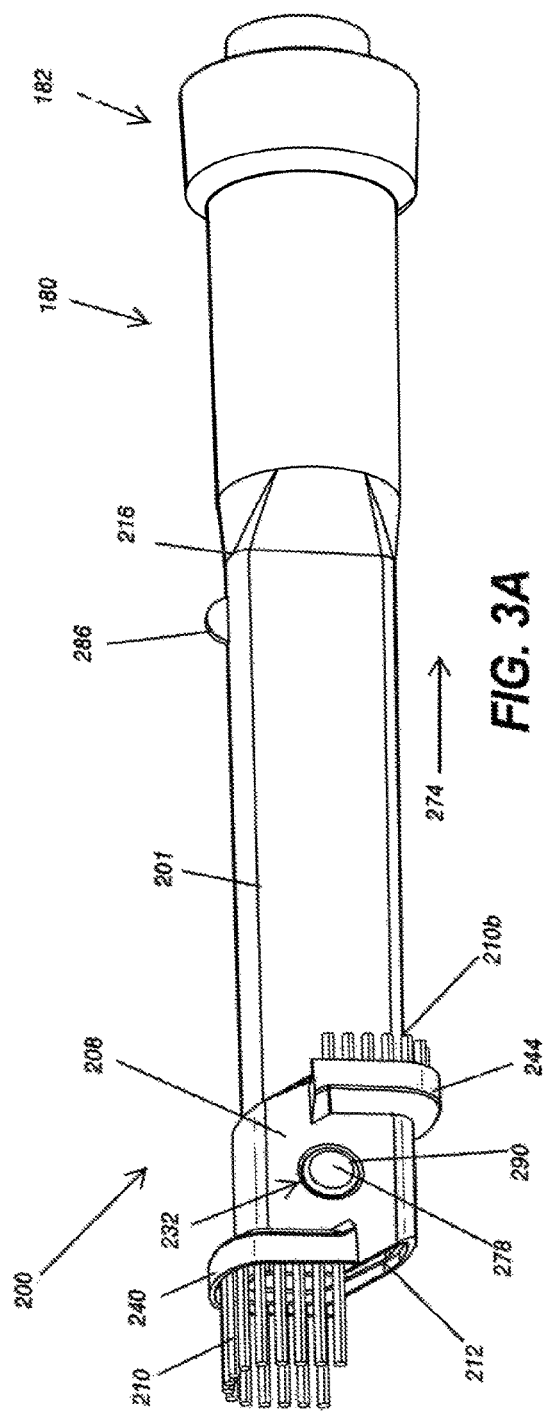
FIG. 3A illustrates a perspective view of a vacuum tool according to another embodiment.
Figure 3B:
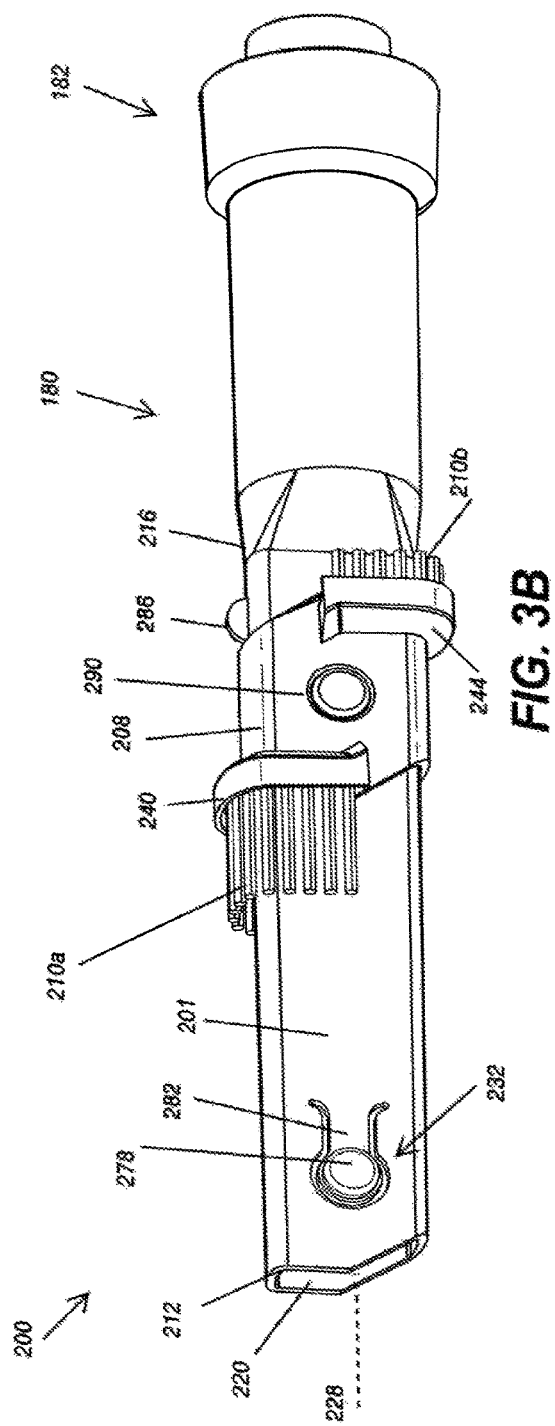
FIG. 3B illustrates another perspective view of the vacuum tool of FIG. 3A.
Figure 3C:
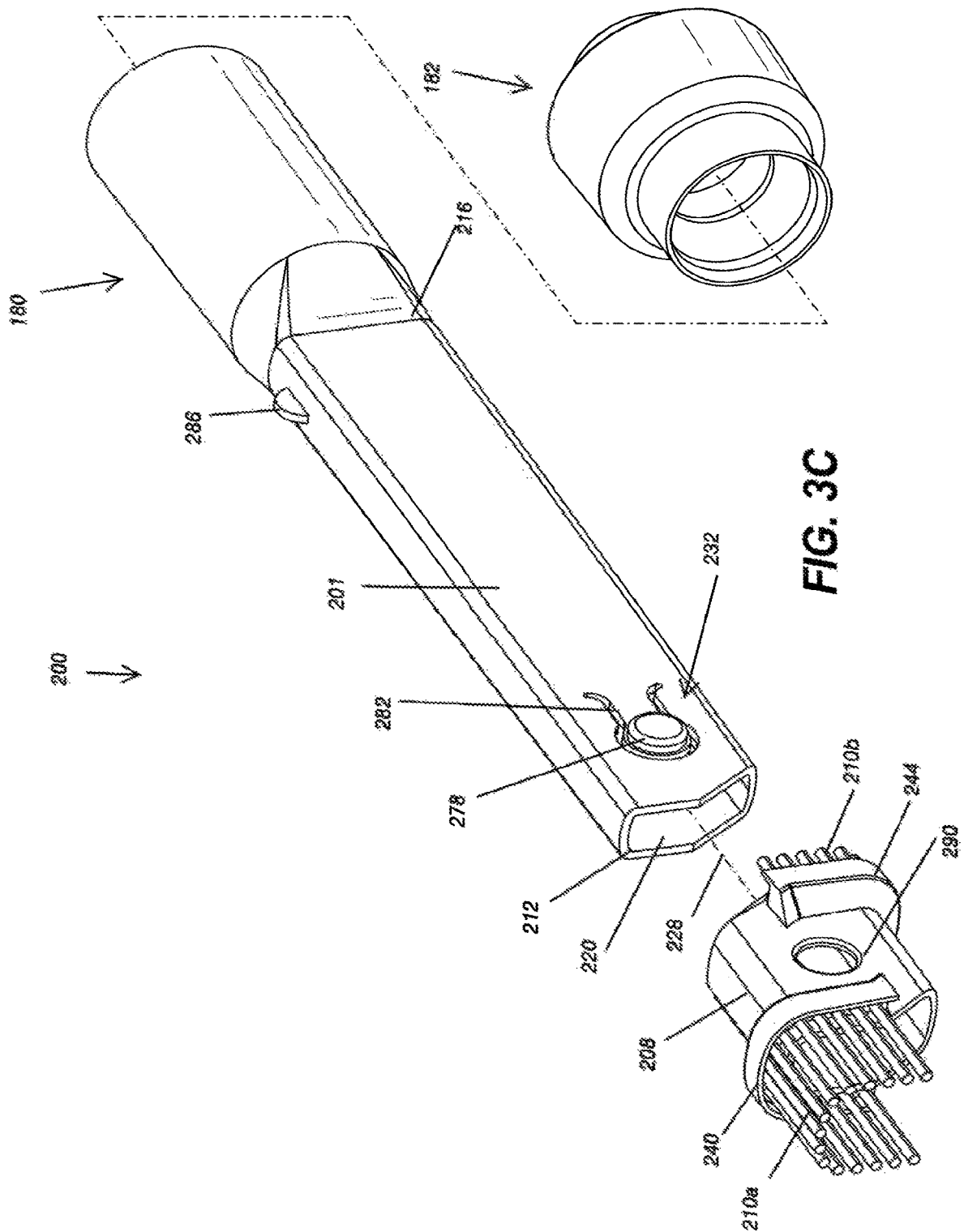
FIG. 3C illustrates an exploded view of the vacuum tool of FIG. 3A.

In the embodiment of FIGS. 3A-3C, the detent mechanism 232 includes a spring-biased projection or button 278. As shown, the button 278 is biased (e.g., by a spring 282) laterally outwardly from the body 201. A force exerted on the button 278 by a user laterally inwardly towards the body 201 (in the direction of the longitudinal axis 228) overcomes the bias of the spring 282. In the illustrated embodiment, the detent mechanism 232 is integrally formed with or otherwise coupled to the body 201 but in some embodiments, the detent mechanism 232 may be coupled to the body in other suitable ways. The body 201 of FIGS. 18-23 also includes a stop or projection 286. The stop 286 may be positioned on a different surface than the detent mechanism 232.

In the embodiment of FIGS. 3A-3C, the vacuum tool is a 3-in-1 crevice tool in which, in addition to being movable between the first deployed position and the second stowed position, the carriage 208 is also removable and has two different types of brush elements 210a, 210b (e.g., stiff, soft). The 3-in-1 crevice tool, for example, is suitable for use in tight spaces. The orientation of carriage 208 can be reversed by a user to present a preferred brush type for cleaning. Accordingly, the first end 240 of the carriage 208 includes a first brush element 210a having a first plurality of bristles and the second end 244 of the carriage 208 has a second brush element 210b having a second plurality of bristles. The first and second brush elements 210a, 210b have bristles with different characteristics (e.g., stiff, soft, short, long, etc.). Additionally, the carriage 208 has an aperture 290 that receives the button 278 of the detent mechanism 232 to hold the carriage 208 in the first position.

As shown in FIGS. 3A, when the carriage is in the first position, the detent mechanism 232 is positioned within the aperture 290 on the carriage 208 and one of the first or second brush elements 210a, 210b extends outwardly from the first end 212 of the body 201 and the other of the first or second brush elements 210a, 210b is spaced and directed inwardly from the first end 212 of the body. When the carriage is in the second position (FIG. 3B), the aperture 290 is spaced away from the detent mechanism 232 along a length of the body 201 and both the first and the second brush elements 210 are spaced apart from the first end 212 between the first end 212 and the second end 216 of the body 201. The carriage 208 engages the stop 286 in the second position.

The tool of FIGS. 3A-3C is used by inserting the first end 212 of the body 201 through the carriage 208 and sliding the carriage 208 along the body in the direction of arrow 274 (e.g., a first direction) until the button 278 is received in the aperture 290. At this point the carriage 208 is in the first position. To move the carriage 208 from the first position to the second position, the user exerts a force on the button 278 inwardly towards the body 201 to displace the button 278 from the aperture 290 and slides the carriage 208 in the direction of arrow 274 (e.g., the first direction) towards the second end 216 until the stop 286 engages the carriage 208. To move the carriage 208 from the second position to the first position, the user slides the carriage 208 in the direction opposite of arrow 274 (e.g., a second direction opposite the first direction) towards the first end 212 until button 278 of the detent mechanism 232 is positioned within the aperture 290 of the carriage 208. To remove the carriage 208, the user presses on the button 278 inwardly toward the body 201 to displace the button 278 from the aperture 290 and slides the carriage 208 in the direction opposite of arrow 274 (e.g., the second direction) towards the first end 212 and off of the body.

Figure 3D:
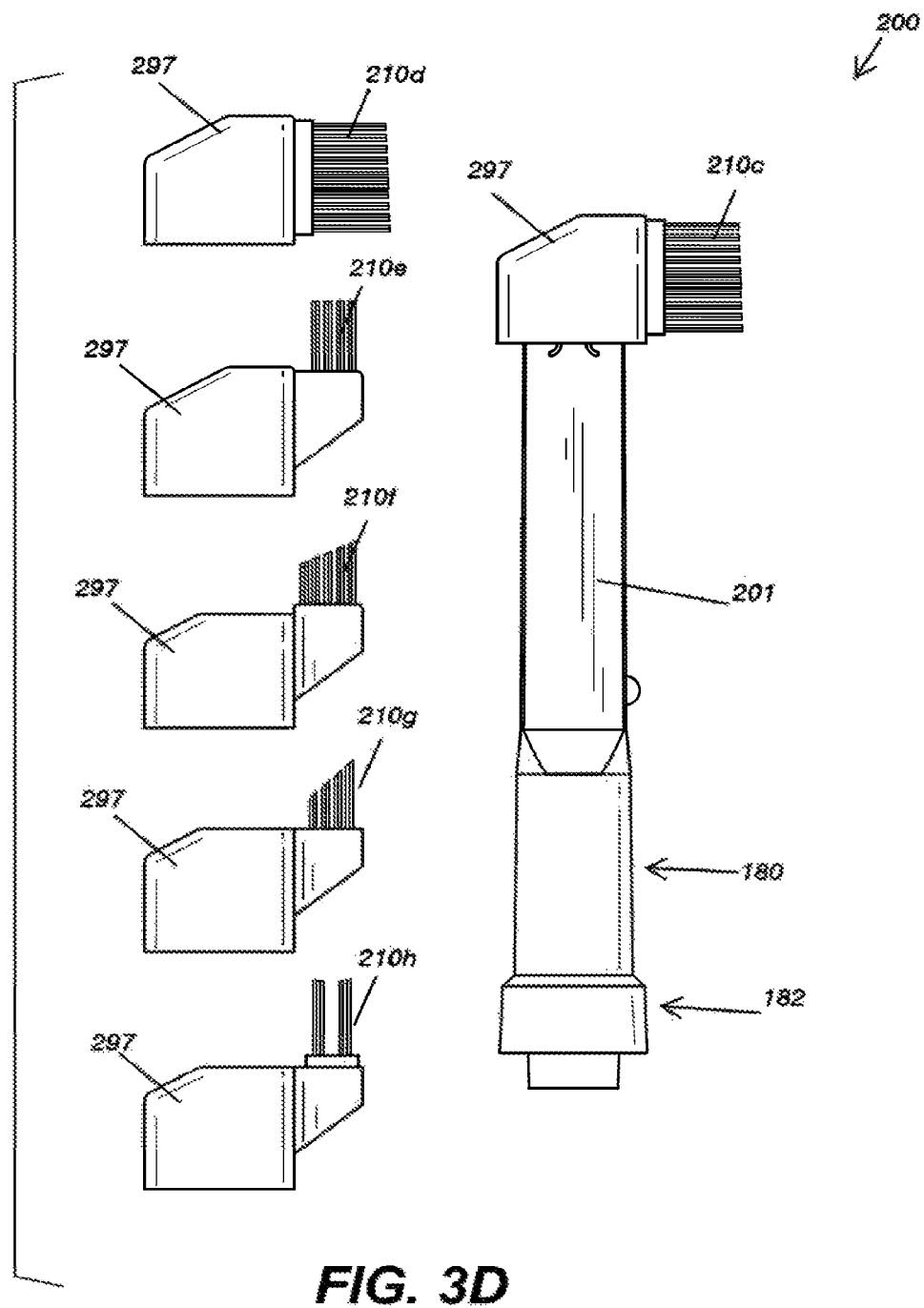
FIG. 3D illustrates side views of a vacuum tool according to another embodiment and including a plurality of coupleable brush elements.

As shown in FIG. 3D, vacuum tool carriages 297 having brush elements 210c-210h with different bristle characteristics (e.g., stiff, soft, short, long, etc.) and patterns may be removably coupleable to the first end 212 of the body 201. More specifically, the carriages 297 may be removably coupled to first end 212 of the body 201. The carriages 297 may each define a bore (not shown) that is configured to align with the aperture 220 of the body. The brush elements 210c-210h of each carriage 297 may be positioned adjacent the bore. Each of the carriages 297 may be coupled to the body 201 using one of the detent mechanisms 232 of FIG. 2A-2F or 3A-3C. Alternatively, the carriages 297 may be secured by any other suitable coupling mechanism (e.g., snap-fit engagement, friction fit, etc.). In other embodiments, one or more of the carriages may include rubber elements or other suitable scrubbing elements used for cleaning tight spaces. The user may thus easily remove and replace the carriages 297 on the body 201 depending on the desired brush configuration.

In the embodiment illustrated in FIGS. 3A-3D, the body 201 and carriage 208 together may have a height of about 2.5 inches, although the height may be greater or less in other embodiments. Moreover, as shown, the carriage 208 may define a chamfered or slanted edge to which the brush element 210 is attached. That is, the edge of the carriage 208 including the brush element 210 may be positioned at a non-perpendicular angle relative to the longitudinal axis 228.

Figure 4A:
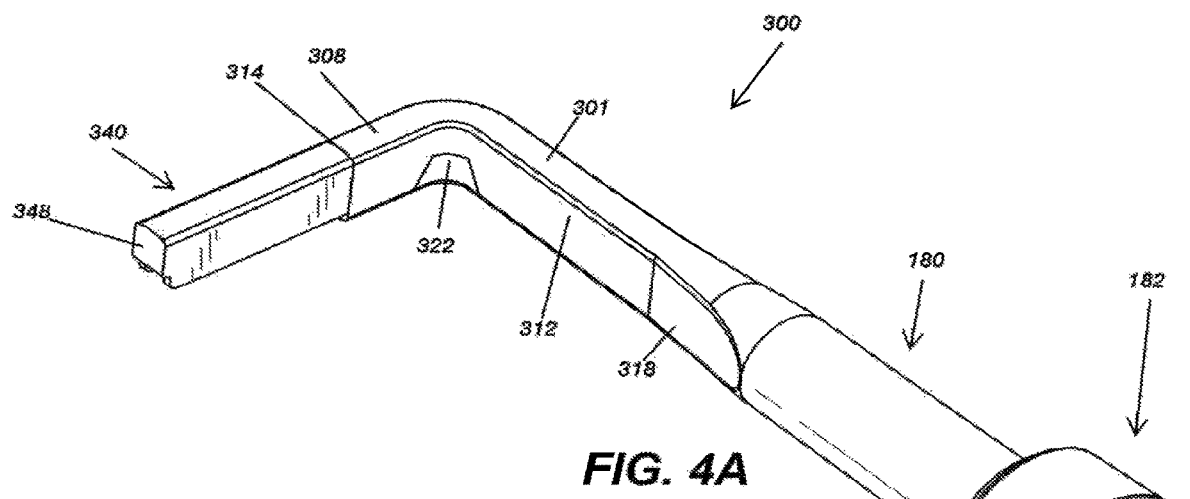
FIG. 4A illustrates a perspective view of a vacuum tool according to another embodiment and including a nozzle.
Figure 4B:
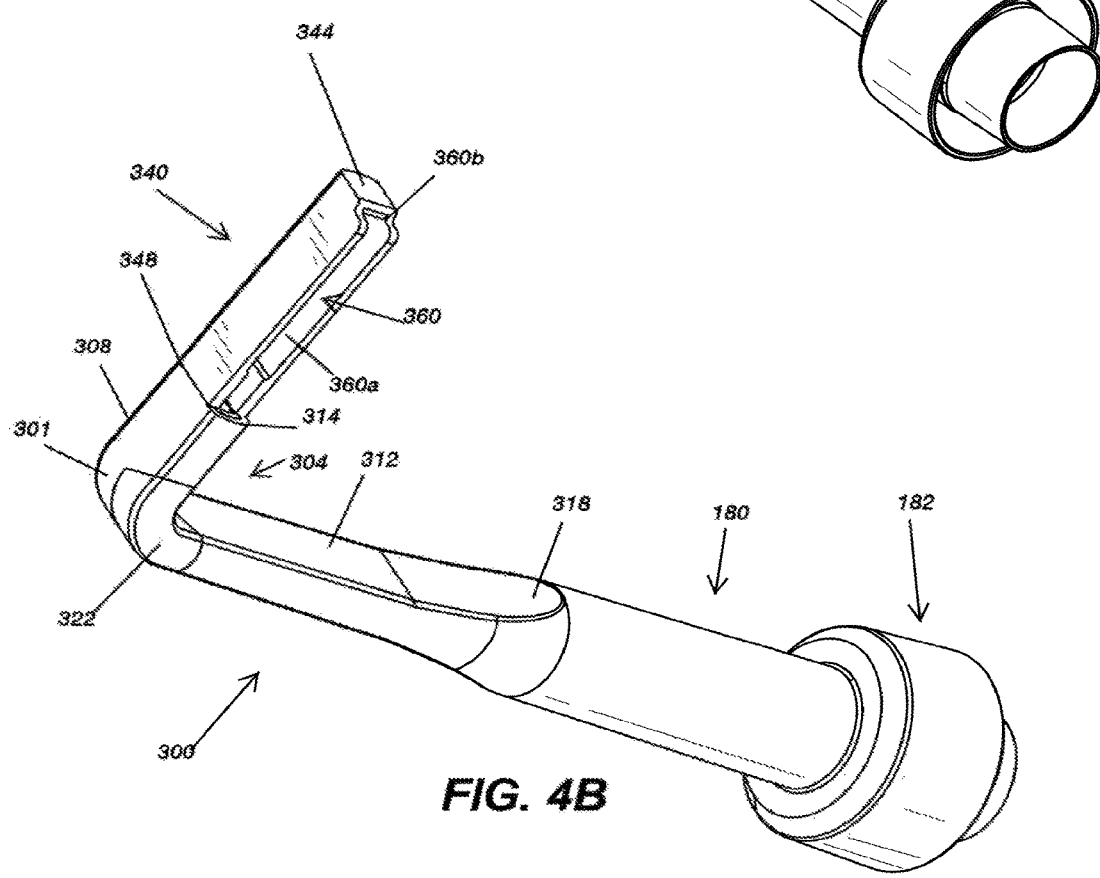
FIG. 4B illustrates another perspective view of the vacuum tool of FIG. 4A.
Figure 4C:
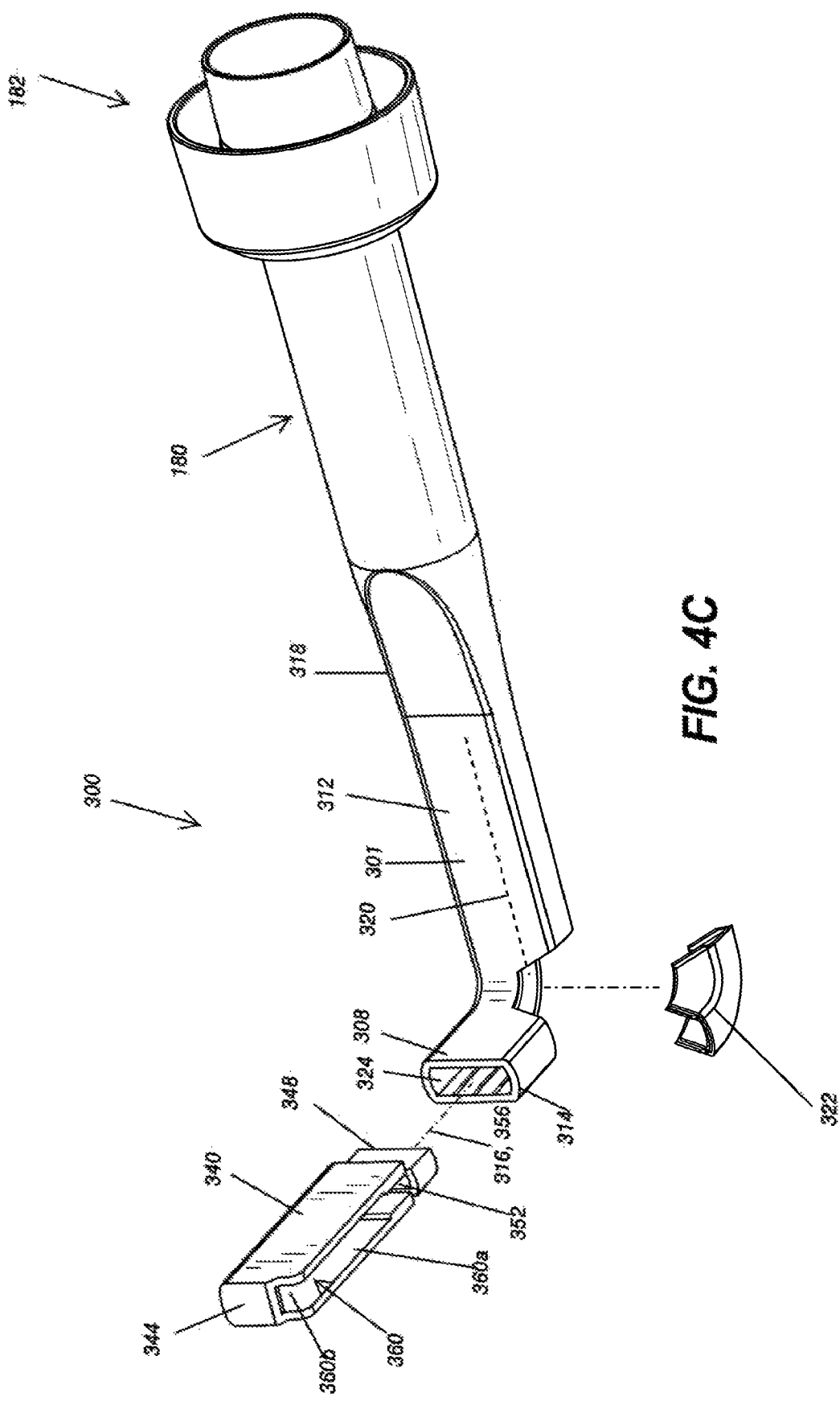
FIG. 4C illustrates an exploded view of the vacuum tool of FIG. 4A.

FIGS. 4A-4C illustrate an exemplary embodiment of a vacuum tool 300 that is an angled crevice tool having a first or tip portion 308 that is coupled to a second or main portion 312 at a bend forming an angle relative to the second portion 312. In some embodiments, the angle may be less than about 90°. As described below, a nozzle 340 is removably coupled to the first portion 308 such that the nozzle 340 can be "aimed" in different directions. FIGS. 4A and 4B, for example show the nozzle 340 "aimed" in a first direction. In the illustrated embodiment, the first portion 308 and the second portion 312 form an L-shaped body 301 of the vacuum tool 300. The first portion 308 may be integrally formed with or otherwise rigidly coupled to the second portion 312. The first portion 308 defines a first end 314 and a first longitudinal axis 316 and the second portion 312 defines a second end 318 and a second longitudinal axis 320. As shown in FIGS. 4A-4C, the first longitudinal axis 316 and the second longitudinal axis 320 may intersect at a substantially 90-degree angle (that is, the first axis 316 and the second axis 312 are perpendicular to each other). In the illustrated embodiment, a portion 322 of the L-shaped body 301 is removable from the bend between the first portion 308 and the second portion 312. The removable portion 322 allows the user to remove debris or dirt that may accumulate at the bend and interfere with the suction force generated by the vacuum. The removable portion 322 may be removably coupled to the body 301 by any suitable engagement (e.g., a friction fit engagement or snap fit engagement).

A connection portion 180 is positioned at the second end 318 and is configured to couple to a hose or wand of a vacuum. As shown, a universal coupler 182 (like the one discussed above with respect to FIGS. 1A-1K) may be coupled to the connection portion 180. An internal conduit 324 (FIG. 4C) extends through the first portion 308 and the second portion 312 between the first end 314 and the second end 318 and also longitudinally through the connection portion 180. The connection portion 180 (and therefore the universal coupler 182) defines an outlet through which dirt and debris drawn through the nozzle 340 enter the hose or wand of a vacuum. Together, the second portion 312 and the connection portion 180 define an elongate handle to provide a distance between the user and dangerous environments while accessing the area to be vacuumed. In the illustrated embodiment, for example, the combined length of the second portion 312 and the connection portion 180 taken along the second axis 320 may be about 9 inches. In some embodiments, the vacuum tool 300 narrows from a first dimension (e.g., diameter, width, cross-sectional area) of the connection portion 180 to a second dimension (e.g., diameter, width, height, cross-sectional area) of the first and/or second portions 308, 312 that is less than the first dimension. The smaller dimension of the first and/or second portions 308, 312 may allow the tool 300 to fit between and behind small spaces (e.g., pipes, conduits in electrical boxes, etc.).

The nozzle 340 has a first end 344 and a second end 348. The nozzle is removably coupled at its second end 348 to the first end 314 of the first portion 308 of the vacuum tool 300 (e.g., via a friction fit). The nozzle 340 defines an aperture 352 that extends from the second end 348 at least partially through the nozzle 340. The aperture 352 defines an axis 356 that is configured to be coincident with the first axis 316 of the first portion 318 when the nozzle 340 is coupled to the first portion 308 such that the aperture 352 is in fluid communication with the internal conduit 324 of the body 301. The nozzle 340 includes a suction opening 360 that is in fluid communication with the aperture 352. In the illustrated embodiment, the suction opening 360 extends rearwardly from the first end 344 toward the second end 348 of the nozzle and includes a first portion 360a proximal the aperture 352 (e.g., horizontal portion defined in a plane that is parallel to the first longitudinal axis 316) and a second portion 360b proximal the first end 344 (e.g., vertical or angled portion defined in a plane that is perpendicular to or otherwise intersects with the first longitudinal axis 316).

In some embodiments, the second end 348 of the nozzle 340 and the first end 314 of the first portion 308 may form corresponding male and female connectors shaped to allow the nozzle 340 to be coupled to the first portion 308 in different orientations. In the illustrated embodiment, the second end 348 is removably insertable into internal conduit 324 of the first portion 308 of the body 301 and is retained via a friction fit therebetween. The second end 348 of the nozzle 340 and the internal conduit 324 of the first portion 308 have rectangular cross-sectional profiles configured to allow the nozzle 340 to be coupled to the first portion 308 in two opposite orientations in which the opening 360 is facing in opposite directions perpendicular to the first axis 316 of the first portion 308. In other embodiments, the second end 348 of the nozzle 340 and the first end 314 of the first portion 308 may be configured (such as, for example, each having a square cross section or a circular cross-section) to accommodate more than two orientations (e.g., orientations in four directions or around a 360 degree circle) of the opening 360 relative to the first axis 316 of the first portion 308. In some embodiments, the first end 314 of the first portion 308 may be removably insertable into the second end 348 of the nozzle 340. In yet other embodiments, the first end 344 and the second end 348 of the nozzle 340 may be interchangeably coupleable to the first end 308 of the first portion 308.

As shown in FIGS. 4A-4C, the nozzle 340 extends from the first end 308 of the L-shaped body 301 such that the nozzle opening 360 is positioned forwardly of the first end 308. The nozzle 340 therefore elongates the first portion 308 of the L-shaped body. In some embodiments, the nozzle 340, rather than the body 301, may comprise an L-shape.

Figure 4D:
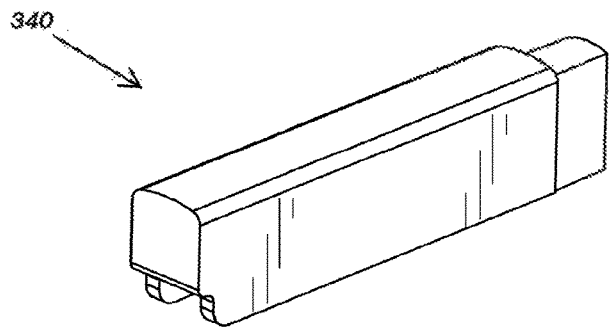
FIGS. 4D-4G illustrate perspective views of a plurality of nozzles that are usable with the vacuum tool of FIG. 4A.
Figure 4E:
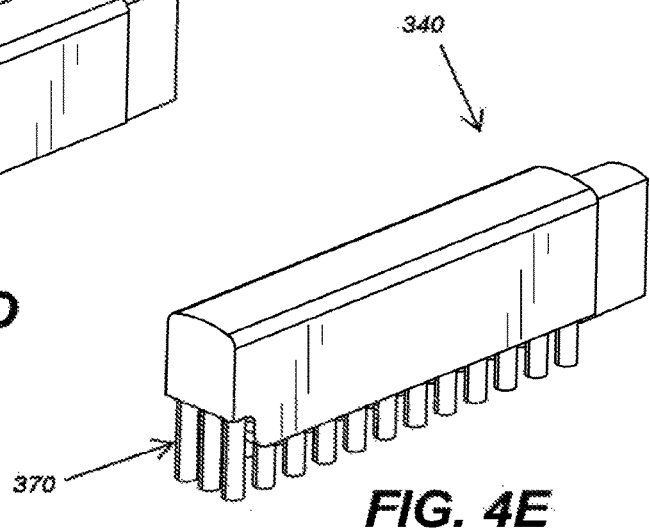
Figure 4F:
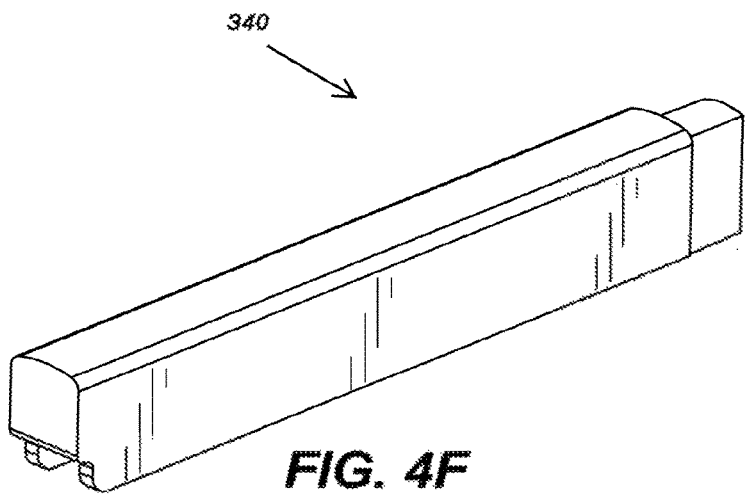
Figure 4G:
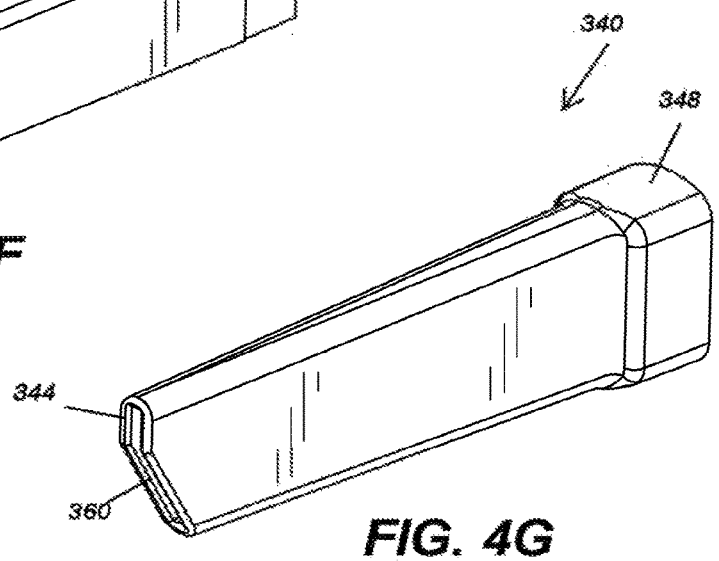

Moreover, the nozzle 340 is removable from the first portion 308 and is interchangeable with another nozzle 340 having different features, as shown in FIGS. 4D-4G. For example, the different nozzles 340 may have different lengths (FIGS. 4D and 4F). In some embodiments, the nozzle 308 may include a brush element 370 (FIG. 4E) extending along opposite sides of the opening 360 or along the periphery of the opening 360. Also, in some embodiments, the nozzle 340 may be substantially rectangular in cross-section and the nozzle opening 360 may have a width that is substantially constant. Alternatively, the nozzle 340 may be narrower at the first end 344 than the second end 348, and the opening 360 of the nozzle 340 may increase in width between the first end 344 and the second end 348. In other embodiments, as shown in FIG. 4G, the opening 360 may be formed entirely at the first end 344 from one or more a vertical and/or angled portions.

Figure 5C:
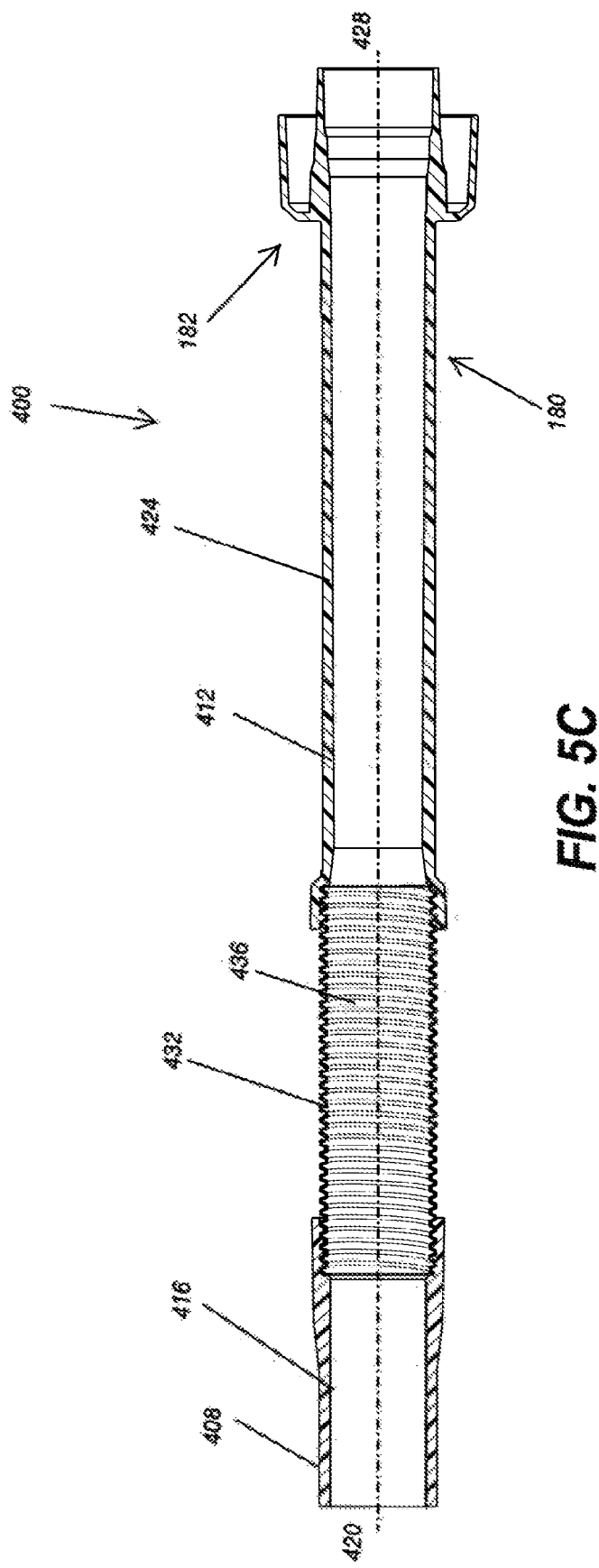
FIG. 5C illustrates a cross-sectional view of the vacuum tool of FIG. 5A along the line 5C-5C of FIG. 5A.

FIGS. 5A-7E illustrate exemplary embodiments of vacuum tool 400 including a first portion 408 flexibly coupled to a second portion 412. The first portion 408 defines a first aperture 416, which forms an inlet, and a first axis 420. The second portion 412 defines a second aperture 424, which forms an outlet, and a second axis 428. In the illustrated embodiments, the first and second portions 408, 412 are coupled to one another by a flexible portion 432 (e.g., a flexible knuckle). As shown, the flexible portion 432 includes a third aperture 436 extending therethrough and is coupled to adjacent ends of the first portion 408 and the second portion 412. A connection portion 180 extends from the second portion 412 and is coupleable to a hose or wand of a vacuum cleaner. In the embodiment of FIGS. 5A-5C, there is little distinction between the second portion 412 and the connection portion 180. In contrast, in the embodiments of FIGS. 6A-6B, the second portion 412 has a smaller dimension and a different cross-sectional shape than the connection portion 180. In either case, the vacuum tools 400 may include a universal coupler 182 coupled to the connection portions thereof, as shown in FIGS. 5A-7E. The connection portion 180 (and therefore the universal coupler 15) defines an outlet. The apertures 416, 424, 436 are in fluid communication with one another, such that debris can by carried a stream of air created by vacuum tool 400 from the inlet to the outlet.

With respect to the embodiments of FIGS. 5A-5B, the flexible portion 432 is constructed from a resilient material that allows the first portion 408 to flex relative to the second portion 412. That is, the first portion 408 may flex laterally relative to the second axis 428. In the embodiment illustrated in FIGS. 5A-5B, the flexible portion 432 is constructed from a resilient material that automatically springs back to its original configuration after being bent to a desired configuration or angle. In the other embodiments, the flexible portion 432 may be constructed from material that holds its position (e.g., does not spring back into place) once it is bent into a desired configuration or angle. Additionally, in the embodiments of FIGS. 5A-5B, the flexible portion 432 is expandable and collapsible to increase and decrease its length between adjacent ends of the first and second portions 408, 412. When contracted the length of the vacuum tool is between 17 inches and 20 inches. In the embodiments illustrated in FIGS. 5A and 5B, the first portion 408, the second portion 412, and the flexible portion 432 are formed as tubes. Because the first portion 408 is formed as a tube, other vacuum accessories may be coupleable to the first portion. Moreover, the first portion 408 and the second portion 412 may have diameters that are the same or different. For example, in some embodiments, the first portion 408 and the second portion 412 may have a diameter that ranges from about 1⅞ inches to about 2.5 inches. The flexible portion 432 may have a diameter that is the same or smaller than the diameters of the first portion 408 and the second portion 412. Moreover, the first portion 408 is shorter than the second portion 412. Accordingly, the flexible portion 432 may be positioned to reach surfaces in a variety of orientations. Additionally, a sheath (not shown) may be provided to overlay the flexible portion 432 of FIGS. 5A-5B. The sheath is configured to protect the flexible portion 432 from wear and tear during use.

With respect to the embodiments of FIGS. 6A-6D, the flexible portion 432 is also constructed from a resilient material that allows the first portion 408 to flex at least 90 degrees in a plurality of directions relative to the second portion 412. Specifically, in the illustrated embodiment the first portion 408 may flex laterally or vertically relative to the axis 428 of the second portion 412. Moreover, in the embodiment illustrated in FIGS. 6A-6D, the flexible portion 432 is constructed from a resilient material that springs back to its original configuration after being bent to a desired configuration or angle. Accordingly, the flexible portion 432 may be positioned in a variety of orientations to reach difficult to access surfaces and crevices.

Figure 6C:
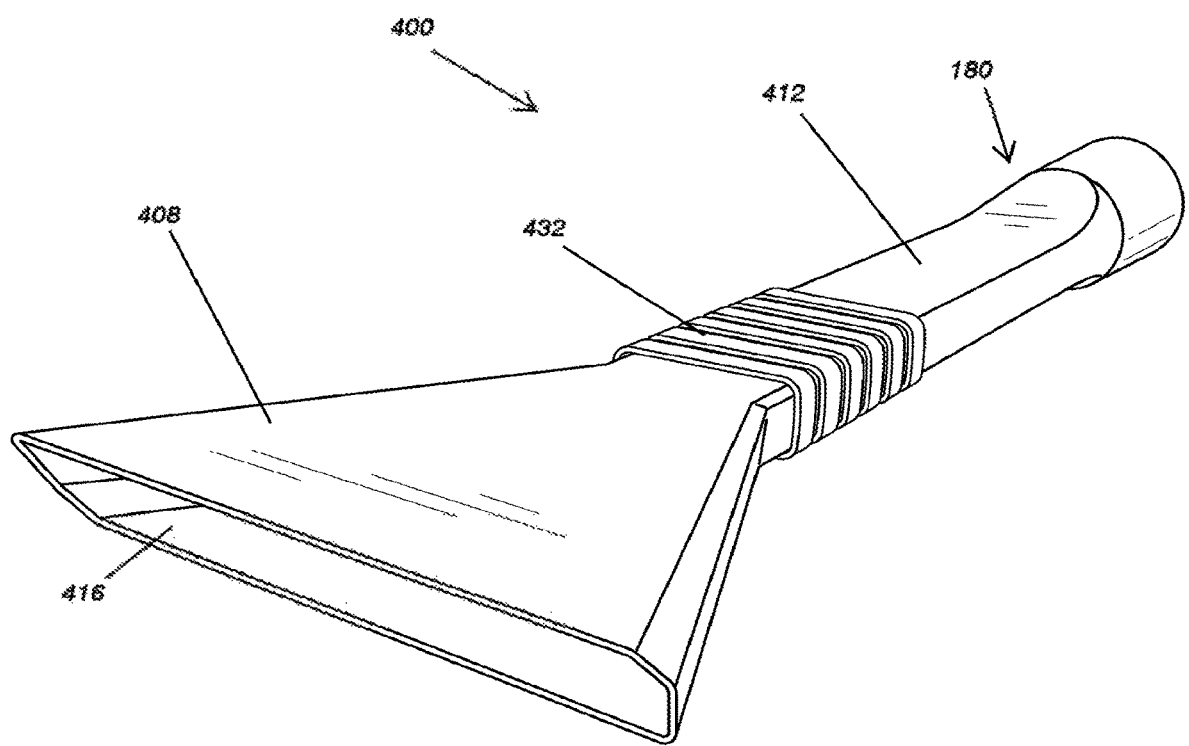
FIG. 6C illustrates a perspective view of a vacuum tool according to another embodiment in a first position.

In the embodiments illustrated in FIGS. 6A-6B, the first portion 408, the second portion 412, and the flexible portion 432 have substantially rectangular cross-sections and therefore define substantially rectangular apertures 416, 424, 436 extending therethrough. The first end may be chamfered or slanted such that the first end defines a surface that is angled relative to the first axis 420. Additionally, as shown in the embodiment of FIGS. 6A-6B, the first portion 408, the second portion 412, and the flexible portion 432 may each have a height that is greater than their width. Moreover, as shown, in the embodiment of FIGS. 6C-6D, the first portion 408, the second portion 412, and the flexible portion 432 may each have a width that is greater than their height. Because the first portion 408 is substantially rectangular, other vacuum accessories may be coupleable to the first portion 408. In some embodiments, the first portion 408 may have dimensions, for example, length, width, height, cross-sectional area, that are the same or different than the second portion 412. The flexible portion 432 may have a width and/or height that is the same or smaller than the width and/or height of the first portion 408 and/or the second portion 412.

Figure 7F:
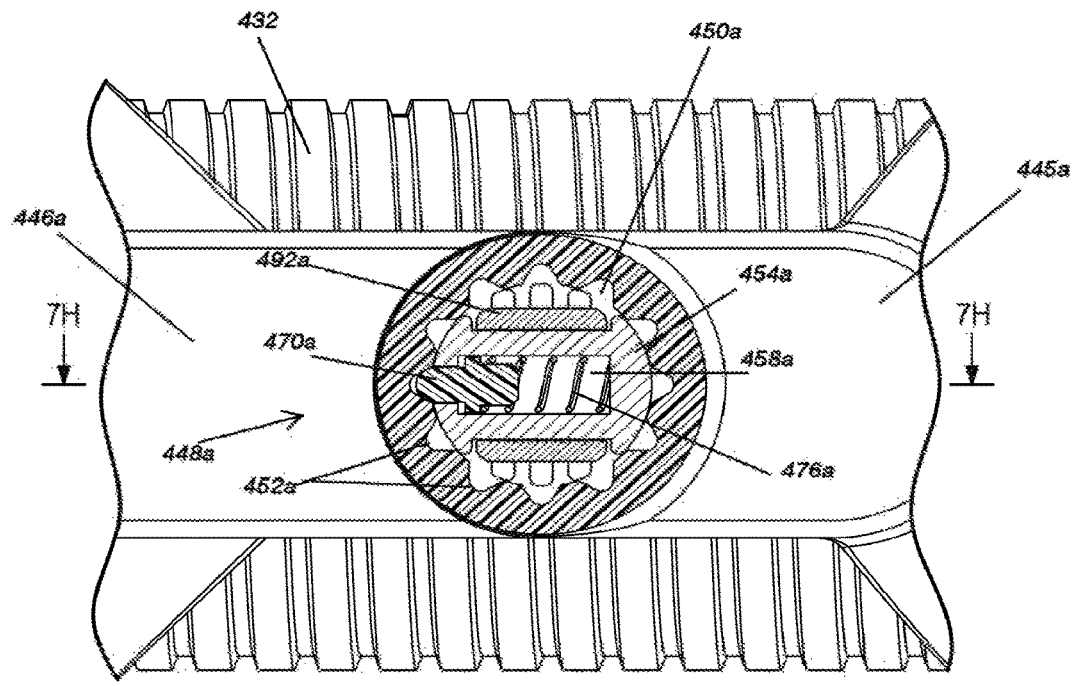
FIG. 7F illustrates a cross-sectional view of the mechanical joint of FIG. 7A along the line 7F-7F of FIG. 7D.

In the embodiment of FIGS. 7A-7H, the first portion 408 and the second portion 412 may be coupled by one or more mechanical joints that each defines a pivot or rotational axis 444 (FIG. 7D). The first portion 408 is pivotable relative to the second portion 412 about the pivot axis 444 and the one or more mechanical joints secure the first portion 408 relative to the second portion 412 in a plurality of orientations. For example, in a first orientation, the first portion 408 and the second portion 412 (and therefore the axes 420, 428) are angled relative to one another by a first angle (e.g., by 45 degrees). In a second orientation, the first portion 408 and at a second portion 412 (and therefore the axes 420, 428) are positioned relative to one another by a second different angle (e.g., 90 degrees). In a third orientation, the first portion 408 and the second portion 412 (and therefore the axes 420, 428) may be parallel to one another.

As shown in FIGS. 7A-7H, the first portion 408 includes a first leg 445a and a second leg 445b extending therefrom, and the second portion 412 includes a first leg 446a and a second leg 446b extending therefrom. The legs 445a, 445b, 446a, 446b extend parallel to the respective axis 420, 428 of the first and second portions 408, 412. In the illustrated embodiment, the first leg 445a of the first portion 408 and the corresponding first leg 446a of the second portion 412 are coupled to one another by a first mechanical joint, and the second leg 445b of the first portion 408 and the corresponding second leg 446b of the second portion 412 are coupled to one another by a second mechanical joint. Thus, the first legs 445a, 445b extend along one side of the flexible portion 432, while the second legs 446a, 446b extend along an opposite side of the flexible portion 432.

Figure 7G:
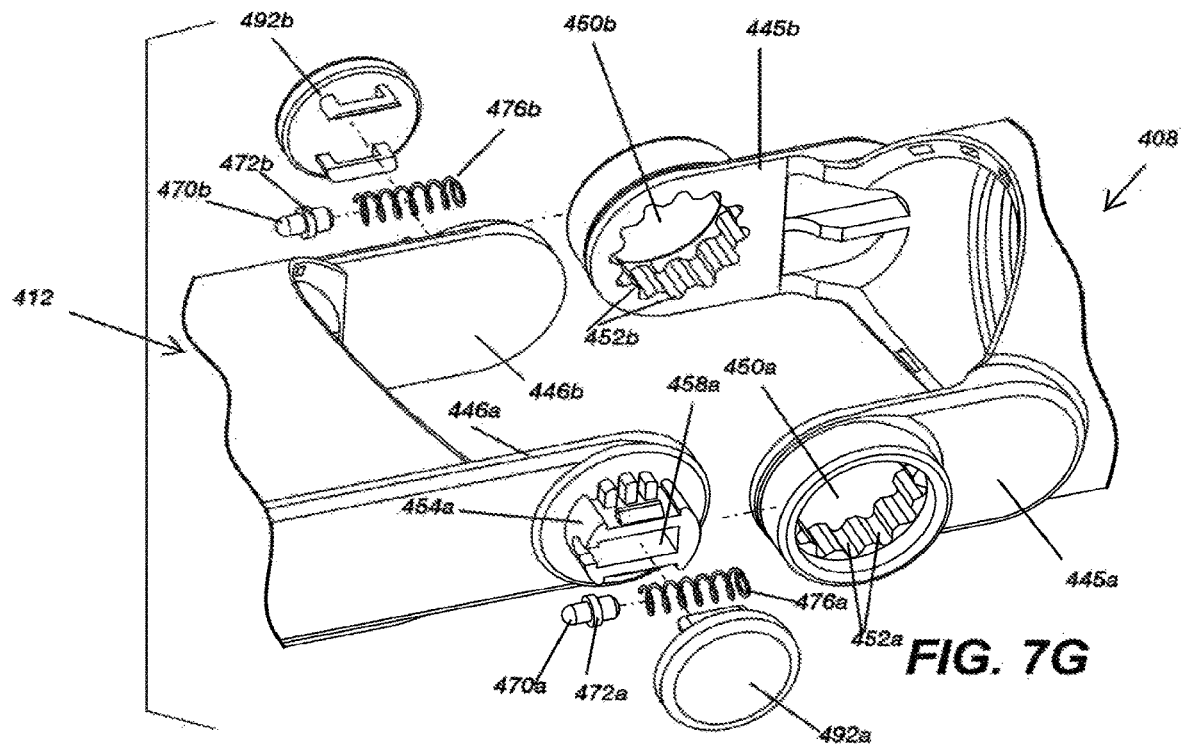
FIG. 7G illustrates an exploded view of the mechanical joint of FIG. 7A.
Figure 7H:
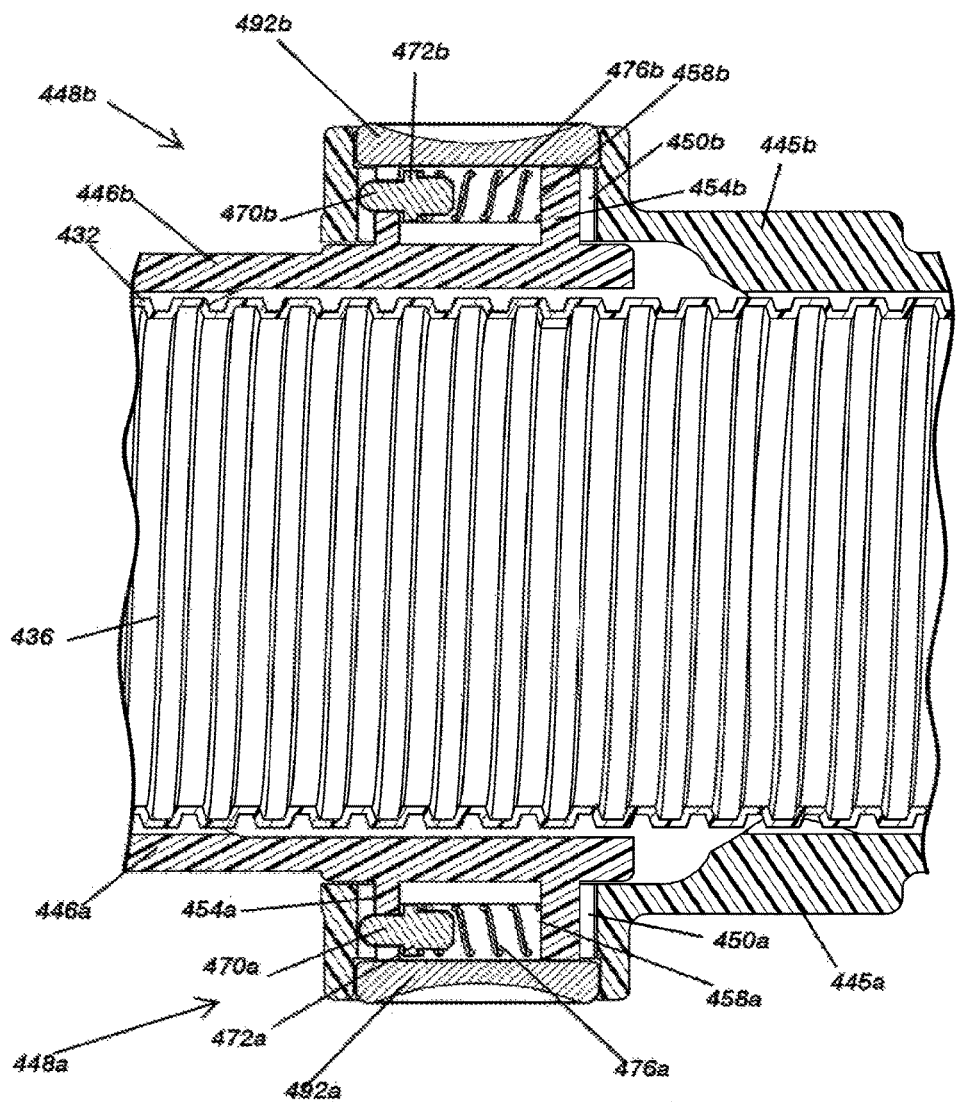
FIG. 7H illustrates a cross-sectional view of the mechanical joint of FIG. 7A along the line 7H-7H of FIG. 7F.

As shown in FIGS. 7F-7H, the first and second mechanical joints are the same, so although only the first mechanical joint is described, it should be understood that the description of the first mechanical joint applies to the second mechanical joint as well. The first mechanical joint is formed by a detent mechanism 448a extending between the first leg 445a and the second leg 446b. The detent mechanism 448a is selectively engagable between the first and second legs 445a, 446a to secure the first portion 408 relative to the second portion 412 in selected orientations. More specifically, the first leg 445a include a toothed aperture 450a extending therethrough. The pivot axis 444 of the aperture 450a is perpendicular to the first axis 420 of the first portion 408 (FIG. 7D). The teeth of aperture 450a define a plurality of recesses 452a. The second leg 446a defines an engagement portion 454a extending outwardly therefrom. The engagement portion 454a defines an aperture 458a extending therethrough. The aperture 458a extends parallel to the second axis 428 and has a first, open end and a second, closed end. A detent 470a is partially positioned within and movable relative to the aperture 458a (e.g., parallel to the second axis 428). In particular, the detent 470a includes a flange 472a that is positioned within the aperture 458a and a distal end that extends through the open end of the aperture 458a and from the engagement portion 454a. The flange 472a has a diameter that is wider than the open end of the aperture 458a and therefore retains the detent 470a within the aperture 458a. A biasing mechanism 476a (e.g., a spring) is positioned within the aperture 458a between the flange 472a and the closed end. The engagement portion 454a of the second leg 446a extends into the aperture 450a of the first leg 445a. Accordingly, the detent 470a is positioned within the aperture 450. A cap 492 is coupled over the aperture 450a to enclose the detent mechanism therein.

The detent 470a is movable between a first position and a second position. In the first position, the distal end of the detent 470a extends through the open end of the aperture 458a. The biasing mechanism 476a biases the detent into the first position. In the first position, the distal end of the detent 470a is engageable with one of the recesses 452a of the aperture 450a to secure the first portion 408 in a selected one of the plurality of orientations. In the second position, the distal end is positioned entirely or almost entirely within the aperture 458a. In the second position, the distal end of the detent 470a has been withdrawn from and is not engaged with any of the recesses 452a of the aperture 450a. The biasing force of mechanism 476a may be overcome by applying a force to the first portion 408 or second portion 412 to pivot the first portion 408 and second portion 412 about axis 471 relative to one another into any selected one of the plurality of orientations provided by the mechanical joints.

Figure 7I:
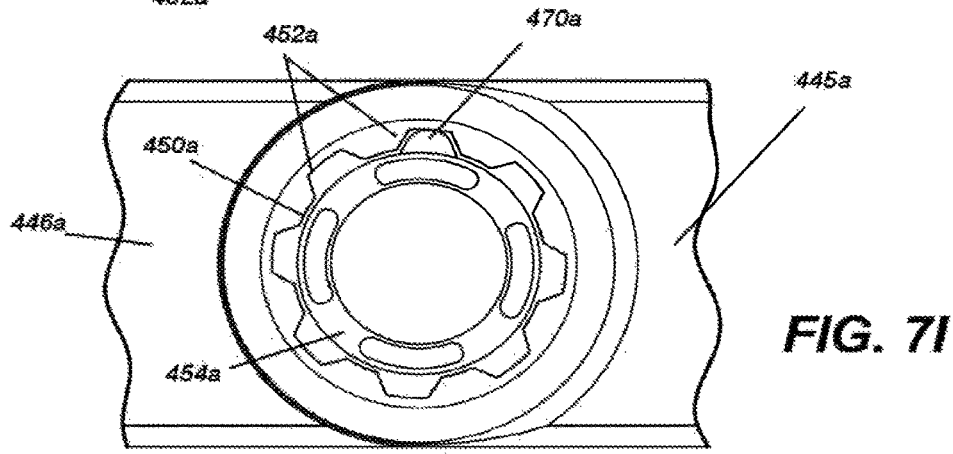
FIG. 7I illustrates a cross-sectional view of another mechanical joint suitable for use with FIG. 7A.

In some embodiments, such that shown in FIG. 7I, the engagement portion 454a may include one or more detents 470a extending therefrom that are configured to move or click between recesses 452a of the respective aperture 450a of the first leg 445a.

Also, while the first portion 408 of the vacuum tool 400 may be a single, integral piece, in the illustrated embodiment, the first portion 408 is a two-piece assembly that includes a coupling portion 490 and a brush portion 494 that is removably coupled (e.g., by a friction fit or snap-fit engagement) to the coupling portion 490. In some embodiments, the coupling portion 490 and the brush portion 494 may be coupled to each other such that they can rotate or swivel relative to one another. The brush portion 494 includes the openings 441 and the plurality of brush elements 442a-442c. The first and second legs 445a, 445b extend from the coupling portion 490, in the illustrated embodiment. Together, when coupled, the coupling portion 490 and the brush portion 494 define the aperture 416, which extends along a first axis 420. The brush portion 490 may be one of a plurality of interchangeable brush portions 494, each having a different length. The lengths of the brush portions 494 may range from 4 inches to 8 inches. In other embodiments, the brush portion 494 may be integral with (and therefore not removable from) the coupling portion 490. In the embodiments illustrated in FIGS. 7A-7H, the maximum width of the vacuum tools 400 may be about 2.5 inches and the maximum length of the vacuum tools may be about 10 inches.

In the embodiment of FIGS. 7A-7H, the first portion 408 includes one or more openings 441 that are in fluid communication with a first aperture 416 (FIG. 7B) that extends along axis 420 of the first portion 408 and a plurality of brush elements 442a-442c. In particular, the openings 441 each extend sequentially through a first side of the first portion 408b along a direction that is parallel to the first axis 420. As shown, the plurality of brush elements include a first brush element 442a that is positioned on a second side of the first portion 408, a second brush element 442b that is positioned on a third side of the first portion 408, and a third brush element 442c that is positioned on a third side of the first portion 408. Each of the first, second, and third brush elements 442a-442c includes a plurality of bristles. In the illustrated embodiment, the first portion 408 is relatively thin, which allows it to reach under appliances or other objects and in other small spaces. As shown, the first portion 408 tapers such that a significant portion of the first portion 408 it is thinner than the second portion 412. The brush elements 442a-442c are positioned about a perimeter of the first portion 408 to help dislodge caked on dirt and debris from a work surface and enhance the effectiveness of the vacuum.

FIGS. 8A-8G illustrate an embodiment of a vacuum tool 500 including a first portion 508, a second portion 512 movably (e.g., rotatably or pivotably) coupled to the first portion 508, and a scrubbing accessory 516 that is removably coupled to the first portion 508. The first portion 508 defines a first end 520, a second end 524 opposite the first end 520, a first axis 528 that extends between the first end 520 and the second end 524, and a first aperture 532 that extends between the first end 520 and the second end 524. The first end 520 has a first opening that defines an inlet and the second outlet end 524 has a second opening that is smaller than the first opening. The width or diameter of aperture 532 thus decreases from the first end 520 to the second end 524.

As shown, the first portion 508 defines a substantially oval or oblong cross-section (FIG. 8E) at the first end 520 and a substantially circular cross-section (FIG. 8D) at the second end 524. One end of the oval or oblong cross-section is wider than the other end. A majority of the first opening at the first end 520 is positioned on one side of the first axis 528 with a first side of the opening narrower than a second side of the opening. This configuration allows the first portion 508 to fit into corners. The second opening at the second end 524 of the first portion 508 is substantially concentric about the first axis 528. The cross-section of the first portion 508 gradually decreases in width or diameter from the first end 520 to the second end 524. Consequently, the first portion 508 defines a first curved surface 536 that is substantially concave and a second curved surface 540 positioned opposite the first curved surface 536 that is substantially convex. Additionally, the radius of curvature defined by the first curved surface 536 is greater than the radius of curvature defined by the second curved surface 540. The first portion 508 also defines a third curved surface 544 that extends between the first curved surface 536 and the second curved surface 540 and has a third concavity, and a fourth curved surface 548 opposite the third curved surface 544 that extends between the first curved surface 536 and the second curved surface 540 and has a fourth concavity that is substantially the same as the third concavity.

The second portion 512 has a first connection portion 560 that is movably (e.g., rotatably or pivotably) coupled to the first portion 508, as described below, and a second connection portion 180 that is configured to be removably coupled to a hose or wand of a vacuum. The second portion 512 further includes a bend between the first connection portion 560 and the second connection 180 portion. A second aperture 568 extends between the first connection portion 560 and the second connection portion 180. The first connection portion 560 defines a second axis 572 that aligns with the first axis 528 of the first portion 508, and the second connection portion 180 defines a third axis 576 that intersects the second axis 572 (and therefore the first axis 528) at an angle that is greater than 90 degrees. In some embodiments, the angle between the second axis 572 and the third axis 576 may range from about 90 degrees to about 180 degrees. As shown, the second connection portion may include a universal coupler 182 (as discussed above with respect to FIGS. 1A-1K. The second connection portion 180 (and therefore the universal coupler 182) defines an outlet.

Dirt and debris are drawn from the inlet at the first end 520 of the first portion 508 to the outlet of the second connection portion 180 of the second portion 512 under the force of the suction generated by the vacuum.

Figure 8A:
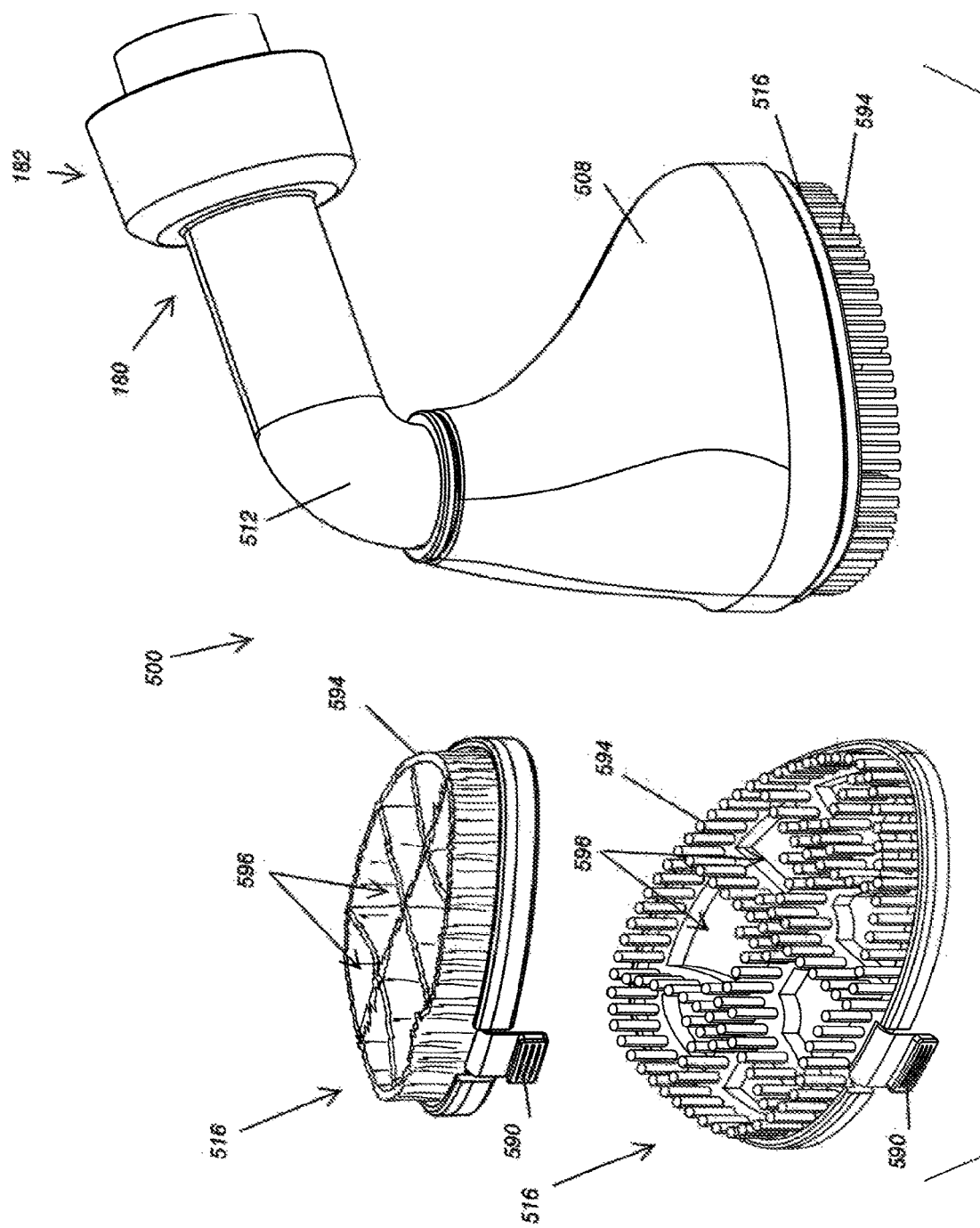
FIG. 8A illustrates a perspective view of a vacuum tool according to another embodiment including one or more removable scrubbing accessories.
Figure 8C:
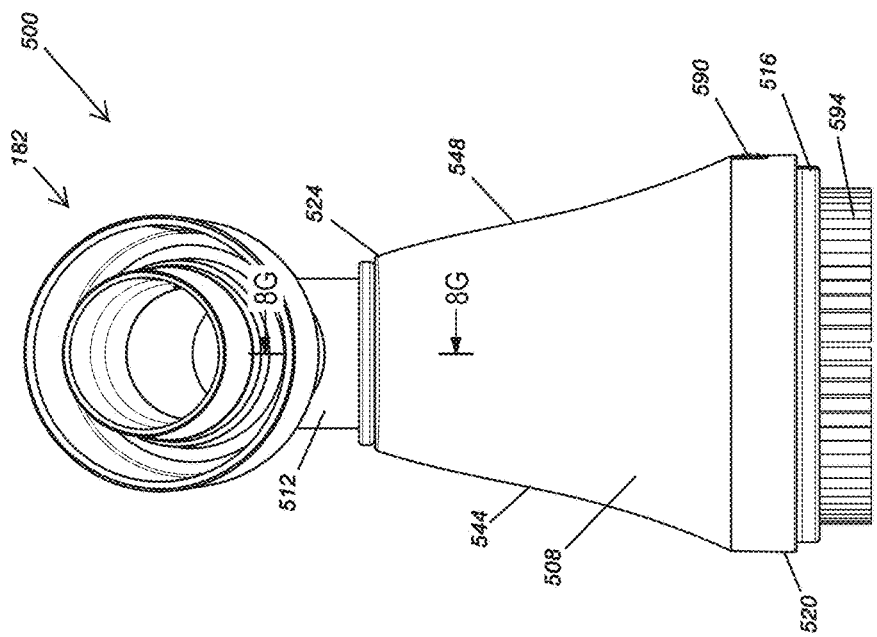
FIG. 8C illustrates another side view of the vacuum tool of FIG. 8A.
Figure 8B:
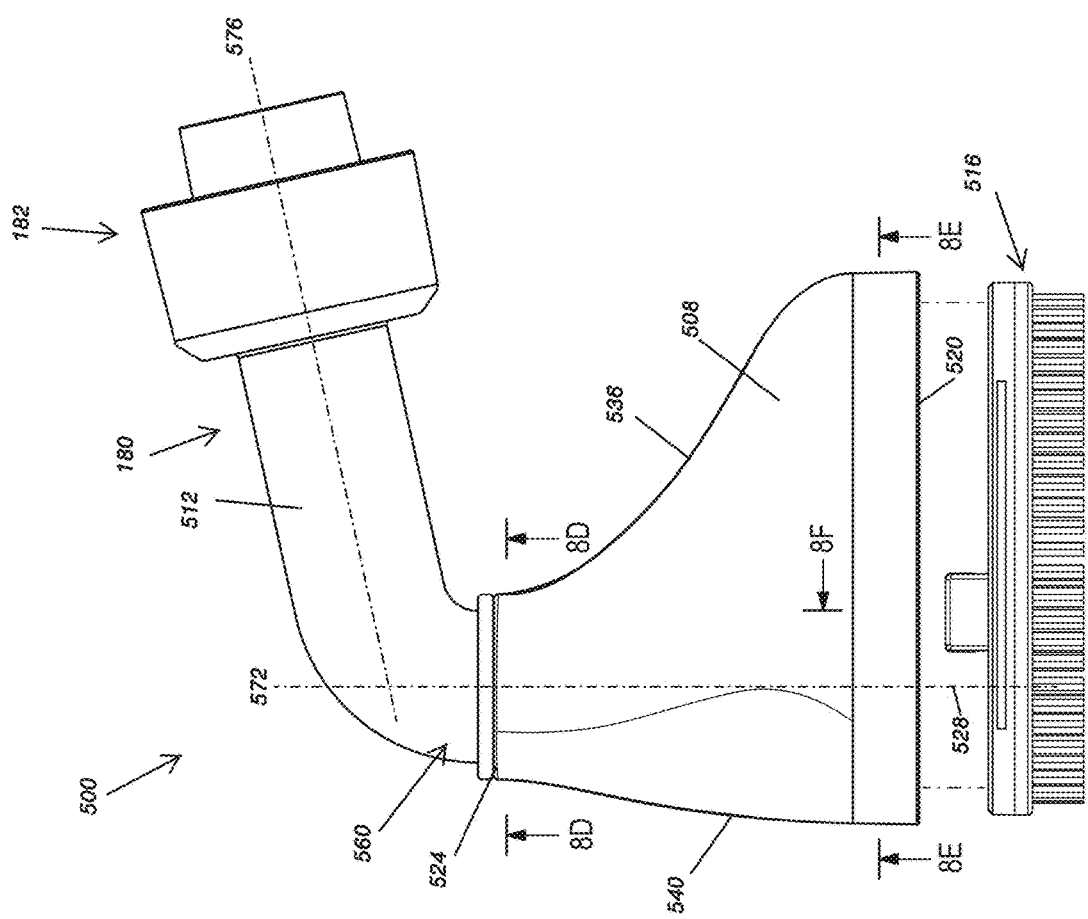
FIG. 8B illustrates a side view of the vacuum tool of FIG. 8A.
Figure 8D:
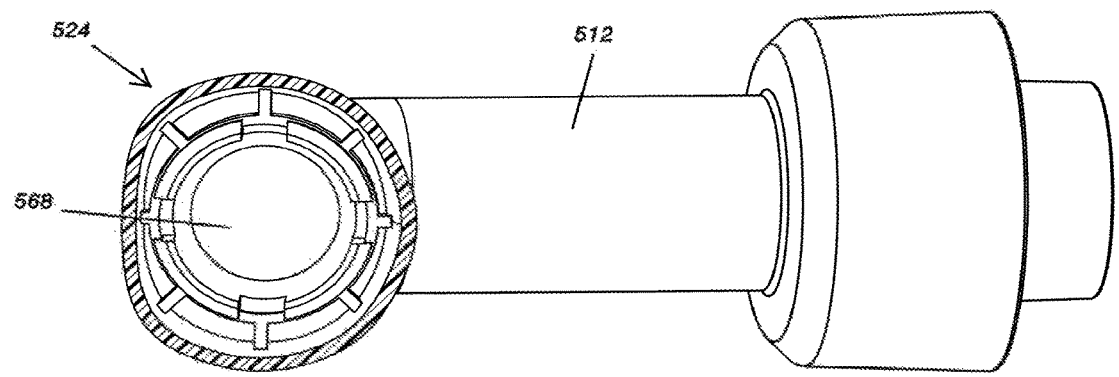
FIG. 8D illustrates a cross-sectional view of the vacuum tool of FIG. 8A along the line 8D-8D of FIG. 8B.
Figure 8E:
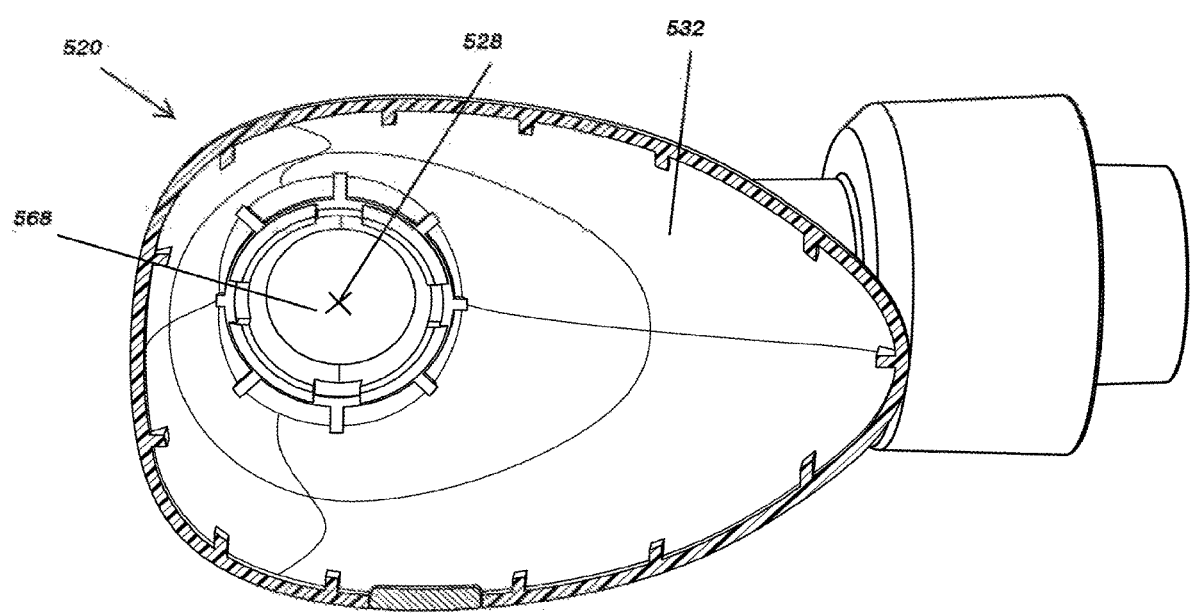
FIG. 8E illustrates a cross-sectional view of the vacuum tool of FIG. 8A along the line 8E-8E of FIG. 8B.
Figure 8F:
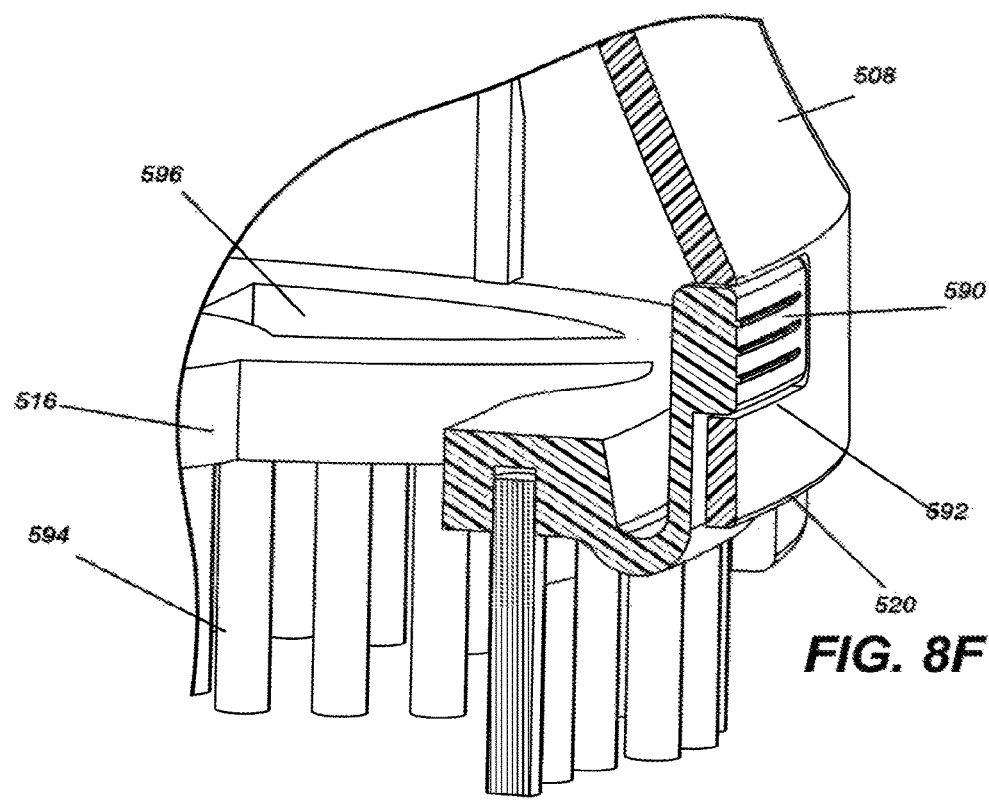
FIG. 8F illustrates a detailed cross-sectional view of the vacuum tool of FIG. 8A along the line 8F-8F of FIG. 8B.
Figure 8G:
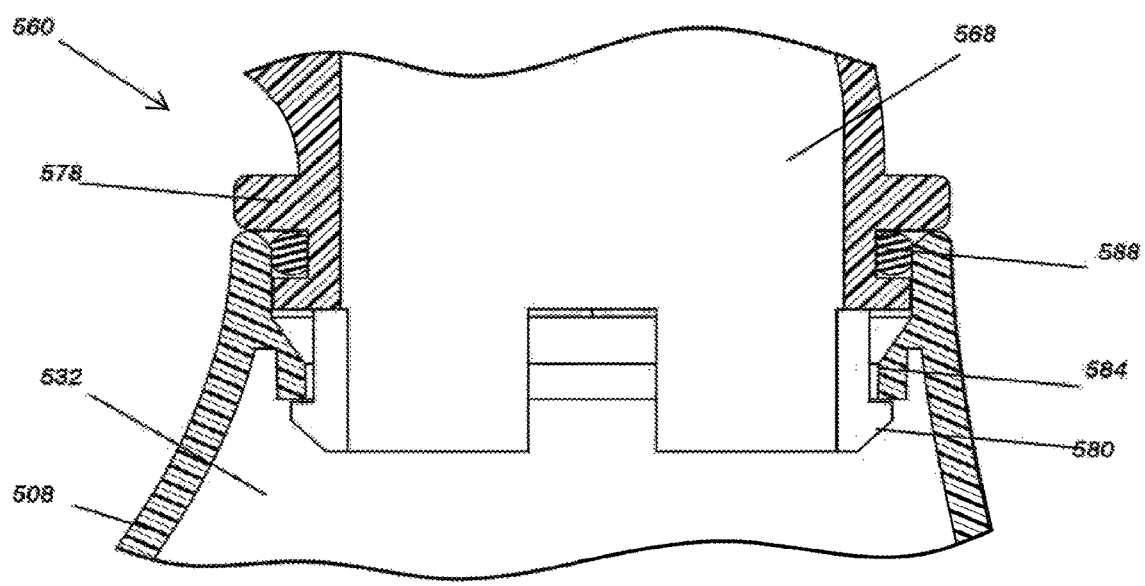
FIG. 8G illustrates a detailed cross-sectional view of the vacuum tool of FIG. 8A along the line 8G-8G of FIG. 8c.

As shown in FIG. 8G, the first connection portion 560 includes an annular lip 578 and one or more teeth 580. The one or more teeth 580 are configured to engage a flange 584 extending from an inner surface of the first portion 508 adjacent the second end 524 and the annular lip 584 is positioned adjacent to the second end 524 of the first portion 508. A seal 588 may be positioned between the second end 524 of first portion 508 and the first connection portion 560. The second portion 512 is rotatable about the first axis 528 of the first portion 508. Specifically, the second portion 512 can rotate 360 degrees relative to the first portion 508 about the first axis 528.

The scrubbing accessory 516 is removably coupled to the first end 520 of the first portion 508. The scrubbing element 516 includes one or more tabs or projections 590 that are secured (e.g., by snap-fit or friction-fit engagement) to a corresponding aperture 592 that extends through a surface of the first portion 508 (FIGS. 8A, 8F). In the illustrated embodiment there is a single projection 590 and a single aperture 592, but in other embodiments there may be more projections and apertures. The projection 590 is received in the aperture 592 when the scrubbing accessory 516 is secured to the first portion 508. The user exerts a force in a direction towards the longitudinal axis 528 to remove the projection 590 from the aperture 592 and remove the scrubbing accessory 516 from the first portion 508. In the illustrated embodiment, the scrubbing accessory 516 is a brush element 594 including bristles that extend about the perimeter of the first end 520 and across the first opening. In the illustrated embodiment, the bristles extend in at least two directions across the first opening. The scrubbing accessory 516 also includes a plurality of openings 596 that are circumscribed by the bristles of the brush element 594. The plurality of openings 596 are in communication with the first portion 508. Different scrubbing accessories 516 may have different brush element 594 configurations and bristle characteristics (e.g., soft, long, stiff, short, etc.). For example, the brush elements 594 may include bristles that extend only about the perimeter of the first opening, that extend only across the first opening, or that extend from a perimeter of the first portion in one or more directions. Additionally, the brush elements 594 may include bristles that extend in any direction across the first opening. Furthermore, the scrubbing accessories 516 may include squeegees, soft pads or any suitable agitation element in lieu of brush elements 594.

The embodiment of the vacuum tool 500 of FIGS. 8A-8H is ergonomically shaped to reduce strain on a user's hand. The first curved surface 536 is configured to receive the user's palm, while the third and fourth curved surfaces 544, 548 are configured to receive either the user's thumb or figures (depending on if the user is using their left or right hand). Accordingly, a user can manipulate the first portion 508 to loosen or dislodge dirt and debris caked on a work surface using the scrubbing accessory 516. Because the second portion 512 is rotatable in all directions relative to the first portion 508, the user can manipulate the first portion 508 without constraint from the hose or wand connected to the second portion 512.

In the illustrated embodiment, the vacuum tool 500 has a height of about 7.75 inches when measured from second connection portion 180 through the bristles of the brush element 520, a length of about 6.64 inches when measured between the second side of the first portion 508 and the connection portion 180, a width of about 3.34 inches when measured between the third and fourth curved surface 544, 548.

Figure 9C:
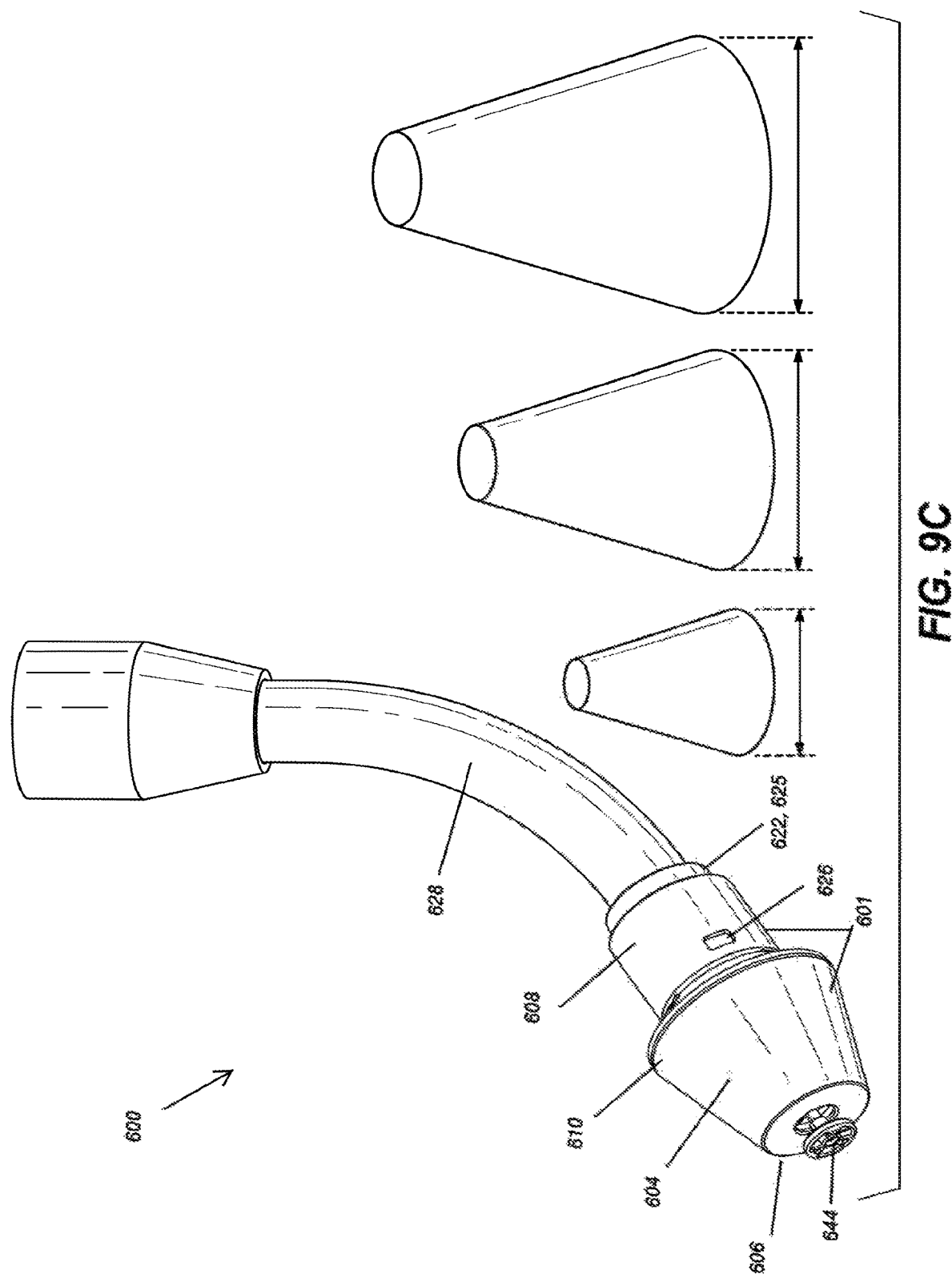
FIG. 9C illustrates a perspective view of a vacuum tool according to another embodiment.

FIGS. 9A-9C illustrate a vacuum tool 600 for pulling wire through a conduit or pipe. In brief, instead of trying to push electrical wire through a conduit, which can be slow and difficult, a technique has been developed using a vacuum to draw a conduit piston or other suitable small object, also known as a conduit mouse, and a pull string through the conduit. The conduit piston may comprise, for example, a foam cylinder or plug that is slightly smaller than the interior diameter of the conduit. One end of the pull string is attached to the conduit piston and the conduit piston with the attached string is inserted into one end of a conduit through which the wire is to be pulled. Suction created by a vacuum is applied to the conduit at the end opposite the conduit piston and draws the conduit piston with the attached string through the conduit. After the conduit piston has been drawn through the conduit by the vacuum, the pull string is untied from the conduit piston. One end of the pull string is then tied to the wire and the pull string is used to pull the wire through the conduit. One problem encountered with this method occurs when the conduit piston is inadvertently sucked into the vacuum.

The vacuum tool 600 of FIGS. 9A-9C includes a body 601 having a first portion (e.g., a frustoconical head portion) 604 and a second portion (e.g., a base portion) 608 coupled (e.g., by fasteners or other suitable coupling mechanism) to the first portion 604. The first portion 604 defines a first end 606 (a distal end of the vacuum tool 600), a second end 610 opposite the first end 606, a first axis 612 extending between the first end 606 and the second end 610, and a first aperture 616 extending between the first end 606 and the second end 610. The first end of the first portion 604 defines an inlet opening (e.g., a central inlet opening) 614 surrounded by an annular distal face. As illustrated, the first portion 604 may have a cross-sectional profile that is substantially conical in shape and has an outer diameter that increases in a direction from the first end 606 towards the second end 610. The second diameter is thus larger than the first diameter. The first portion 604 may be constructed from a pliable material such as foam or rubber. Alternatively, the first portion 604 may include an outer layer 604a that is constructed from a pliable material such as foam or rubber which surrounds or is otherwise coupled to an interior support body. The interior support body includes a central conduit defined therein and in fluid communication with the central inlet opening 614. The interior support body also includes fastener receiving recesses (two of which are shown in FIG. 9B) defined therein. The conical shape of the first portion 604 allows the first portion to be inserted into and to seal against conduits of different sizes.

The second portion 608 defines a first end 618, a second end 622 opposite the first end 616, a second axis 620 extending between the first end 618 and the second end 622, and a second aperture 624 extending between the first end 618 and the second end 622. The first end 618 sealingly engages the second end 610 of the first portion 604 to enable fluid communication between the first aperture 616 and the second aperture 624. The first end 618 may include a flared portion having a maximum outer diameter compared to a remainder of the second portion 608. The flared portion also includes fastener access openings defined therein (two of which are shown in FIGS. 9A and 9B) through which fasteners may access the fastener receiving recesses of the interior support body of the first portion 604. In the illustrated embodiment, the first end 618 is axially received within the second end 610 of the first portion 604. A seal may be arranged about the first end 618 of the second portion 608 and/or the second end 610 of the first portion 604 for sealing the second portion against the first portion. The second end 622 of the second portion 608 may include a connection portion 180 configured to be coupled to a hose or wand of a vacuum. The second end (e.g., a proximal end of the vacuum tool 600) 622 may further include a tubular portion extending from the flared portion. The tubular portion has an outer diameter that is smaller than the outer diameter of the flared portion and a central conduit in fluid communication with the central conduit of the first portion 604. The central conduits, therefore, form a continuous fluid passage from the inlet opening 614 to the outlet (e.g., a central outlet opening) 625. The connection portion may include a universal coupler 182 (although not shown herein). The connection portion (and therefore the universal coupler 182) define an outlet 625. The second portion may include one or more indicator openings 626 extending therethrough. In the illustrated embodiment, the indicator openings 626 extend perpendicular to the second axis 620. In some embodiments (FIG. 9C), the second portion 608 may be coupled to an adapter (e.g., a flexible tubular section) 628, that is configured to be coupled to the hose or wand of the vacuum. The adapter 628 is flexible to allow the user to position tool 600 relative to a conduit. The adapter 628 includes a central conduit in fluid communication with the inlet opening 614 and a minimum outer diameter that is smaller than the maximum outer diameter of the first portion 604.

The vacuum tool 600 of FIGS. 9A-9C also includes an indicator assembly 640 that is supported by the body 101. The indicator assembly 640 includes an indicator 642 that is actuated by a plunger 644. The plunger 644 is movably supported within the body 601 by a support 648 along or parallel to the first axis 612, as described below. The plunger 644 extends from the support 648 through the body 601 and the inlet opening 614, such that a distal end of the plunger 644 extends outwardly from first end 614 of the first portion 604. The indicator 642 is actuated by movement of a plunger 644 along or parallel to the first axis 612.

The support 648 includes a plurality of legs 652, each of which defines a lateral surface 654. A projection 658 extends from the lateral surface 654 at a first end and an indicator 642 is positioned on the lateral surface 654 on a second opposite end of each leg 652. The indicator 642 may be colored red or green, for example. Each of the projections 658 of each leg 652 are positioned for movement in a corresponding groove 662 formed on the inner surface of the second along the second portion 608. The grooves 662 extend parallel to the second axis 620 and are aligned with a respective indicator opening 626. In the illustrated embodiments, the grooves 658 extend along the second portion 608, but in other embodiments, the grooves 658 may extend along the first portion 604 or both the first portion and the second portion 608 (and therefore along the respective axes). Accordingly, the indicator 642 extends from the support 648 through at least a portion of the first and second apertures 616, 624 and is movable with the plunger 644. In other embodiments, the support 648 may be positioned in the first portion 604 such that the indicator extends through all or a portion of the first aperture 616.

The indicator assembly 640 is movable between a first position in which the plunger 644 extends from the distal end of the body 601 by a first distance and the indicator 642 of each leg 652 is spaced apart (e.g., above or below) from a respective indicator opening 626 and a second retracted position in which the plunger 644 has been retracted a second distance toward the first portion 604. When retracted to its second position, the plunger 644 causes the indicator 642 to move to a position adjacent its respective indicator opening 626 so that the indicator 642 is visible through the opening. The second distance is less than the first distance. A biasing mechanism (e.g., a spring) may bias the indicator assembly into the first position. The biasing mechanism is configured to be stronger than the suction of the vacuum but weaker than a force of a mouse.

As described above, when suction generated by the vacuum is applied to the conduit to be wired the conduit piston with the attached string is pulled through the conduit by the vacuum generated suction. With the vacuum tool 600 depicted in FIGS. 9A-9C, the conduit piston will hit the plunger 644 when the conduit piston has been pulled through the entire conduit and successfully arrives at the vacuum. The force of the conduit piston striking the plunger 644 of the indicator assembly 640 pushes the plunger 644 from its first extended position to its retracted second position. When the indicator assembly 640 has been pushed to its second retracted position, the user will see the color indicator(s) 642 through indicator opening(s) 626, which alerts the user that the mouse been successfully pulled through the conduit and that the vacuum should be turned off, avoiding the mouse from being inadvertently drawn into and possibly damaging the vacuum. The end of the string distal from the vacuum can then be tied to the wire to pull the wire through the conduit.

The first portion 608 may have any suitable size to accommodate conduits of different sizes. For example, the first portion 608 may have a diameter that ranges from 0.5 inches to 1.25 inches, a diameter that ranges from 1.5 inches to 3.5 inches, or a diameter that ranges from 4 inches to 8 inches. Despite the various diameters of the first portion 608, the height of the tool 600 may remained unchanged. Therefore, the height of the tool 600 may be up to (and including) 7 inches.

One or more independent features and/or independent advantages of the vacuum tools discussed herein may be set forth in the claims.

What is claimed is:

1. A vacuum tool for removably coupling to a hose or wand of a vacuum, the vacuum tool comprising:
    a brushless frustoconical head portion including
        a distal end of the vacuum tool, the distal end having
            a central inlet opening defined in the distal end, and
            an annular distal face surrounding the central inlet opening,
        an interior support body having
            a central conduit defined in the interior support body, the central conduit in fluid communication with the central inlet opening, and
            a plurality of fastener receiving recesses defined in the interior support body, the plurality of fastener receiving recesses located radially outwardly relative the central conduit,
        an outer layer coupled to the interior support body, the outer layer including rubber and forming at least a portion of the annular distal face and an entirety of an outer lateral surface of the brushless frustoconical head portion;
    a base portion coupled to the head portion, the base portion including
        a flared portion having
            a maximum outer diameter, and a plurality of fastener access openings defined in the flared portion, each fastener access opening in fluid communication with a respective one of the plurality of fastener receiving recesses, a tubular portion extending from the flared portion, the tubular portion having an outer diameter that is smaller than the maximum outer diameter of the flared portion, a central conduit in fluid communication with the central conduit of the brushless frustoconical head portion, and a proximal end of the vacuum tool, the proximal end opposite the distal end of the brushless frustoconical head portion, the proximal end including a central outlet opening in fluid communication with the central conduit of the tubular portion, the proximal end configured to removably couple to the hose or wand of the vacuum;

a plurality of fasteners, each fastener accessible through a respective one of the plurality of fastener access openings and extending into a respective one of the plurality of fastener receiving recesses; and a longitudinal axis extending centrally through the central inlet opening of the brushless frustoconical head portion, the central conduit of the brushless frustoconical head portion, the central conduit of the base portion, and the central outlet opening of the base portion.

2. The vacuum tool of claim 1, wherein each of the plurality of fastener receiving recesses defined in the interior support body is threaded.

3. The vacuum tool of claim 1, wherein, with the fasteners received in the respective fastener receiving recesses, each of the plurality of fasteners includes a fastener rotational axis that is parallel to the longitudinal axis.

4. The vacuum tool of claim 3, wherein each of the plurality of fasteners includes a threaded fastener shaft at least partially disposed within a respective one of the fastener receiving recesses, and a fastener head accessible through a respective one of the plurality of fastener access openings.

5. The vacuum tool of claim 1, wherein the central inlet opening is smaller than the central outlet opening.

6. The vacuum tool of claim 1, wherein the outer layer forms a majority of the annular distal face.

7. The vacuum tool of claim 1, wherein the tubular portion is cylindrical.

8. The vacuum tool of claim 1, wherein at least a part of the base portion is axially received in the brushless frustoconical head portion.

9. The vacuum tool of claim 1, wherein the tubular portion includes an inner wall forming the central conduit of the base portion, an outer wall surrounding a majority of the inner wall, and an annular channel formed between the inner wall and the outer wall, the annular channel configured to receive an end of the hose or wand of the vacuum.

10. The vacuum tool of claim 1, wherein the longitudinal axis extends centrally through both the distal end of the vacuum tool and the proximal end of the vacuum tool.

11. A vacuum tool for removably coupling to a hose or wand of a vacuum, the vacuum tool comprising:

a brushless frustoconical head portion including a distal end of the vacuum tool, the distal end having a central inlet opening defined in the distal end, and an annular distal face surrounding the central inlet opening and having a minimum outer diameter of the brushless frustoconical head portion, an outer layer including rubber and forming at least a portion of the annular distal face and an entirety of an outer lateral surface of the brushless frustoconical head portion, and a maximum outer diameter opposite the annular distal face;

a flexible tubular section coupled to the brushless frustoconical head portion, the flexible tubular section is longer than the brushless frustoconical head portion, the flexible tubular section including a central conduit defined in the flexible tubular section, the central conduit in fluid communication with the central inlet opening, and an outer diameter that is smaller than the maximum outer diameter of the brushless frustoconical head portion; and a base portion coupled to the flexible tubular section, the base portion including a minimum outer diameter disposed adjacent the flexible tubular section, a central conduit defined in the base portion and in fluid communication with the central conduit of the flexible tubular section, and a proximal end of the vacuum tool, the proximal end opposite the distal end of the brushless frustoconical head portion, the proximal end including a central outlet opening in fluid communication with the central conduit of the flexible tubular section, the proximal end having an outer diameter greater than the outer diameter of the flexible tubular section, the proximal end configured to removably couple to the hose or wand of the vacuum; and wherein, with the flexible tubular section arranged in a straight line, a longitudinal axis extends centrally through the central inlet opening of the brushless frustoconical head portion, the central conduit of the flexible tubular section, the central conduit of the base portion, and the central outlet opening of the base portion.

12. The vacuum tool of claim 11, wherein a section of the base portion tapers in a direction toward the distal end of the vacuum tool.

13. The vacuum tool of claim 11, wherein the base portion further includes an inner wall forming the central conduit of the base portion, an outer wall surrounding a majority of the inner wall, and an annular channel formed between the inner wall and the outer wall, the annular channel configured to receive an end of the hose or wand of the vacuum.

14. The vacuum tool of claim 11, wherein the flexible tubular section is received in the base portion.

15. The vacuum tool of claim 11, wherein a section of the base portion is cylindrical.

16. The vacuum tool of claim 11, wherein the outer layer forms a majority of the annular distal face.

17. The vacuum tool of claim 11, wherein the base portion is formed as a unitary part.

18. The vacuum tool of claim 11, wherein the flexible tubular section forms a longest section of the vacuum tool.

19. The vacuum tool of claim 11, wherein the flexible tubular section is the longest portion of the vacuum tool.

* * * * *